United States Patent [19]
Gray, III et al.

[11] Patent Number: 5,856,829
[45] Date of Patent: Jan. 5, 1999

[54] INVERSE Z-BUFFER AND VIDEO DISPLAY SYSTEM HAVING LIST-BASED CONTROL MECHANISM FOR TIME-DEFERRED INSTRUCTING OF 3D RENDERING ENGINE THAT ALSO RESPONDS TO SUPERVISORY IMMEDIATE COMMANDS

[75] Inventors: Donald M. Gray, III, San Francisco; Adam C. Malamy, Palo Alto; Robert W. Laker, Fremont; Adrian Sfarti, Sunnyvale, all of Calif.

[73] Assignee: CagEnt Technologies, Inc., Redwood City, Calif.

[21] Appl. No.: 644,870

[22] Filed: May 10, 1996

Related U.S. Application Data

[63] Continuation-in-part of Ser. No. 438,860, May 10, 1995.

[51] Int. Cl.$^6$ .................................................. G06T 15/40
[52] U.S. Cl. .......................... 345/422; 345/419; 345/436
[58] Field of Search ........................... 345/419, 420–422, 345/433–438, 430, 431

[56] References Cited

U.S. PATENT DOCUMENTS

| | | | |
|---|---|---|---|
| 5,097,427 | 3/1992 | Lathrop et al. | 395/130 |
| 5,179,659 | 1/1993 | Lien et al. | 345/501 |
| 5,224,208 | 6/1993 | Miller, Jr. et al. | 395/125 |

OTHER PUBLICATIONS

Newman, William, "Principles of Interactive Computer Graphics", McGraw–Hill, inc, 1970, pp. 235–332 and 469–480.

Prosise, Jeff, "Understanding Modelview Transformations in OpenGL for Windows NT," Microsoft Systems Journal, vol.10, No.2, P. 19(18), Feb., 1995.

Blinn, James F., "A Trip down the Graphics Pipeline: the Homogeneous Perspective Transform," IEEE Computer Graphics and Applications, vol. 13, No. 3, May, 1993, pp. 75–80.

Blinn, James F., "Hyperbolic Interpolation," IEEE Computer Graphics and Applications, vol. 12, No. 4, Jul., 1992, pp. 89–94.

*Primary Examiner*—Rudolph J. Buchel, Jr.
*Attorney, Agent, or Firm*—Fenwick & West LLP

[57] ABSTRACT

A graphics system includes triangle-engine for real-time rendering into a displayable frame-buffer of image data derived from vertex-based deferred instructions. The system uses homogeneity values (1/w values) for z-buffer-like occlusion mapping as well as for texture mapping. Depth resolution is enhanced for both occlusion mapping and texture mapping by representing (1/w), (u/w) and (v/w) values in a block-fixed format.

81 Claims, 22 Drawing Sheets

*FIG. 15* (STP)

INVERSE Z-BUFFER AND VIDEO DISPLAY SYSTEM HAVING LIST-BASED CONTROL MECHANISM FOR TIME-DEFERRED INSTRUCTING OF 3D RENDERING ENGINE THAT ALSO RESPONDS TO SUPERVISORY IMMEDIATE COMMANDS

This is a Continuation-in-Part of U.S. patent application Ser. No. 08/438,860, filed May 10, 1995, entitled CONFIGURABLE VIDEO DISPLAY SYSTEM HAVING LIST-BASED CONTROL MECHANISM FOR TIME-DEFERRED INSTRUCTING OF 3D RENDERING ENGINE THAT ALSO RESPONDS TO SUPERVISORY IMMEDIATE COMMANDS, by inventors Adrian Sfarti, Robert Laker, Adam Malamy, Donald M. Gray, III, and Nicholas Baker, incorporated herein by reference.

BACKGROUND

1. Field of the Invention

The invention relates generally to digital image processing and the display of digitally generated images.

The invention relates more specifically to the problem of creating raster-based, high-resolution animated images in real time with the aid of a 3D rendering engine.

2. Description of the Related Art

In recent years, the presentation and prepresentation processing of visual imagery has shifted from what was primarily an analog electronic format to an essentially digital format.

Unique problems come to play in the digital processing of image data and the display of such image data.

The more prominent problems include providing adequate storage capacity for digital image data and maintaining acceptable data throughput rates while using hardware of relatively low cost. In addition, there is the problem of creating a sense of realism in digitally generated imagery, particularly in animated forms of such imagery.

The visual realism of imagery that is generated by digital video game systems, by simulators and the like can be enhanced by providing special effects such as, but not limited to, making real-time changes in the orientation and/or shadowing and/or highlighting of various objects, smoothing or sharpening the contours of various objects at different times, and so forth.

Visual realism can be further enhanced by projecting 3-dimensional (3D) surface definitions from a model space onto a 2-dimensional (2D) image plane and rotating, scaling or otherwise manipulating the 3-dimensional surface definitions in real time prior to their projection onto the 2-dimensional image plane.

Visual realism can be additionally enhanced by increasing the apparent resolution of a displayed image so that it has a smooth photography-like quality rather than a grainy disjoined-blocks appearance of the type found in low-resolution computer-produced graphics of earlier years.

Visual realism can be even further enhanced by increasing the total number of different colors and/or shades in each displayed frame of an image so that, in regions where colors and/or shades are to change in a smooth continuum by subtle degrees of hue/intensity, the observer perceives such a smooth photography-like variation of hue/intensity rather than a stark and grainy jump from one discrete color/shade to another.

Although bit-mapped computer images originate as a matrix of discrete lit or unlit pixels, the human eye can be fooled into perceiving an image having the desired photography-like continuity if the displayed matrix of independently-shaded (and/or independently colored) pixels has dimensions of approximately 500-by-500 pixels or better at the point of display and a large variety of colors and/or shades on the order of roughly 24 bits-per-pixel or better.

The human brain can be tricked into perceiving a displayed 2-dimensional moving image as being somewhat 3-dimensional in nature if a sufficient number of cues are generated in real-time to support such perception. These cues include but are not limited to:

(a) drawing images along angled lines of perspective to create a sense of depth;

(b) shading images to simulate 3-dimensional lighting effects including shadows and reflections;

(c) allowing displayed objects to rotate so as to show their side and back surfaces;

(d) allowing displayed objects to appear to move forward and back relative to the viewer by appropriately scaling their size; and (e) allowing displayed objects to move in front of one another as if they were 3-dimensional and had all the associated properties of the real objects they portray.

The above set of visual cues imply that each rotating object having reflective surfaces needs to have its correspondingly surrounding 3D visual environment wrapped about its surface, and distorted in accordance with the contours of its surface in order to create the illusion of 3-dimensional reflection. The above set of visual cues further presuppose that translucent moving objects passing in front of other objects should appear to translucently pass through the imagery of the object behind.

Carrying out all these 3D cuing operations in real-time can be quite complicated and difficult, particularly if an additional constraint is added that the implementing hardware has to be of relatively small size and low cost.

Compound systems are being proposed that have real-time 3-dimensional object defining and manipulating means as well as other means that contend for access to a shared system memory and for access to the shared resources of system CPU's.

The compound nature of such systems places a strain on system memory to deliver (or to store) time-critical data to (or from) devices or modules that need to operate on a real-time basis.

An example of time-critical data is video data that may be needed on a real-time basis, within the time window of a horizontal raster line for example, in order to provide real-time display for an interactive game or an interactive simulator.

The compound nature of such systems also increases the likelihood that a minor software error (bug) in one software module will induce an unintended write to a system critical register or memory location and bring the whole system down.

The proposed compound systems have so many hardware and software functionalities that they strain the throughput capabilities (data bandwidth) of the memory-access management subsystem and complicate the tasks of the memory-access management subsystem. The memory-access management subsystem now needs to arbitrate among a larger number of contenders for memory access.

The added functionalities of the proposed compound systems additionally strain the throughput capabilities and complicate the tasks of any system CPUs that have to supervise the activities of the image manipulating and rendering means on a real-time basis. (The term "CPUs" refers here to a general-purpose data processing subsystem which may be implemented either in a centralized unit format, as for example a single truly-central processing unit; or which may be implemented in a plural units format, such as in a parallel processing system.)

A system architecture is needed for reducing contention among plural potential requesters for system memory access.

A system architecture is needed for reducing contention by plural software modules for access to the limited resources of system CPUs.

A methodology is needed for simultaneously satisfying the needs of multiple, time-critical processes such as those of a real-time video display subsystem and those of a real-time animation subsystem.

A methodology is needed for reducing the likelihood that a wayward software or hardware module will bring down the entire system by unintentionally writing to a system critical register or memory location.

In general, a goal of 3D computer graphics is to create a 2D projection on a cathode-ray tube ("CRT") screen of a three-dimensional model as viewed from a predetermined viewpoint in three-dimensional model space. One aspect of such a projection is the need to keep track of which objects are in front of other objects, and which are behind, when viewed from the viewpoint. This knowledge is necessary to ensure that, for example, a building in the foreground will properly occlude a building in the distance. This aspect of the rendering process is known as "occlusion mapping".

One popular technique to perform occlusion mapping uses a construct known as a "z buffer". A standard z buffer linearly associates a number called the "z value", representing the distance from the observer (depth in the scene relative to a projection plane), with each pixel drawn on the screen. When a first object is projected, attributes of its pixels (such as color) are stored in a "frame buffer", and the z value associated with each pixel is separately stored in the z buffer. If a second object from the model subsequently projects onto the same pixel, the new object's z value is compared against the z value already stored for that pixel, and only if the new value is less (representing an object closer to the viewer) will the new pixel be drawn.

FIG. 8 illustrates the rendering of Object 1 and Object 2 at different distances or z values from a projection plane or image plane, considered for purposes of illustration to be located at z=0 in the model space. In FIG. 8, object 1 is projected and rendered first. Object 2 is rendered second. The z buffer prevents pixels of object 2 from being written to the frame buffer in the locations where object 1 has already written pixels with a lesser z value. Thus, object 2 appears in the ultimately displayed image to be behind object 1, as desired.

Z buffers can be implemented in either hardware or software. The numbers stored can be either floating point or integer values. Any number of bits can be devoted to the z values. In general, the more bits that are devoted to storing the z value, the finer the resolution in distance that can be achieved. Because z values represent the depth of an object in a scene, z values can be more generally referred to as "depth values", and z-buffers can be more generally referred to as "depth buffers". Also, in particular implementations, depth values can be increasing with increasing depth, or can be decreasing with increasing depth. Since the invention is not restricted to one such implementation or the other, depth values sometimes are referred to herein as being "farther" or "nearer" to the viewpoint than other depth values.

Another feature of 3D graphics systems is the ability to map a texture onto an object with a perspective-correct mapping, as seen in FIG. 9. In the simplest form, a texture can be thought of as a decal that is applied to the surface of an object, such as a design on the surface of a cube. In FIG. 9, 902 designates the cube in a model space 903 and 904 designates "texture space" containing a "texture map" 905 which is to be applied to all three visible surfaces 906, 908 and 910 of the cube as part of the rendering process. Since the surface 906 of the cube 902 is parallel to the projection plane (considered for purposes of this illustration to be at z=0 in the model space 903), the texture map 905 can be applied directly onto that surface. Surface 908 is at an angle to the projection plane, so a perspective transformation of the texture map 905 is needed before applying it to the surface 908. Such a map, as transformed, is illustrated at 912. Similarly, a different perspective transformation of the texture map 905 is required before applying it to the surface 910; such a map, as transformed, is illustrated at 914. The final image, as projected onto the projection plane and with perspective-correct texturing applied, is illustrated as 916 in FIG. 9. It can be seen that the shape of the decal on the side of the box is warped as the box is rotated to preserve the illusion of three-dimensionality in the 2D projection.

In order to achieve perspective-correct texture mapping, graphics rendering systems traditionally perform projection calculations using a 4×4 matrix representing the transformation to be performed. 4×4 matrices are used also for many other kinds of transformations in the 3D model space, all as discussed in Foley et al., "Computer Graphics, Principles and Practice," 2d. ed. (Addison-Wesley: 1991), especially at pp. 213–226 and 253–281. The entire Foley text is incorporated herein by reference.

4×4 matrix transformations depend on the representation of points in the 3D model space using "homogenous coordinates", in which a fourth coordinate, w, is added to the traditional three spatial coordinates x, y and z. Two sets of homogenous coordinates are considered to refer to the same point in 3-space if one is a multiple of the other. Thus (x,y,z,w) refers to the same point as (x/y, y/w, z/w, 1) in which representation the fourth coordinate ("1") can be dropped. The process of dividing through by w (and optionally dropping the last coordinate) is referred to herein as the process of "homogenizing" the point, after which the representation is referred to as an "homogenized" representation of the point. Similarly, the process of multiplying through by any non-zero and non-unity w value is referred to herein as the process of "de-homogenizing" the point, after which the representation is referred to herein as "de-homogenized". The value (1/w) is referred to herein as an "homogeneity factor", because the point is "homogenized" by multiplying each of the coordinates by (1/w). The value w is referred to herein as an "homogeneity divisor", because the point is homogenized by dividing each of the coordinates by w. The term "homogeneity value" as used herein includes both homogeneity factors and homogeneity divisors, since it does not imply the function (e.g. multiplication or division) by which it is to be applied to the other coordinates to achieve homogeneity. As will be seen, the homogeneity value for a point is related to its depth in the scene.

Thus the projection calculations traditionally performed naturally yield a homogeneity value ((1/w) or w) for each point projected onto an image plane. Traditional texture mapping, which maps a texture onto a planar polygon of the model, utilizes the homogeneity values as follows.

Initially, each vertex of the model space polygon is assigned, in addition to attribute values and its model space coordinates (x,y,z), a pair of depth-independent coordinates (u,v) into a depth-independent texture space. The texture space is considered herein to be "depth-independent" because it is defined with only two Cartesian coordinates (u and v). For each vertex, homogenized image space coordinates (x/w, y/w) are calculated using homogenous transformations. This calculation yields the homogeneity value 1/w for the vertex, which is applied to the depth-independent texture space coordinates (u,v) for the vertex to generate "depth-adjusted" texture coordinates (u/w, v/w). These can be thought of as coordinates into a "depth-adjusted texture space".

Next, for each i'th pixel of the polygon as projected onto the image plane, in addition to calculating its new image space coordinates $(x_i/w_i, y_i/w_i)$ by interpolation, the depth-adjusted coordinates $(u_i/w_i, v_i/w_i)$ into the depth-adjusted texture space are also calculated by interpolation. The homogeneity value $1/w_i$ is also interpolated for the i'th pixel from the homogeneity values of the polygon vertices. Because the predefined texture map is indexed in depth-independent texture space and not depth-adjusted texture space, the texture coordinates $(u_i/w_i, v_i/w_i)$ for the i'th pixel are then converted back to dept-independent texture space by multiplying through by $w_i$. This yields depth-independent coordinates $(u_i, v_i)$ into depth-independent texture space. The corresponding texture value $T_i$ can then be retrieved and/or calculated from the predefined texture map and applied to the polygon as projected onto the image plane.

In general, at least for one-point perspective projections onto an image plane perpendicular to the z axis, the homogeneity value produced by the 4×4 matrix calculation is related to the depth coordinate z of the point in model space by a linear relationship of the form $$w = \alpha z + \beta,$$

where α and β are constants which depend on such variables as the position of the image plane on the z-axis in model space and the chosen center of projection (COP). For projections onto the plane z=d with COP=(0,0,0), it can be shown that w=z/d.

But while this simple relationship between z and w is well known, conventional systems do not use homogeneity values for occlusion mapping, only for texture mapping. In order to maximize texture-mapping resolution in a given graphics rendering system, most conventional systems texture map each polygon separately. This enables the homogeneity values for the polygon (including its vertices and each of its interior pixels) to be scaled so as to occupy the full range of numeric values that can be carried by the hardware. The above texture mapping procedure is performed using these full-scale (1/w) values. Accordingly, while the homogeneity values of different surface regions of the polygon might have been initially related to the depth of the surface region in the overall rendered scene, after scaling, they are related only to their depths in the scene relative to the other surface regions of the same polygon.

Thus, a traditional 3D graphics system computes two parameters for each pixel, a z value which is used in the z buffer, and a 1/w value which is used for perspective-correct texture mapping. The two are treated entirely independently. Additional complexity and cost is required in computing both the z value and 1/w value. Further, computing both values, rather than one of the values, limits the speed with which an image may be rendered and displayed. Therefore, it is desirable to provide an apparatus and method in which only one of the two values need be calculated, but without significant loss of precision in either the texture-mapping or occlusion mapping operations.

SUMMARY OF THE INVENTION

The above-mentioned problems are overcome in accordance with the invention by providing a graphics system that has a multi-port memory subsystem storing image-rendering control lists and that further has a real-time programmably-configurable render-engine (also referred to herein as the 'triangle-engine' or 'TE') coupled to the memory subsystem and responsive to the stored image-rendering control lists as well as to supervisory immediate control commands issued by a supervisory CPU or the like.

A triangle-engine in accordance with the invention reduces the load on system memory and on system CPU's by periodically fetching compact render-control lists and source image data from the memory subsystem on a list basis and by processing the fetched information without requiring continuous real-time intervention by system CPU's. This frees the system CPU (or CPU's) for managing other time-critical tasks of the graphics system.

One embodiment of a triangle-engine (TE) in accordance with the invention includes an addressable register set that is programmable by one or both of a system CPU and a memory-resident control-list for programmably reconfiguring the TE in real-time to perform various image rendering operations such as surface color fill, surface texturing and hiding of overlapped surfaces.

The one embodiment of the triangle-engine (TE) includes a linked-list instructions-fetch means (also referred to herein as a 'vertex-fetch' module or 'VTX') for fetching from system memory, a compact set of draw instructions that are based on 3-dimensional vector-point models of object surfaces to be rendered and displayed.

'Rendering' refers herein to the step of writing data into a frame-buffer portion (FB) of memory irrespective of whether that FB is the currently-being-displayed 'active' FB or a later-to-be-displayed alternate FB.

'Displaying' refers herein to the step of reading data from an active frame-buffer and transforming the read data into a video signal for viewing on a video monitor or the like.

The TE embodiment further includes control derivation means (also referred to herein as a 'set-up' module) for deriving span-walking control data from the vector-based modeling data fetched by the vertex module so that lines and/or areas bounded by vertex points may be stepped across and so that bounded areas may be filled with corresponding colors in accordance with a bi-linear interpolation scheme.

The TE embodiment additionally includes an edge-walker module (EWK), responsive to edge-walking control data (supplied from the set-up module or elsewhere), for defining by means of interpolation, various image-defining parameters distributed at points along a first polygon edge (line) having a respective set of two pre-defined vertex points, and for defining by means of similar interpolation, a subset of similar parameters distributed at points along a second polygon edge (line) having a respective set of two pre-defined vertex points. (In one embodiment, the point parameter subset of the second walked edge consists of only x and y for each point while the parameter set of the first walked edge includes, in addition to x and y, further point parameters, 1/w, R, G, B, A, u/w, and v/w.) The edge-walker module also determines which frame-buffer pixels are to be considered 'inside' a walked polygon and which are to be deemed 'outside'. Rendering activities for a given polygon are limited to frame-buffer pixels 'inside' the walked polygon. In an embodiment, the polygons which the TE can render are limited to triangles.

The image-defining parameters (also sometimes referred to herein as attribute values) of points of a walked triangle include but are not limited to:

(a) native-surface color component values such as R, G, and B that are respectively attached to each point;

(b) a blending factor referred to herein as 'A' that is respectively attached to each point and is used for blending the native-surface color component values with respective prior frame-buffer values and/or respective texturizing values;

(c) depth-adjusted texture mapping coordinates that are respectively attached to each point and are referred to herein as 'u/w' and 'v/w', where u and v are coordinates of a bitmapped 2-dimensional texture image defined using depth-independent coordinates, the texture image having its own R, G, B, and/or A values for each of its points; and (d) a homogeneity factor referred to herein as '1/w'.

The TE additionally includes a span-walker module (SWK), responsive to span-walking control data (supplied from the set-up module and/or from the edge-walker module or elsewhere), for defining by means of bi-linear interpolation, various image-defining parameters along a third line having two pre-defined endpoints. The endpoints of the third line are usually defined by the edge-walker module as the edge-walker module steps pair-wise to the next set of points along the vertex-defined first and second edges of the triangle. The image-defining parameters for interior points (IP) of the triangle that are similar to those of the edge-walker module (R, G, B, A, u/w, v/w and 1/w). Span-walking may be thought of as a pre-render parameter filling operation for an area between two edge lines of the polygon.

The TE embodiment additionally includes a texture-mapping module (TXT), responsive to span-walker result data (supplied from the span-walker module or elsewhere), for defining what texture pixel(s) are to be blended, if at all, with the native pixels of a span-walked area.

The TE embodiment additionally includes a data blending module (DBL), operatively coupled to the span-walker module (SWK), to the texture-mapping module (TXT), to a frame-buffer (FB) and to a depth buffer (1/w-buffer), for blending together the outputs of the SWK and the TXT and the current contents of the FB and, depending on a programmably-definable comparison of a current-pixel depth-value with a corresponding value already in the 1/w-buffer, writing the blended value back to the frame-buffer (FB).

A render-control list is provided within system memory in accordance with the invention for controlling the TE. The render-control list includes a block-header that defines the size (instructions-count) of a succeeding list of instructions and the nature of the instructions (e.g., long-format versus short-format).

The block-header includes a hardware version-number field for identifying versions of hardware that may or may not execute the succeeding list of instructions.

The block-header also includes a vertex replace-mode field for controlling automatic generation of 'strip' and 'fan' forms of triangle chains.

The block-header further includes function enable/bypass fields for programmably enabling on a block-by-block basis, a shading function that applies native shades to portions of the to-be-rendered area, a texturing function that applies textures to portions of the to-be-rendered area, and a perspective weight and use function that applies normalized perspective values to portions of the to-be-rendered area and that uses those normalized perspective values for occlusion mapping. Processing time can be shortened by bypassing those functions that have no substantial effect on the final rendering. Data structures within the block contract accordingly.

For example, if all texture blend factors $A_t$ of a to-be-applied texture are such that the texture bitmap will essentially hide all of the surface native coloration, then the native-surface shading function should be bypassed to avoid wasting time on computations that are of no essential consequence to the final rendering A variety of rendering effects can be obtained by, for example, modulating the various fields of each block-header. Further rendering effects can be obtained by re-arranging the order in which vertex information is listed in the block. Yet further rendering effects can be obtained by reconfiguring the settings of the control register set in the triangle-engine (TE). These and other options will become apparent in the detailed description below.

One of the notable features of the triangle-engine (TE) is that certain of its control registers may be modified only by a command-giving device (e.g., CPU) that is deemed to be a 'privileged supervisor' as opposed to another accessing device that is not privileged. If a non-privileged device tries to modify a privileged register, an access violation interrupt is generated by the TE. This prevents wayward software from taking control of the TE (via the deferred instructions path) and directing the TE to write over unintended, crucial areas of system memory, thereby crashing the system.

In an aspect of the invention, the 1/w value is used instead of a z value to implement a depth buffer ("1/w buffer") which provides the same occlusion-mappingfunctionality as a traditional z buffer. Significantly, this allows a hardware or software graphics system to handle only one value, 1/w, instead of both a 1/w and a z value, resulting in a saving in complexity which in turn results in a cheaper and/or smaller and/or faster graphic system.

Since the 1/w buffer uses numbers that are roughly inversely proportional to z values, instead of linearly proportional, it is not immediately apparent that the 1/w buffer will perform the intended function of discriminating between objects that are at different distances from the observer. A scaling technique is used and described below.

Use of homogeneity value 1/w also restricts manipulation of the 1/w parameter for optimal usage of hardware data path widths for texture mapping. A hardware and software protocol that circumvents the problems caused by these restrictions is also provided and described below.

The use of the homogeneity value for occlusion mapping is better illustrated with reference to FIG. 10, which illustrates conventional rendering of objects 1002 and 1004 from a model 1006 using a 16-bit canonical z buffer. With 16 bits, the decimal numbers 0 through 65535 are represented. Minimum and maximum z values or distances are defined such that all objects that will be included in the scene will be between these two limits. These distances are known as a "hither" value and a "yon" value. The hither z is assigned a z buffer value of 0, and the yon z is assigned a z buffer value of 65535. The interval between hither and yon is split into 65536 pieces of equal size. The z value of any point on any object in the scene is rounded to the nearest integer between hither and yon. For example, a point that was exactly half way between hither and yon would be given the z value of 32768.

The resolution of a z buffer is defined as the smallest separation in z that can be distinguished in the z buffer. For example, in FIG. 10, assuming that the hither value is at Z=0 and the yon value is at Z=66535, there may be two points of interest in the scene, one at Z=1105, the other at Z=1105.4. Both of these points will be represented with a value of 1105 in the z buffer, since there are only enough bits (16 in this example) to represent integers.

The resolution of the z buffer can be increased by using more bits in the z buffer, but only at the expense of cost, speed and complexity of the system.

The resolution can be increased also by reducing the distance between hither and yon, but then the nearest and farthest objects of the model will be cut off.

In order to use homogeneity factors for occlusion mapping, the 1/w parameter must provide the same information as the z parameter for the purposes of determining the relative distances of objects along the z-axis. Additionally, the resolution of the 1/w buffer must be sufficient for use in a 3D graphics system.

The assertion that the 1/w buffer provides the same functionality as the z buffer is easily proven by noting that $(1/w)$ is related monotonically to z because $(1/w)=1/\alpha z\beta$. ($\alpha$ and $\beta$ are fixed for a given projection.) This implies some restrictions on the handling of 1/w, which are discussed below. If the restrictions are observed, as in the equation above, the 1/w parameter can be used to discriminate objects in z space just as well as the z parameter can.

In order to resolve the 1/w buffer resolution problem, it is first necessary to note that the resolution of the 1/w buffer is not the same as the resolution of the z buffer. FIG. 11 illustrates the differences in resolution between a typical z buffer and the 1/w buffer. The resolution of the z buffer is constant throughout its range. Hence the term "linear" z buffer. This is illustrated as horizontal line 1102 between the hither and yon z-values in the left-hand graph in FIG. 11. The resolution of the 1/w buffer, however, is not constant over the range of values between 0 and 1, but rather decreases as z increases.

For example, assume that a 16-bit 1/w buffer is implemented. All 1/w values will fall in the range of 1.0 (the nearest point) to about 0.0 (the farthest point). The range between 1.0 and 0.0 is divided into 65536 equal parts, just as with the prototypical z buffer. Thus, each increment in the 1/w buffer represents $1/65536$ of the range between 1.0 and 0.0, which is $1.0/65536 = 0.000015$.

Table I shows the 1/w values for pairs of adjacent z values. The third column shows the delta between the 1/w value for particular pairs of rows in the table. Note that the deltas in 1/w get smaller for constant deltas in z as z increases.

TABLE I 16-bit 1/w buffer, hither at z = 1

| z value | 1/w value | delta 1/w |
|---------|-----------|-----------|
| 1 | 1 | 0.5 |
| 2 | 1/2 = 0.5 | |
| 10 | 1/10 = 0.1 | 0.01 |
| 11 | 1/11 = 0.09 | |
| 100 | 1/100 = 0.01 | 0.0001 |
| 101 | 1/101 = 0.0099 | |
| 1000 | 0.001 | 0.00001 |
| 1001 | 0.000999 | |

Since each increment in the 1/w buffer represents a numeric interval of 0.000015, it can be seen from the table that approximately $0.0001/0.000015 = 7$ different depths can be distinguished between z=100 and z=101. In other words, the resolution of the 1/w buffer at z=100 is approximately $1/7 = 0.14$. For example, imagine that the units of z are measured in feet. At a depth of 100 feet into the scene, objects that are separated by more than 0.14 feet (about two inches) can be resolved. For objects which are less that two inches apart depthwise, it will be impossible to determine with the plain 1/w buffer which object is in front.

In contrast to the above, the delta in 1/w between z=10 and z=11 is about $0.01/0.000015 = 700$. This means that 700 different depths can be distinguished between z=10 and z=11 using the 1/w buffer. Again, if units in z are interpreted as feet, then at a depth of 10 feet, objects that are separated by more than $1/700$ or 0.0014 feet (or about $3/160$ of an inch) can be resolved. The resolution at z=10 therefore is much greater than the resolution at z=100.

Thus, the resolution of the 1/w buffer decreases with increasing z, as shown in FIG. 11.

In FIG. 11, horizontal line 1104 indicates an "acceptable resolution" for a 3D graphics system. Resolution better than the resolution represented by this line (i.e., above this line in FIG. 11) results in satisfactory quality of rendered images, whereas resolution below this line is unacceptable. The exact location of the line 1104 depends on the design goals of the system. In the 1/w buffer, because resolution decreases with increasing z, the resolution may drop below the acceptable level above some z values.

To a first approximation, it will be appreciated that a depth buffer which decreases in resolution with increasing distance is not necessarily bad. In fact, it meshes well with human vision in terms of things near and far. Human beings tend to have better depth perception for objects close by than for those far away. A form of visual realism is therefore inherently created by using a digital word of finite bit width for storing the depth factor 1/w. Its resolving ability inherently mimics the ability of the human vision system to see depth perception at better resolution close up than far away. In other words, the true level of acceptable resolution might vary with depth similarly to the 1/w buffer resolution (see dotted curve 1108 in FIG. 11). The acceptable level of resolution curve 1108 may or may not cross the actual 1/w buffer resolution curve 1106.

However, the similarity of the acceptable level of resolution curve to the actual 1/w buffer resolution curve 1106 really applies only in scenes intended to represent great depths (e.g., depths measured in hundreds of feet). In scenes depicting models extending only a few inches or feet in depth, human vision would resolve all such depths equally. The acceptable level of resolution curve for such a scene would more likely be flat, such as line 1104. While the concept of a plain 1/w buffer works well for many scenes, therefore, it would be desirable to enhance the concept to provide acceptable depth resolution in all scenes.

Accordingly, in another aspect of the invention, a new method of normalizing and storing the 1/w values in the 1/w buffer that provides increased resolution over a desired range of z values is provided. The following discussion will focus on a hardware embodiment of normalizing a 16 bit 1/w buffer. However, the techniques are applicable to software embodiments and also hardware embodiments with different size 1/w buffers.

The key to the normalization technique is to consider the entire range of 1/w values to be made up of a number of sub-ranges. In general, these sub-ranges do not need to be distinct. Because values in digital hardware are quantized, it will be appreciated that each of the 1/w sub-ranges contains only discrete values.

Then each 1/w value can be represented with two numbers (e,s), where e, referred to herein as the "w-range" value, indicates which of the sub-ranges to look in, and s, referred to herein as the significand, indicates which discrete value within the e'th sub-range is the desired 1/w value.

In an embodiment, four sub-ranges are used, such that e can take on values 0–3. Also in the embodiment, the discrete values within each sub-range divide the sub-range equally, and instead of having to look up the s'th value in the e'th sub-range, s is considered to range from 0 to 1 and the 1/w value represented by (e,s) can be calculated from e and s according to the function $1/w = s \times 2^{-be}$, where b is a parameter which can in general vary with e. Still further, b is chosen in the embodiment as b=3 for all e, such that $1/w = s \times 2^{-3e}$. Thus if 16 bits are available for storing depth values in a 1/w buffer, the 16 bits might be divided as shown in Table II:

TABLE II

EXAMPLE BLOCK-FIX REPRESENTATION

| e (2 bits) | | s (14 bits) | |
|---|---|---|---|
| 15 | 14 | 13 | 0 |

The representation of 1/w values in the form (e,s) is referred to herein as a "block-fix" representation. Block-fix representation of numbers is known in general, but it has not previously been used to represent depth values for occlusion mapping, or to represent homogeneity values for texture mapping. Full floating point representation has been used in the past to represent homogeneity values for texture mapping, as has full fixed point representation. Similarly, full floating point representation has been used in the past to represent linear z-buffer values, as has full fixed point representation. Full floating point representation of 1/w values as described herein would make the hardware prohibitively expensive for low-cost implementations. As explained in more detail below, the use of a block-fix representation achieves nearly the same benefits as full floating point representation, and yields surprising advantages when used for texture mapping in particular.

In the embodiment, 1/w values are passed to the triangle engine in full floating point format (8-bit exponent and 24-bit mantissa). The full 1/w range is 0 to 1. Table III shows how various numbers are represented in traditional fixed-point format, and in the block-fix representation or format according to the present invention. Notice that for smaller numbers, many significant bits are lost in the fixed-point representation because of the leading 0 bits. The block-fix format allows these leading bits to be represented in the exponent, leaving more room in the significand for significant bits of data.

TABLE III

| Range | sample 1/w | Fixed-Point Representation | Block-Fix Representation | |
|---|---|---|---|---|
| | | | w-range | significand |
| $\frac{1}{8} \leq \frac{1}{w} < 1$ | .5 | .1000000000000000 | 00 | .10000000000000 |
| | .25 | .0100000000000000 | 00 | .01000000000000 |
| | .125 | .0010000000000000 | 00 | .00100000000000 |
| $\frac{1}{64} \leq \frac{1}{w} < \frac{1}{8}$ | .0625 | .0001000000000000 | 01 | .10000000000000 |
| | .05 | .0000110011001100 | 01 | .01100110011001 |
| $\frac{1}{512} \leq \frac{1}{w} < \frac{1}{64}$ | .01 | .0000001010001111 | 01 | .10100011110101 |
| | .005 | .0000000101000111 | 10 | .01010001111010 |
| $\frac{1}{w} < \frac{1}{512}$ | .001 | .0000000001000001 | 10 | .10000011000100 |
| | .0005 | .0000000000100000 | 10 | .01000001100010 |
| | .0001 | .0000000000000110 | 11 | .00001101000110 |

The resolution of the 1/w buffer with normalized 1/w values is shown as curve 1202 in FIG. 12. Because two bits are devoted to the exponent, the initial resolution for a normalized 1/w buffer is less than that of the fixed-point ("plain") 1/w buffer having the same data width. As the z value increases, the resolution falls off with the same kind of curve shown as 1106 in the graph in FIG. 11. However, when the z value gets large enough to switch to the next 1/w sub-range, the resolution is bumped back up, and starts falling off again. After all possible sub-ranges have been used, the resolution proceeds to decrease monotonically.

Note that as z increases and approaches the beginning of the next sub-range in 1/w, there is no inherent reason that e be incremented and the next sub-range be in fact used. Instead, it is actually desirable in certain circumstances to remain in the same sub-range (albeit with decreasing depth resolution). This is possible because the sub-ranges chosen for the block-fix representation in the present invention overlap (i.e., are not distinct). Thus a single (1/w) value can be represented in the present embodiment with more than one (e,s) pair, although depth resolution is best in the representation in which e is highest.

Although the specific description in the preceding paragraphs refer to a 16-bit depth buffer, with two bits used for e and 14 bits used as the significand, it will be readily apparent to those skilled in the art that 1/w buffers of different bit widths may be implemented. Further, different subsets of the total bits may be assigned to the e and s fields. The choice will depend on the required precision/resolution of the system.

In a typical 3D graphics system that does not use homogeneity values for occlusion mapping, there is some freedom to adjust the 1/w parameter associated with each pixel independently of the z value. Specifically, perspective-correct texture association works well if each individual object (e.g., triangle) in a scene is first scaled with respect to 1/w such that the 1/w value of the nearest point (the point with the smallest z value) is 1.0. The scaling is accomplished by multiplying 1/z by a constant j, where j can be determined differently for each object in the scene. FIG. 13 illustrates scaling a 1/w parameter on an object by object basis. The advantage of such scaling is that the precision requirements of the software or hardware that implement the texture calculations are reduced, since numbers have been scaled to their optimal values.

When using the homogeneity value for occlusion mapping as well, it is no longer permissible to scale $1/w$ independently for each object. Instead, any scaling which takes place must be uniform for all objects subject to occlusion mapping. Otherwise, it would no longer be possible to determine the relative depths of one object to the other, only the relative depths within a single object. FIG. 14 illustrates using a constant scaling factor k according to the present invention.

Because of this restriction, the use of homogeneity values for both occlusion mapping and texture mapping increases the precision requirements for the hardware or software that handles the texture association calculations. In yet another aspect of the invention, the effect of this increase is minimized through the use of a technique to reduce the complexity of these calculations, as described below.

At each i'th image region (e.g. pixel), in a typical 3D graphics system, a pair of texture coordinates $u_i$ and $v_i$ are calculated to determine what region(s) of texture space (e.g. which texel(s)) should be mapped onto this pixel. The calculation is as follows, where $1/w_i$, $u_i/w_i$ and $v_i/w_i$ are already known for each pixel:

$$u_i = \frac{u_i/w_i}{1/w_i}, \quad v_i = \frac{v_i/w_i}{1/w_i}$$

However, if each of the $1/w_i$ have been normalized using the block-fix representation described above, this calculation is complicated by requiring $1/w_i$ to be de-normalized prior to determining $u_i$ and $v_i$.

The requirement for de-normalizing the $1/w$ value can be removed if the u/w and v/w values are also normalized by the same amount as $1/w$ for each vertex prior to rendering each triangle. The process of normalization can be thought of as scaling by a constant m. (In the present embodiment, $m=2^{3e}$.) In this case, at each pixel we have $1/w_i'=m(1/w_i)$, and $u_i/w_i'=m(u_i/w_i)$ and $v_i/w_i'=m(v_i/w_i)$. If we perform the same calculations as before, namely:

$$u_i = \frac{(u_i/w_i')}{(1/w_i')} = \frac{m(u_i/w_i)}{m(1/w_i)} \text{ and } v_i = \frac{(v_i/w_i')}{(1/w_i')} = \frac{m(v_i/w_i)}{m(1/w_i)},$$

it is apparent that the constant of normalization, m, by virtue of its presence in both the numerator and denominator of the calculation above, cancels out. The result of the operation is $u_i$ and $v_i$, as desired. The need for denormalizing $1/w$ for the calculation of texture coordinates has been eliminated.

Surprisingly, therefore, the use of the inventive block-fix representation to enhance resolution when homogeneity values are used for occlusion mapping, does not necessarily increase hardware complexity for the use of the same block-fixed homogeneity values for texture mapping. Moreover, an additional benefit of the normalization of u/w and v/w at the triangle vertices is that more precision is maintained in these parameters during interpolation, in the same way that normalizing $1/w$ increases its precision as described above.

The above and other features of the graphics system will become clearer by referring to the below detailed description.

BRIEF DESCRIPTION OF THE DRAWINGS

The detailed description below makes reference to the accompanying drawings, in which.

DETAILED DESCRIPTION

Figure 1A:
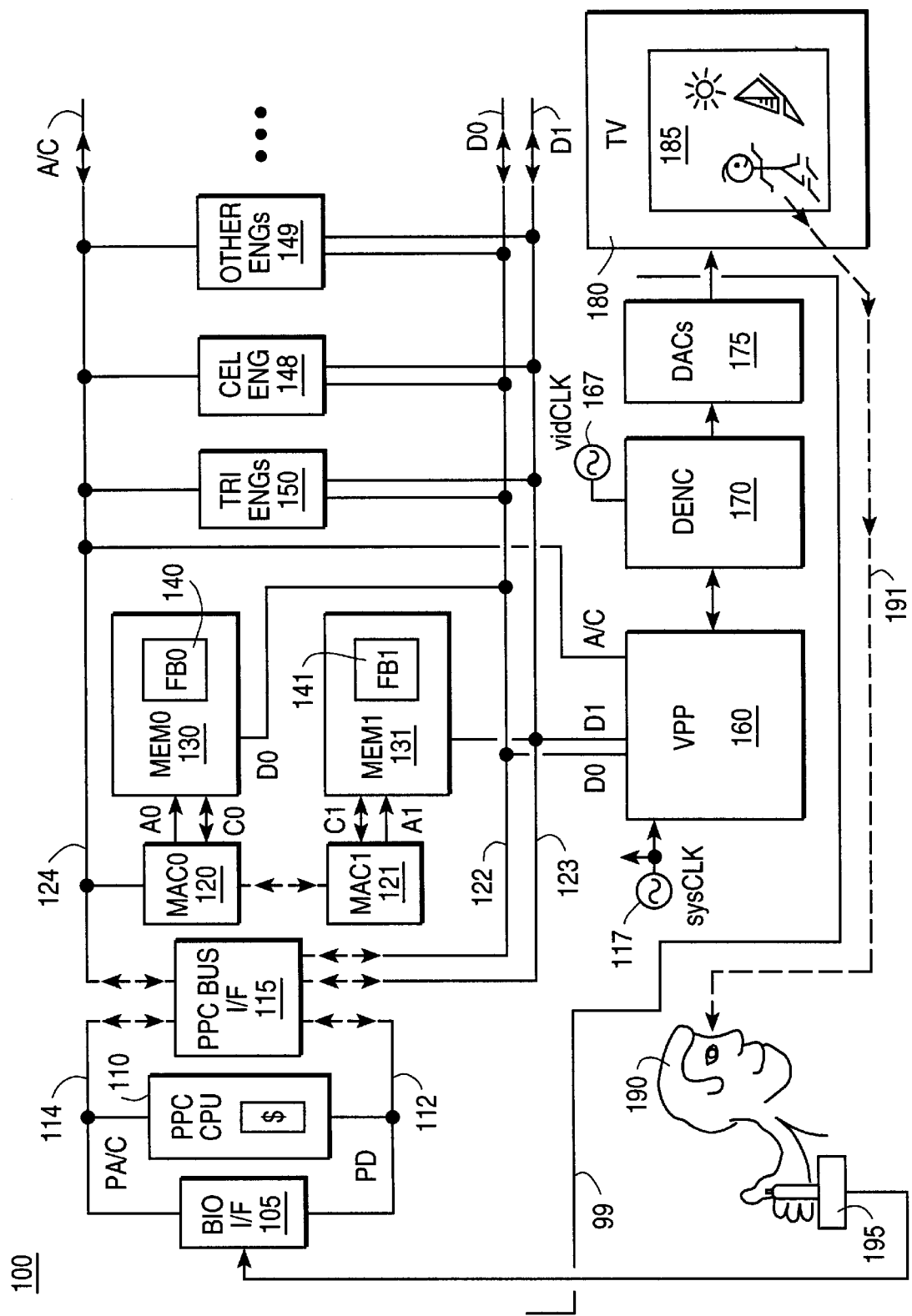
FIG. 1A is a block diagram of a graphics system in accordance with the invention that includes a programmably-configurable triangle-engine (TE)

Referring to FIG. 1A, a block diagram of an image processing, rendering and display system 100 (graphics system 100) in accordance with the invention is shown.

A key feature of system 100 is that it is relatively low in cost and yet it provides mechanisms for handling complex, 3-dimensional (3D) image scenes in real time and displaying them such that they appear to have relatively high resolution and a wide variety of colors and/or shades per displayed frame.

This feature is made possible in part by including within the system 100, a triangle-engine (TE) 150 that renders image data into a frame-buffer (FB) of system memory on a real-time basis.

This feature is further made possible by including within the system 100, an Image-Enhancing And Rendering Subsystem (I-EARS) comprised of: a video post-processor (VPP) 160, a digital encoder (DENC) 170, and a plurality of digital-to-analog converters (DAC's) 175.

The triangle-engine (TE) 150 and the image-enhancing and rendering subsystem (I-EARS) 160-170-175 may each be formed within one integrated circuit (IC) chip or may be distributed across a few IC chips. In one particular embodiment, elements 150, 160, 170 and 175 are implemented within one integrated circuit (IC) chip together with elements 115, 120, 121, 122, 123, 124, and 148 of FIG. 1A. This one IC chip is referred to herein as the 'I-EARS chip'.

Within the I-EARS group of elements, 160-170-175, there is provided one or more of: a set of user-programmable Color LookUp Table modules (CLUT's, not shown) for defining on a per scanline basis, a palette of colors available for display; an image dithering circuit (not shown); and an image filtering circuit (not shown). The functions of the image dithering circuit (not shown) and image filtering circuit (not shown) can be programmably bypassed on a by-the-pixel basis. Also optionally provided, are a hardwired pseudo-linear CLUT circuit (not shown) which can be programmably substituted for one of the user-programmable CLUT's on a by-the-pixel basis; and a user-programmable resolution-enhancing interpolator (not shown) which can be used to produce twice as many unique display lines and/or twice as many unique display columns as there are respective lines and columns in the active frame-buffer. A more detailed description of the I-EARS group of elements, 160-170-175, may be found in the co-pending U.S. patent application Ser. No. 08/438,630, filed May 10, 1995, entitled CONFIGURABLE VIDEO DISPLAY SYSTEM HAVING LIST-BASED CONTROL MECHANISM FOR BY-THE-LINE AND BY-THE-PIXEL MODIFICATION OF DISPLAYED FRAMES AND METHOD OF OPERATING SAME, by inventors R. Thaik, et al. (Attorney Docket No. MDIO 4510), which is incorporated herein by reference and as whose details will therefore not be repeated here.

The operations and importance of the triangle-engine (TE) 150 and various data blocks within system memory may be better appreciated by first considering the video processing operations of graphics system 100 in an overall sense.

System 100 includes a real-time video display unit (VDU) 180 such as an NTSC standard television monitor or a PAL standard television monitor or a 640-by-480 VGA computer monitor or a higher-resolution monitor. The VDU 180 is used for displaying high-resolution animated images 185 to a system user 190.

The video display unit (VDU) 180 may also include audio output means (not shown) for simultaneously producing and supplying corresponding multi-phonic or monophonic sound to the system user 190.

As the image-enhancing and rendering subsystem (I-EARS) 160-170-175 drives the video display unit (VDU) 180, a system user 190 observes the displayed imagery 185 and hears any accompanying audio by way of audio-visual coupling path 191. An interactive response mechanism 195 is provided in the form for example of a joystick and/or a pad of push-buttons for allowing the system user 190 to feedback to the hardware (e.g., CPU 110) his or her real-time responses to the perceived audiovisual show by way of interface 105.

The image-enhancing and rendering subsystem (I-EARS) 160-170-175 has a pipelined structure that moves data signals synchronously from an upstream portion to a downstream portion. The downstream portion of the I-EARS 160-170-175 is clocked by a video clock generator (vidCLK) 167 that operates according to pre-specified pixel and control rates of the VDU 180.

In one embodiment, the vidCLK rate is approximately 15 MHz.

The digital encoder (DENC) 170 includes a timing section that generates frame synchronization signals such as vertical synch pulses (V-synch) and horizontal synch pulses (H-synch) in synchronism with the vidCLK 167.

The upstream portion of the I-EARS 160-170-175 is clocked by a system clock generator (sysCLK) 117 that operates according to a pre-specified system rate. The system rate is typically different from the vidCLK rate. In one embodiment, the sysCLK rate is approximately 66 MHz. The sysCLK 117 is used for driving other portions of system 100 such as the illustrated CPU 110 and triangle-engine 150.

System 100 further includes a real-time audiovisual-data processing subsystem comprised of: a basic I/O interface module 105, a general purpose central-processing unit (CPU) 110, a multi-port memory 130-131, optionally a plurality of 2-dimensional image rendering engines (cel-engines) 148, and the already-mentioned 3-dimensional image rendering engine (triangle-engine) 150.

The real-time audiovisual-data processing subsystem may include other image-data manipulating engines and audio-data manipulating engines as indicated at 149.

In one embodiment, the memory 130-131 is formed as two simultaneously and independently addressable units, 130 and 131. Data in system memory 130-131 is preferably interleaved across a same address space as 4-KByte pages. Units 130 and 131 preferably utilize SDRAM technology (synchronous dynamic random access memory). They may also utilize other high-speed random access data storage technologies such as video-speed static random-access memory subunit (VSRAM).

Access to the first memory unit (MEM0) 130 is managed by a corresponding first memory access control unit (MAC0) 120.

Access to the second memory unit (MEM1) 131 is managed by a respective and independent second memory access control unit (MAC1) 121.

The MAC0 unit 120 may exercise exclusive control over the address (A0) and control (C0) buses of the first memory unit 130. Any other device which wishes to gain access to the A0 and C0 buses then has to send a corresponding request to the MAC0 unit 120 over address/control bus 124. The MAC0 unit 120 arbitrates among contending requesters and grants access to the highest priority requester.

Similarly, the MAC1 unit 121 may exercise exclusive control over the address (A1) and control (C1) buses of the second memory unit 131. Any other device which wishes to gain access to the A1 and C1 buses then has to send a corresponding request to the MAC1 unit 121 over address/ control bus 124. The MAC1 unit 121 arbitrates among contending requesters and grants access to the highest priority requester.

The first memory unit 130 has a 32-bit wide bidirectional data bus 122 which is also designated as 'D0'. The second memory unit 131 has a 32-bit wide bidirectional data bus 123 which is also designated as 'D1'. Devices such as CPU 110, VPP 160 and triangle-engine 150, read and write data into memory units 130 and 131 by way of respective data buses D0 and D1. The total data bus width is thus 64 bits.

If desired, the illustrated, parallel memory architecture may be expanded to include additional memory units (MEM's) such as 130–131 interleaved address-wise with units 130–131 and respective additional memory access control units (MAC's) such as 120–121. The advantage of this parallel memory architecture is, of course, that multiple requesters can obtain simultaneous access to different parts of a centralized memory. It is the responsibility of the operating system software (OS) to see to it that contentions for a same memory unit (e.g., 130 or 131) are minimized.

The operating system (OS) software can be stored in a nonvolatile storage unit such as ROM (not shown) or CD-ROM (not shown) that is operatively coupled to, or forms part of, the system memory 130–131. For high speed nonvolatile storage such as ROM, the OS instructions can be executed directly from that storage. For slower-speed nonvolatile storage such as CD-ROM (compact disk), the OS instructions can be downloaded into system RAM 130–131 and executed from there.

The illustrated embodiment of the image processing and display system 100 uses a PowerPC™ 602 CPU, 110 such as made by International Business Machines (IBM) of Armonk, New York. Other CPU's may of course be used.

The PowerPC™ CPU 110 has its own processor data bus (PD) 112 and its own address/control bus (PA/C) 114. The PowerPC™ data and address/control buses, 112 and 114, couple to the memory data and memory address/control buses, 122, 123 and 124, by way of a bus interface unit 115. Signals from peripheral devices such as the interactive response mechanism 195 (e.g., the user-joystick) couple to the PowerPC™ data and address/control buses, 112 and 114, by way of the basic-I/O interface unit 105. An internal cache memory ($) is provided within the PowerPC™ chip for enabling data processing by the CPU 110 at the same time that other devices access the system memory 130–131. Cache coherency is maintained in one embodiment through a snooping mechanism CPU 110 has at least two operating modes, referred to here as 'normal mode' and 'privileged supervisory mode'. The operating system (OS) software is provided with the exclusive ability to switch the CPU 110 from one to the other of the normal and privileged supervisory modes. A control signal on the PowerPC™ address/control bus 114 indicates whether the CPU is in normal or privileged supervisory mode. The PPC bus interface unit 115 copies that signal onto memory address/control bus 124 and makes the same indication available to the triangle-engine 150 so that engine 150 can determine whether the CPU is in normal or privileged supervisory mode. Software modules that are to modify privileged-access registers within the TE should do so by way of the OS application program interface (API). In one embodiment, every access to a TE register that comes by way of the bus interface unit 115 is automatically deemed to be privileged while every access to a TE register that comes by way of the memory interface module 151 is automatically deemed to be non-privileged.

Instructions and/or image data are loadable into the memory units 130–131 from a variety of sources (not shown), including but not limited to magnetic or optical floppy or hard disk drives, a CD-ROM drive, a silicon ROM (read-only-memory) device, a cable headend, a wireless broadcast receiver, a telephone modem, etc.

Such downloads typically come by way of the basic-I/O interface unit 105.

The downloaded instructions are not necessarily for execution by the CPU 110. They may instead be directed to the triangle-engine 150 as will be seen below, or to other instruction executing components such as, but not limited to, the VPP 160 and other audiovisual data manipulating engines 148–149.

Buses 122, 123 and 124 depict in a general sense the respective data and control paths for moving instructions and image data into and out of memory units 130–131. Downloaded image data (including native and texturing data) can be in compressed or decompressed format. Compressed image data may be temporarily stored in a compressed image buffer of memory 130–131 and expanded into decompressed format either in system memory or inside the triangle-engine on an as needed basis. Immediately-displayable image data, such as that of a below-described frame buffer (FBO 140) may be maintained as a linked list of non-compressed data.

The CPU 110 sets one or more 'forced-address' registers within the VPP 160 to point to respective locations in the system-memory 130-131 that store the start of a currently active 'Video Display List' (VDL). The VDL in turn points to the currently 'active' frame-buffer. The VDL has a linked-list structure wherein the start block of a VDL can point to a second block or back to itself, the second block can point to a third block or back to itself, and so forth. A video display list (VDL) is deemed exhausted when the video post-processor (VPP) 160 has generated a software-defined number of screen lines.

After a 'valid' VDL start location is written into one of plural 'forced-address' registers in VPP 160 a DMA controller within the VPP 160 begins to periodically send requests to the corresponding MAC (120 or 121) for successive blocks of the active Video Display List (VDL) that contain image data and render control words until the VDL is exhausted. The VPP 160 stores the fetched control words and processes the fetched image data accordingly so as to generate video signals for a corresponding image 185 on the video display unit (VDU) 180.

At the same time that the video post-processor (VPP) 160 is repeatedly fetching items from the active video display list (VDL) and generating display signals of the corresponding imagery for consumption by VDU 180, the CPU 110, the triangle-engine (TE) 150 and/or the other image manipulating engines 148–149 can access binary-coded data stored within the memory 130-131 and modify the stored data within memory 130-131 at a sufficiently high-rate of speed to create an illusion for an observer 190 that real-time animation is occurring in a high-resolution image 185 (e.g., 640-by-480 pixels, 24 bits-per-pixel) then being displayed on video display unit 180.

In many instances, the observer 190 will be interacting with the animated image 185 by operating buttons or a joystick or other input means of the interactive response mechanism 195. The system user's real-time responses are fed back to the basic-I/O interface unit 105 and/or to the CPU 110 and the latter units react accordingly in real-time.

The term 'real-time' as used here means sufficiently fast (e.g., within roughly 15 to 0.3 milliseconds) so that a human user 190 perceives the corresponding changes to the audio-visual show emanating from the audio and visual output units (e.g., VDU 180) to be occurring substantially instantaneously.

The image 185 that is displayed on VDU 180 is defined in part by bitmapped data stored in one or more screen-band buffers (e.g., 140 and 141) within memory 130-131. Each screen-band buffer contains one or more scanlines of bit-mapped image data. Screen-bands can be woven together in threaded list style to define a full "screen". Alternatively, a single screen-band (a 'simple' panel) can be defined such that the one band holds the bit-mapped image of an entire screen (e.g., a full set of 240 low-resolution lines or 480 high-resolution lines).

When the triangle-engine 150 and VPP 160 are being used simultaneously, it is preferable to use double-frame buffering (or multi-frame buffering) wherein the TE renders into a first frame-buffer and the VPP reads data from a pre-rendered second frame-buffer (from the 'active' FB). The storage of the frame-buffer under-rendition and the active frame-buffer is preferably alternated between the MEM0 and MEM1 units, 130 and 131, so that while the VPP 160 is fetching the data of one frame-buffer (e.g., FB1) for display purposes from one of the MEM0 and MEM1 units, the triangle-engine 150 can be simultaneously writing new data to the other of units 130 and 131.

Multi-buffering is generally employed when animation is being displayed. The VPP 160 reads image data from a first, 'active' frame-buffer for current display while the triangle-engine 150 writes data into a later-to-be displayed, alternate frame-buffer(s). Then one of the alternate frame-buffers is made the active buffer and the previous active area is relinquished to free memory space or used as the new frame-buffer under-rendering. The purpose of this alternation scheme is to allow both of the triangle-engine 150 and VPP 160 to simultaneously access system memory without constantly getting in each other's way.

The VPP 160 should be able to fetch data in enough time so as to be able to generate a next line of display data when the next horizontal active-scan period (H-SCAN) starts At the same time, the triangle-engine 150 should be able to generate next-frame imagery at sufficiently a fast pace so that when frame swapping occurs (when the 'under-rendition' FB becomes the currently 'active' FB), the system user 190 will not see any image 'tearing' but will rather perceive smooth 3D object rotation or other effects occurring in real-time.

Figure 1B:
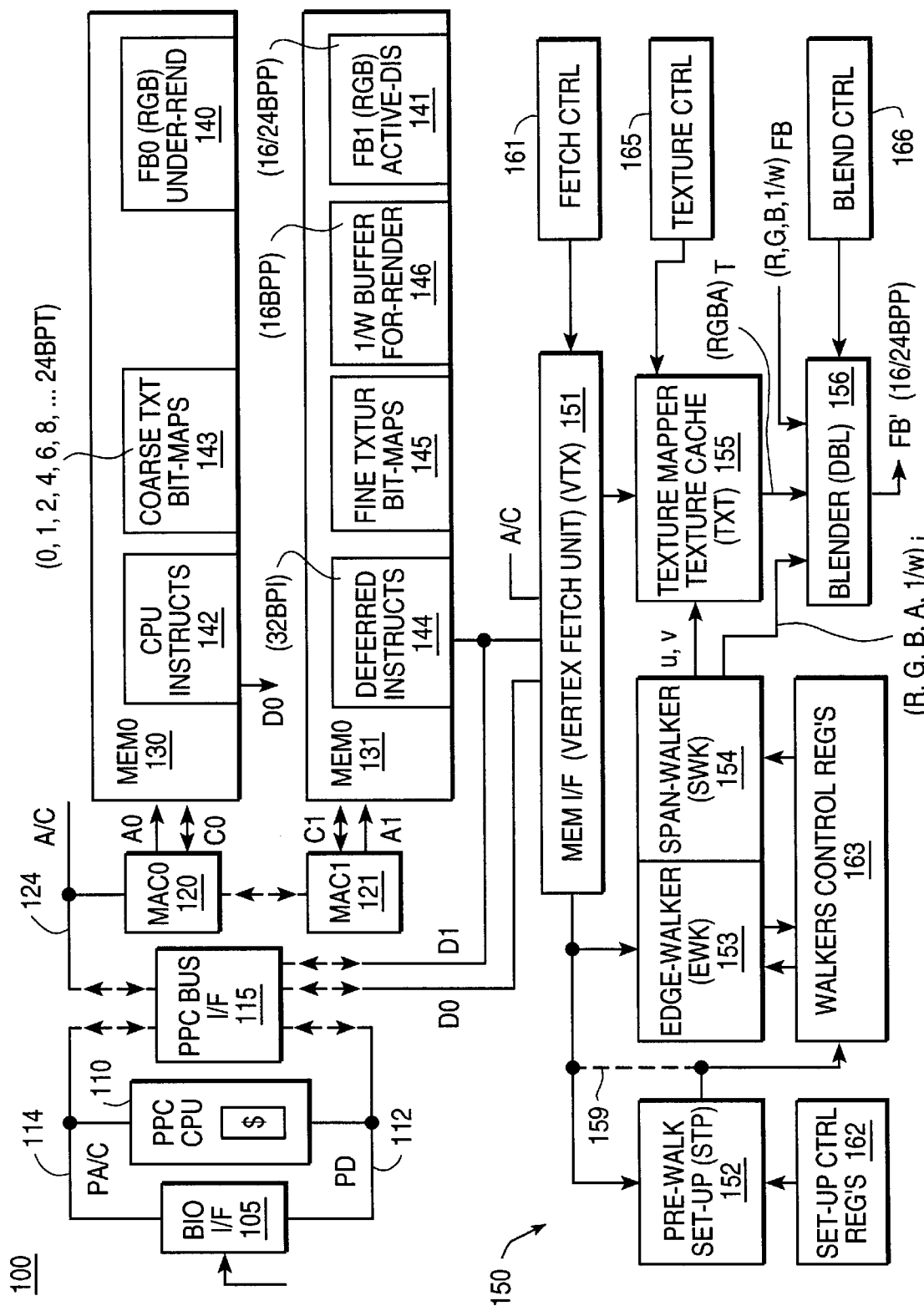
FIG. 1B is a close-up block diagram showing more details of a triangle-engine (TE) in accordance with the invention and the parts of the graphics system with which the TE interacts.

Referring to FIG. 1B, a closer, more detailed view of the triangle-engine 150 is shown together with other system components that interact with the TE 150 such as system memory 130-131 and CPU 110.

The triangle-engine 150 is comprised of a memory interface module 151 (which includes a vertex-fetch unit VTX), a pre-walk setup module (STP) 152, an edge-walking module (EWK) 153, a span-walking module (SWK) 154, a texture mapping module (TXT) 155 (including a texture cache), and a destination blending module (DBL) 156.

Modules 152, 153, 154 and 156 operate in sequential, pipelined fashion as will become apparent. The output of the texture mapping module 155 merges into the destination blending module 156 roughly in coincidence with the output of the span-walking module 154.

Each of modules 151–156 has a corresponding one or more control registers 161–166. The edge-walking and span-walking modules 153 and 154 share a common set of control registers 163.

Control register 161–166 may be updated by so-called 'immediate' instructions or by 'deferred' instructions as will be detailed below. Some registers within set 161–166 are updatable only by a 'privileged' command issuer so as to prevent accidental alteration by wayward software modules.

The contents of control registers 163 are filled by the pre-walk setup module 152 when a 'short-format' mode is employed for the deferred instructions. A multiplexer is included in the triangle-engine pipeline for bypassing the pre-walk setup unit 152 when a 'long-format' mode is employed for the deferred instructions. This programmably-selectable bypass is indicated by dashed line 159. When bypass 159 is used, the data that would have been output by the pre-walk setup module 152 should be instead pre-calculated by some other means (e.g., CPU 110). This pre-calculated output data is loaded into the walkers' control registers 163 from a corresponding part of the 'long-format' deferred instructions.

System memory 130-131 contains a number of data structures which interact either directly or indirectly with the triangle-engine 150.

A first, CPU-instructing portion 142 of system memory contains instructions for execution by the system CPU 110.

A second, deferred-instructions portion 144 of system memory contains the so-called 'deferred' instructions for execution by the triangle-engine 150.

A third, under-rendition FB portion 140 of system memory contains RGB color values for the individual pixels of a frame buffer that the triangle-engine 150 is currently rendering to.

A fourth, active-FB portion 141 of system memory contains RGB color values for the individual pixels of a frame buffer that the VPP 160 is currently reading from for purposes of display.

A depth buffer area 146 is set aside in the system memory 130-131 for storing data representing the $1/w_{FB}$ value of each pixel in the corresponding under-rendition FB 140. There is no separate depth buffer area for the currently active frame buffer.

As shown in FIG. 1B, the current 1/w buffer 146 is preferably stored in a memory unit other than that which stores the corresponding, currently under-rendition FB 140. This is done to minimize contention between read/write accesses to the stored 1/w depth values for the under-rendition frame-buffer and the read/write accesses to the stored corresponding RGB values of the frame-buffer under-rendition 140.

System memory 130-131 further contains one or more texturing bit map areas 143, 145 that contain texture picture elements (texels) for optional blending with span-walker generated color data. A 'texel' contains the coloration values $\{RGB\}_t$ of a corresponding depth-independent texture space and it may also contain a corresponding blend factor $\{A\}_t$ for the texel. The general format of the data stored in a texel is thus $\{R,G,B,A\}_t$.

Due to the assignment of depth-independent texture space coordinates to the vertices of polygons to be rendered, for each polygon there is a correspondence between the area covered by a texel and the area of a display pixel. Depending on the orientation of the polygon in model space relative to the image plane, and other factors, this correspondence can vary significantly from one part of the polygon to another. Therefore, in order to improve rendering speed, texels can cover coarse areas of the depth-independent texture space (285 of FIG. 2D) or finer resolution areas. In one embodiment there are four levels of texturing resolution (LOD= level of detail), a first that covers the equivalent in x,y image space of one frame-buffer pixel at a time; a second level that covers the equivalent in x,y image space of four pixels (2×2) at a time; a third level that covers the equivalent in x,y image space of sixteen pixels (4×4 ) at a time; and a fourth third level that covers the equivalent in x,y image space of sixty-four pixels (8×8) at a time. Each coarser texel of the second level is derived by averaging the texture information $\{R,G,B,A\}_t$ of four covered texels in the finer first level. Each texel of the third level is derived by averaging the texture information $\{R,G,B,A\}_t$ of four covered texels in the finer second level Each texel of the fourth level is derived by averaging the texture information $\{R,G,B,A\}_t$ of four covered texels in the finer third level.

As the depth factor $1/w_{IP}$ of a given interior point on a triangle surface (e.g., 230 of FIG. 2C) decreases from 1.00 to 0 (hither to yonder, see FIG. 2A), the system automatically switches from the finer to the coarser levels of texturing.

With regard to the deferred-instructions portion 144 of system memory, this portion contains instruction blocks each having at least one 32-bit wide block header and an optional subsequent set of deferred instructions generally formatted as 32 bits per instruction. The number of instructions in a block vary according to an instructions-count field within the block header.

With regard to the texture bit maps 143, 145, these portions of system memory may be completely omitted if desired or encoded as one bit per texel (1BPT), two bits per texel (2 BPT), four BPT, six BPT, . . . up to 24 BPT. The 2–24 BPT code of a given texture bit map is routed into a texel-parameter look-up table (TLUT) which expands each unique coding into corresponding texture information $\{R,G,B,A\}_t$ having more bits. One format for $\{R,G,B,A\}_t$ is 8/8/8/7/1 bits for respective fields R/G/B/A/D. (The 'D' bit is used by the VPP 160 for by-the-pixel dither bypass and/or for other functions.)

A second, programmably-definable format for $\{R,G,B,A\}_t$ is 5/5/5/1/0 bits for respective fields R/G/B/A/D. In the second format, the TLUT data is packed 2-texels per 32-bit word in system memory.

A third, programmably-definable format for $\{R,G,B,A\}_t$ is 5/5/5/0/1 bits for respective fields R/G/B/A/D. The pre-TLUT texel encoding values are packed into 32-bit wide memory words as appropriate for their value (e.g., eight 4-bit wide texel encodes may be packed into a 32-bit wide memory word).

With regard to the 1/w buffer 146, the respective $1/w_{FB}$ values consume 16 bits per frame-buffer pixel (16BPP). This means that two 1/w values may be stored in each 32-bit wide memory word. The 16 BPP characteristic of the 1/w values is a departure from the 24 BPP characteristic of conventional Z-buffers. Fairly good depth resolution is still provided because the $2^{16}$ quantization steps possible for each 16-bit wide $1/w_{FB}$ value are distributed nonlinearly relative to the z axis. There are more such quantization steps for z close to zero (close to the observer plane) and fewer as one zooms out towards z=∞ (far away from the observer plane). However, in an embodiment, depth resolution is further improved by representing the 1/w values in the buffer 146 using a block-fix format described below.

The frame buffer pixels may be each represented as 16 BPP or 24 BPP. When the 16 BPP format is used for the FB pixels, a 5/5/5-4/1-2 format is used wherein five of the bits define a R field, another five of the bits define a G field, four or five further bits define a B field and the remaining two or one bits define one or more of a so-called, D-bit, a vertical-subposition bit and a horizontal subposition. The latter D and subposition bits may be used by the VPP 160 for functions operating on a by-the pixel basis.

Figure 2A:
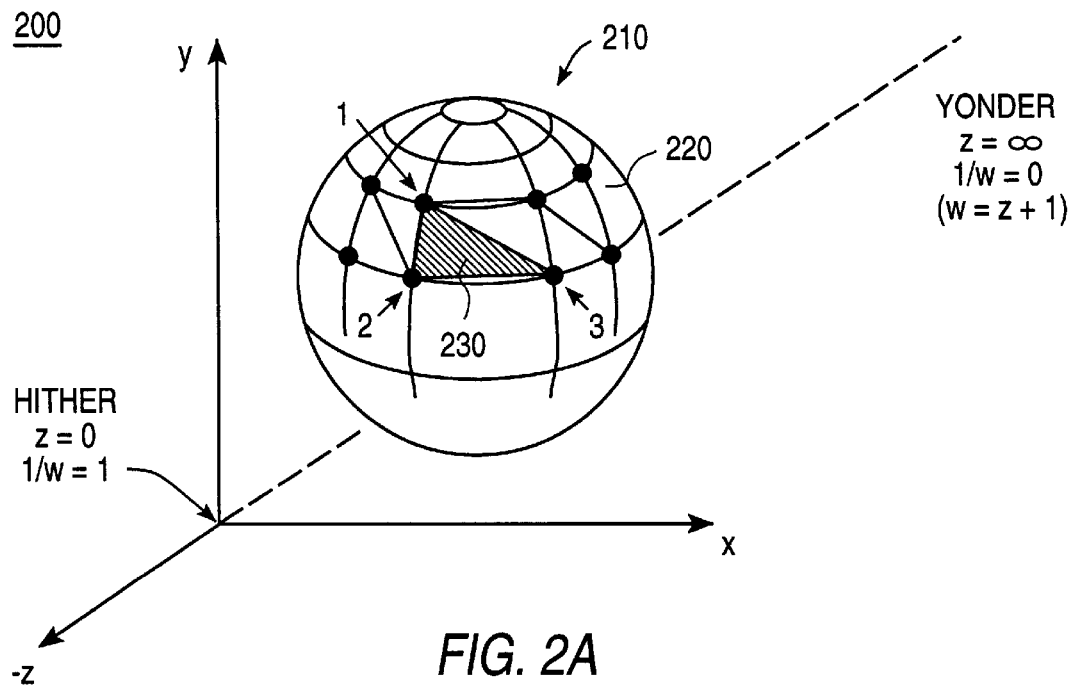
FIG. 2A is a perspective view for explaining how object-approximating 3D frameworks are formed with vertex points and how projective perspective is automatically compensated for by digital words of finite bit-width representing the value $1/w$.

The coordinated operations of triangle-engine 150, of the CPU 110, and of the memory regions 140–146 are based on three-dimensional framework modeling such as shown in FIG. 2A.

Referring to FIG. 2A, a perspective view is shown of a three-dimensional coordinate system 200 having an x-axis extending horizontally, a y-axis extending vertically and a z-axis extending generally into the plane of the figure. The three-dimensional space defined by these three coordinates is referred to herein as "model space". In the present embodiment, all displayable objects of the model to be rendered are placed behind the z=0 plane. The system user 190 is understood to be situated at the origin facing toward positive z half-space, and seeing a 2-dimensional image projected onto a plane defined as z=d (d>0). The z=d plane is referred to herein as the "projection plane" or the "image plane", and its x and y axes are said to define a two-dimensional image space. In the present embodiment, the image plane is always in the positive z half of model space, and the x and y axes of image space are considered to be parallel with the x and y axes of model space. In another embodiment, another image plane can be assumed (whether or not perpendicular to the z-axis), and/or a different set of axes can be chosen for image space (whether or not parallel to the x and y axes of model space). ("Coincident" axes are considered herein to be parallel to each other, coincidence being considered merely a special case of parallelism).

In the illustrated example, the three-dimensional object to be displayed is a spherical globe 210 having an outer surface 220. A pattern of sampling points are distributed about the three-dimensional object surface 220.

In the illustrated example, a regular pattern of vertex points such as 1, 2, and 3 are distributed at the intersections of regularly dispersed longitudes and latitudes.

A surface-approximating planar triangle is hypothetically drawn for every set of three neighboring sample points. In the example of FIG. 2A, sample points 1, 2, 3 define the vertex points of hypothetical triangle 230.

For the present embodiment, a linear transform between coordinate value z and a coordinate value w is defined as w=z/h, where h represents the point on the z axis through which the hither plane passes. This means that as z varies from a hither point of z=h to a yonder point near z=∞, the reciprocal value 1/w correspondingly varies from 1/w=1 (hither) to nearly 1/w=0 (yonder). Note that if the image plane is chosen differently, then w can bear a different relationship to z.

Assume that the range 1/w=0 to 1/w=1.00 is subdivided into the $2^{16}$ equal parts. More of those parts will map to those portions of the z-axis that are closer to the hither region than those that map to portions of the z-axis closer to yonder. Finer depth resolution is therefore provided for those points that are closer to the viewer (in front of the z=0 plane) than for those points that are further away from the viewer. This concept can be otherwise understood by noting that the derivative of 1/w increases rapidly as z approaches infinity and decreases rapidly as z approaches zero.

In more generic terms, for a linear transform, $w=\alpha z+\beta$, the reciprocal is $1/w=1/(\alpha z+\beta)$. The reciprocal 1/w approaches zero as z approaches infinity. The reciprocal 1/w approaches the value $1/\beta$ as z approaches zero. The derivative, $d(w^{-1})/dz$ equals $-\alpha/(\alpha z+\beta)^2$ and approaches zero from the negative side as z approaches infinity, meaning that $d(w^{-1})/dz$ gets larger as z approaches infinity.

In terms of physical digital systems, this means that one may store a 16-bit wide value representing 1/w in a 16-bit memory location and obtain relatively good resolution for points near the viewer while suffering poorer depth resolution as one moves further away from the viewer along the z direction This type of variation in depth resolution meshes well with human vision in terms of things near and far. Human beings tend to have better depth perception for objects close by than for those far away. A form of visual realism is therefor inherently created by using a digital word of finite bit width for storing the depth factor 1/w. Its resolving ability inherently mimics the ability of the human vision system to see depth perception at better resolution close up than far away. Block-fix representation improves resolution further at greater depths, as discussed below.

What the human observer 190 sees depends on the optical properties of surface 220 and on surrounding lighting. The outer surface 220 of globe 210 may have any different kinds of optical properties. Surface 220 may be transparent or opaque or semi-transparent. It may be reflective or nonreflective. It may be formed of various combinations of transparent, opaque, semi-transparent, reflective portions distributed thereabout.

A beach ball made from an almost-transparent shell material would be one example of a physical item represented by globe 210. (A completely transparent shell would be invisible.) A similar beach ball having the continents of the world imprinted on its outer surface as colored opaque regions but not the oceans would be another example. In the latter case one could see the backside of the globe by looking through the almost-transparent ocean areas. A classroom globe made with an opaque shell and having both the continents and the oceans of the world painted thereon using different opaque colors would be yet another example.

Figure 2B:
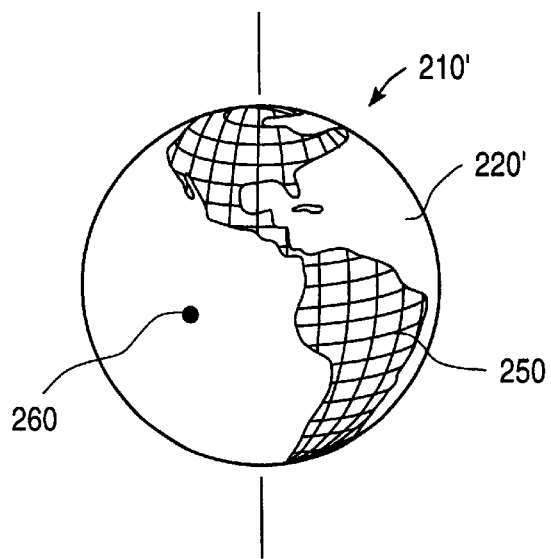
FIG. 2B is a perspective view showing a possible native coloration of the framework surface.

FIG. 2B shows an example of a globe 210' whose outer surface 220' is painted with a multi-colored opaque pattern 250 representing the land masses of the Western hemisphere. Another portion 260 of surface 220' is made semi-transparent and tinted with various shades of blue to indicate shallow and deep ocean areas. Uniform lighting is assumed.

Assume that surface-approximating triangle 230 (FIG. 2A) forms part of the semi-transparent ocean area 260 (FIG. 2B).

Figure 2C:
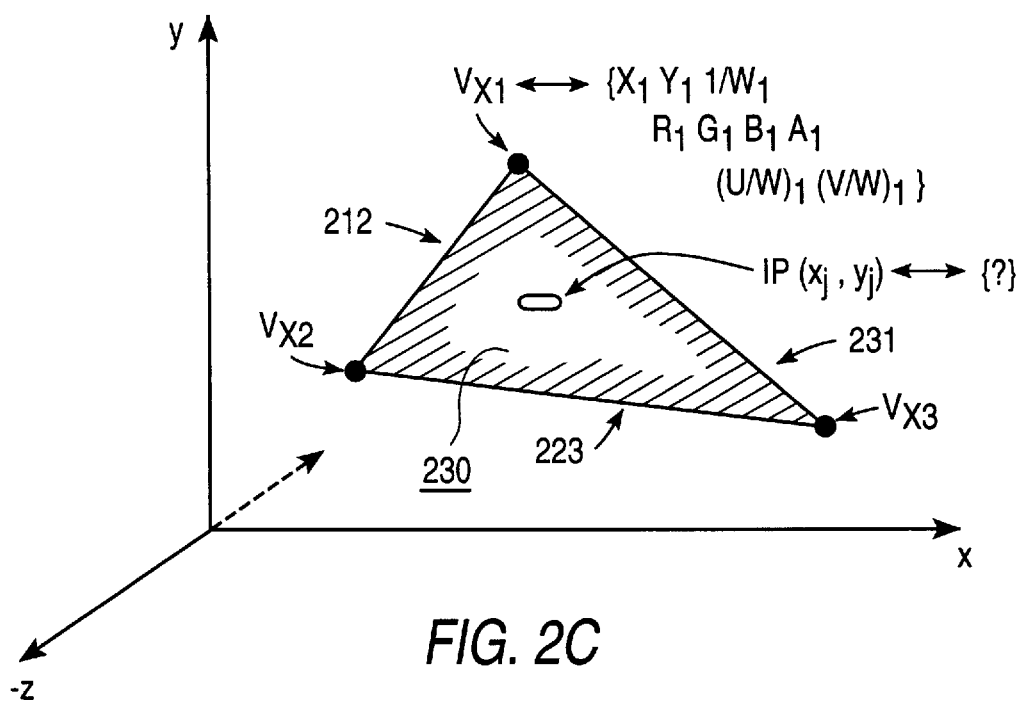
FIG. 2C is a perspective view for explaining bi-linear interpolation across the surface of a 3D triangle.

FIG. 2C is a perspective view for showing how coloration and other parameters may be defined at interior points (IP) of a triangle such as 230. Triangle 230 is first defined as nothing more than a set of three vertex points $Vx_1$, $Vx_2$ and $Vx_3$ suspended in the three-dimensional model space of z>0.

A respective set of predefined parameters or attribute values are attached to each of the vertex points $Vx_1$, $Vx_2$, $Vx_3$. The attached parameter set of $Vx_1$ is shown as $\{x_1, y_1, 1/w_1, R_1, G_1, B_1, A_1, (u/w_1), (v/w_1)\}$.

Although not shown, it is understood that second vertex $Vx_2$ has a correspondingly subscripted set of parameters defining 3-dimensional location, coloration, blend and texture mapping; and that third vertex $Vx_3$ also has a correspondingly subscripted set of parameters. Digital signals are stored in memory in the form of deferred instructions (e.g., in region 144 of FIG. 1B) for representing these predefined parameters.

At this point in time there is no stored data in system memory for representing the x, y, 1/w, R, G, B, A, u/w, v/w parameters of interior points of triangle 230. The stored definition of triangle 230 by means of only the three vertex points, $Vx_1$, $VX_2$ and $Vx_3$ is fairly compact and thus system memory space is conserved.

The triangle-engine 150 fetches the so-called deferred-list containing the predefined parameters of vertex points $Vx_1$ $Vx_2$ and $Vx_3$ by sending a corresponding request to MAC1 unit 121 (FIG. 1B) Memory and bus usage time is minimized by transmitting only this minimal information set to the triangle-engine.

Upon obtaining and locally storing the information for vertex points $Vx_1$, $Vx_2$, $Vx_3$, the triangle-engine 150 next projects the vertex points onto the z=0 plane and determines which vertex point or points is highest and which point or points are lowest. One edge of the triangle having both a highest and a lowest vertex is designated as the 'long-walk' edge. Another edge of the triangle that shares the highest vertex is designated as the 'short-walk' edge. This step of distinguishing vertices and edges is referred to as vertex sorting.

The triangle-engine 150 then computes the slopes and lengths of the short/long walk edges 212 and 231.

The respective parameters of each interior point (IP) having coordinates $x_j$, $y_j$ and lying on the surface of triangle 230 are then determined by bi-linear interpolation.

Bi-linear interpolation works as follows. Assume that each parameter (x, y, 1/w, R, G, B, A, u/w, v/w) of each interior point IP on the surface of triangle 230 is a linear function of its x and y coordinates. Using the color parameter R as an example, we can then write the linear equation {Eq. 1.0} as follows:

$$R_j(x_j,y_j)=a_R x+b_R y+c_R \qquad \{Eq.\ 1.0\}$$

We do not yet know the values of the equation constants, a, b and c. These can be solved for by noting that the same equation holds true at the three known vertex points $Vx_1$, $Vx_2$ and $Vx_3$ having respective coordinates $(x_1,y_1)$, $(x_2,y_2)$, and $(x_3,y_3)$.

Thus, the following three additional equations may be written:

$$R_1(x_1,y_1)=a_R x_1+b_R y_1+c_R \qquad \{Eq.\ 1.1\}$$

$$R_2(x_2,y_2)=a_R x_2+b_R y_2+c_R \qquad \{Eq.\ 1.2\}$$

$$R_3(x_3,y_3)=a_R x_3+b_R y_3+c_R \qquad \{Eq.\ 1.3\}$$

The constants $a_R$, $b_R$, and $c_R$ can now be solved using well known linear algebra techniques. This solution is carried out by the hardware of the pre-walk setup module 152 on a per triangle basis.

Note that the values $a_R$, $b_R$ and $c_R$ change with every new triangle. Accordingly, a new solution for $a_R$, $b_R$ and $c_R$ is generally needed with the fetch of each new triangle. This is one of the jobs of the pre-walk setup module 152 (FIG. 1B). The pre-walk setup module 152 can be computing the bi-linear interpolation constants $a_R$, $b_R$ and $c_R$ for a second triangle while the edge-walker 153 and span-walker 154 are stepping across an earlier processed triangle.

Not only are the linear equation constants a, b, and c different for each triangle, they are different for each parameter. Accordingly, the pre-walk setup module 152 computes separate equation constants for each of the parameters and then stores them in the walker's control registers 163 in accordance with the following TABLE IV:

TABLE IV

| R | G | B | A | u/w | v/w | 1/w |
|---|---|---|---|---|---|---|
| $a_R$ | $a_G$ | $a_B$ | $a_A$ | $a_u$ | $a_v$ | $a_w$ |
| $b_R$ | $b_G$ | $b_B$ | $b_A$ | $b_u$ | $b_v$ | $b_w$ |

Note that linear equation constants, $c_R$ through $c_w$ are not stored in the walker's control registers 163. There is no need for them. The parameters of vertex points $Vx_1$, $Vx_2$, $Vx_3$ inherently incorporate the equation constants, c, in their respective parameter values. The edge and span walkers 153–154 start at the vertices and then increment from there by respective deltas.

Note that the partial derivative of R with respect to x is equal to $a_R$. The partial derivative of R with respect to y is equal to $b_R$. The linear equation constant $c_R$ drops out during differentiation.

Figure 2D:
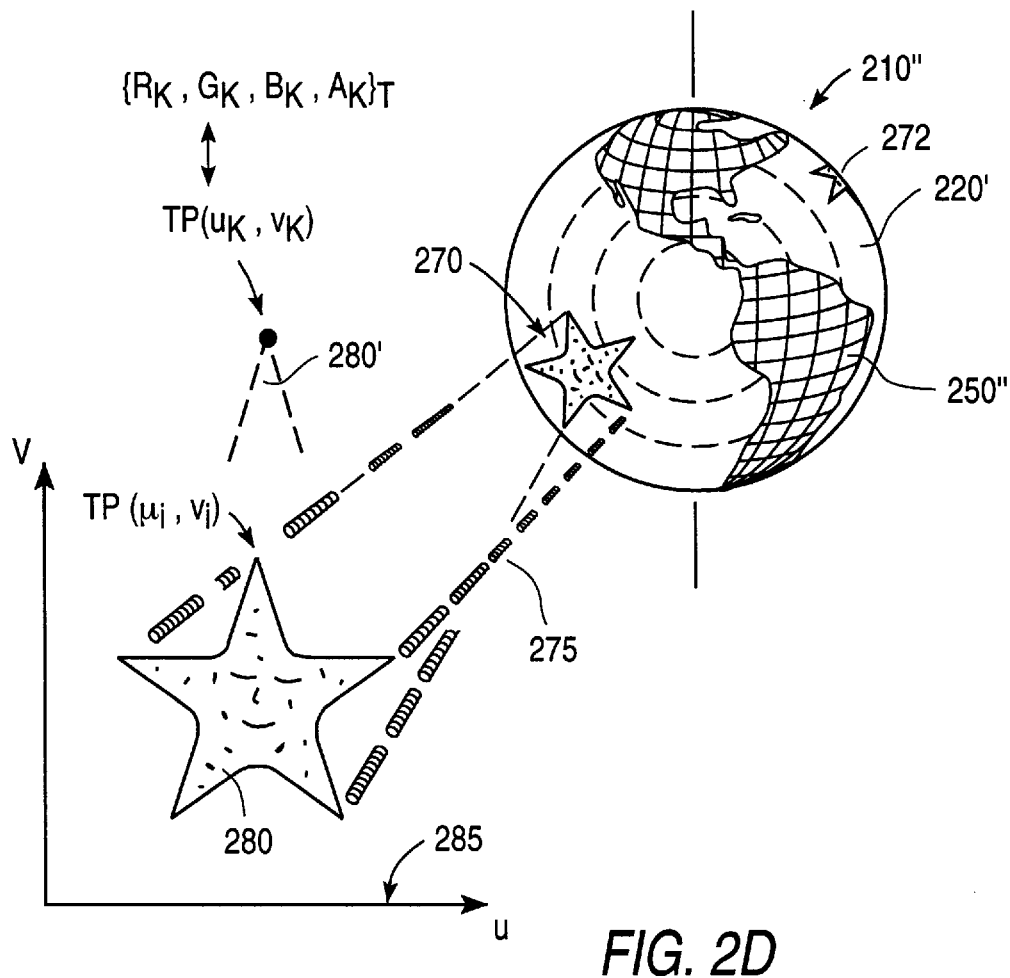
FIG. 2D is a perspective view for explaining the mapped blend-in of texture plane information onto the object surface.

Referring to FIG. 2D, it is sometimes desirable to blend in a texturing image with the native coloration of the framework triangles. For example, assume that a set of semi-transparent storm clouds are to be drawn lying over the ocean at region 270 in model space. The rendering of such additional information is referred to as texturing The textured image may be made to appear as if it wraps 3-dimensionally about the three-dimensional surface of the rendered native object. FIG. 2D shows an example wherein a regular five-pointed star 280 is projected onto the surface of globe 210" with rotation and perspective adjustment to thereby produce the 3-dimensionally wrapped star 270 near the horizon of globe 210".

The regularly-formed star 280 is defined in a two-dimensional space 285 having Cartesian coordinates u and v. Each i'th texture point (TP) in space 285 has associated therewith a respective set of coordinates, $u_i$, $v_i$ and also respective coloration and blend information, $(R_i, B_i, G_i, A_i)_t$. No depth information is associated with texture points in depth-independent texture space 285, although it might in an embodiment that supports three-dimensional texture maps.

The texture coloration and blend factors $\{R, G, B, A\}_t$ at a given texture point TP(u,v) is obtained by first converting the values u/w and v/w of a corresponding triangle surface point (IP) to respective u and v coordinates by dividing by 1/w. As the value of 1/w decreases towards zero, the steps taken in texture space 285 become larger and larger. The effect of these increasingly larger steps in texture space is to produce a more compressed projection onto the x-y plane during rendering.

Such a compressive effect is seen in FIG. 2D where a head portion of star 280 generates a relatively large right arm of projected star 270 while the legs of original star 280 become compressed into the smaller respective left leg and left arm of projection 270. The smaller left leg and arm portions of projection 270 are closer to the globe horizon, and the head portion of projection 270 is closer to the equatorial center, the latter being the 3D point closest to viewer 190.

The same star 280 in texture space 285 may be mapped multiple times onto surface 220". Thus, storm system 272 may be a second rendition of star 280 with its own unique set of rotations and depth values 1/w.

Any one change made in texture space 285 will be reflected to the multiple points on surface 220" that reference the changed point in texture space. Thus, if the head of star 280 is originally positioned at texture point $TP(u_i,v_i)$, and the image of the star 280 is moved upward in texture space to new position 280', all native points on surface 220" that reference the original position $TP(u_i,v_i)$ will cease to show the head point of the star and will now show whatever new texture value $\{R_i,G_i,B_i,A_i\}_T$ is moved into position $TP(u_i,v_i)$. All native points on surface 220" that point to the new position $TP(u_k,v_k)$ of the star tip will now pick up the newly-introduced texture value $\{R_k,G_k,B_k,A_k\}_T$ for blending with their native colors.

If desired, the two-dimensional cell engines 148 may be used for making real-time modifications to the $\{R,G,B\}_T$ values of texture space 285.

Figure 3:
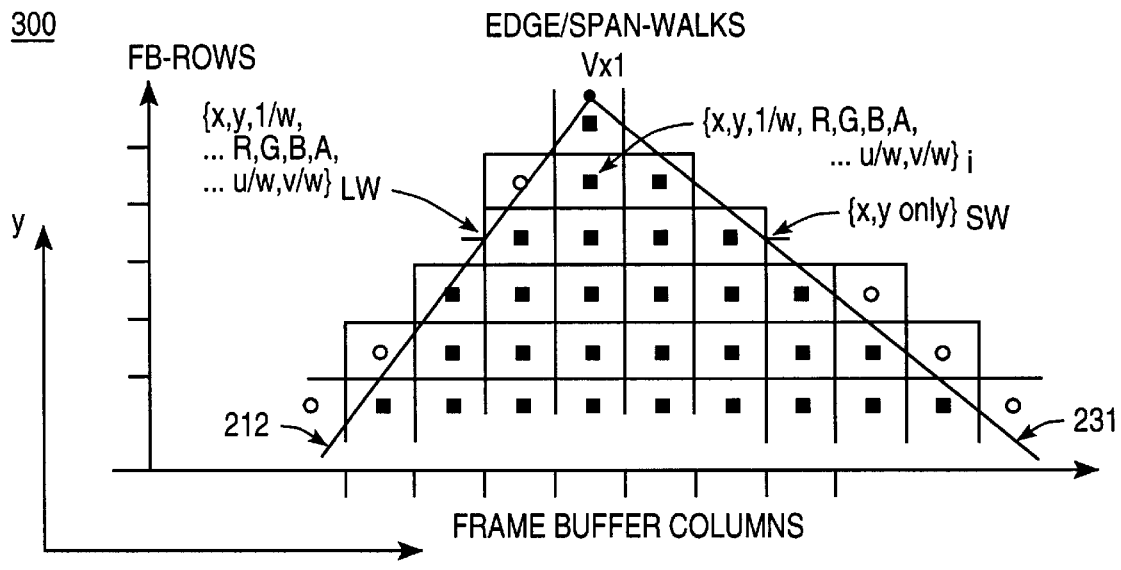
FIG. 3 is a 2D plot for explaining how an edge-walker steps through frame-buffer space, down a long edge of a triangle and defines render start and stop pixels for a subsequent span-walker.

Referring to FIG. 3, the image plane is shown mapped onto a frame-buffer space composed of frame-buffer rows and columns. The long-walk (LW) and short-walk (SW) edges from vertex $Vx_1$ are also projected onto the image plane.

Each intersection of a row and column in the figure corresponds to a separate storage element of the frame buffer, and these storage elements sometimes are referred to herein as "image cells". Thus each image cell in the frame buffer corresponds to a respective "image region" in the image plane. The different image regions in the general case do not need to be defined in a grid as shown in FIG. 3, but it is convenient if they are. Also, because the attribute values eventually written into the image cells of a frame buffer represent collectively a displayable image, each such image cell is sometimes referred to herein as a "pixel". It should be noted, however, that due to subsequent image modification, and/or video post-processing activities such as optional image resolution enhancement or reduction, the individual image cells may not correspond exactly to individual pixels as ultimately seen on the display 185. Finally, note that as a result of the projection, each image region corresponds to a different region of the polygon surface in model space. The region of the polygon surface in model space which is projected onto a single image region in image space is referred to herein as a "surface region". In general, surface regions vary in size depending on perspective, and are not necessarily rectangular even if the corresponding image region is rectangular.

In FIG. 3 it is assumed that the left edge of triangle 230 is the long-walk (LW) edge and the right edge is the short-walk (SW) edge. Edge walker 153 begins at point $Vx_1$ in the x-y plane and begins to walk down the long-walk edge 212. The edge walker 153 stops at each point along edge 212 having a y coordinate corresponding to the dead center of a crossed-over frame-buffer pixel. The edge walker 153 then compares the x position of the long-walk edge point with the x position of the dead center point of the underlying frame-buffer pixel. If the dead center of the underlying frame-buffer pixel is to the right of the long-walk line 212, (and to the left of the short-walk line 231), then the edge walker 153 designates the underlying frame-buffer pixel as being 'inside' the area of the walked triangle If the edge-overlapped frame-buffer pixel is 'inside' the triangle, the edge walker calculates the interior point parameters $\{x,y,R,G,B,A,u/w,v/w,1/w\}_i$ of the dead center point of the first 'inside' frame-buffer pixel and hands the calculated parameter values over to the span-walker 154 by way of walkers control register set 163.

The edge-walker 153 also calculates for the span-walker 154, the location (x and y only) of the last frame-buffer pixel that is 'inside' the triangle. The span-walker 154 then walks along the x-direction by increments equal to the center-to-center pitch of the frame-buffer pixels, and at each stop 'inside' the long and short-walk edges 212 and 231, the span-walking module 154 calculates the corresponding, iterated parameters, $\{x,y, R,G,B,A, u/w, v/w, 1/w\}_i$. Note that whereas the present embodiment performs these interpolations iteratively, other embodiments can perform each interpolation in closed form at each point in the triangle.

As the span walker 154 steps center-to-center, the walker 154 also calculates the texture space mapping coordinates, $u_i$ and $v_i$, from (the significands only of) the iteratively derived values of $u_i/w_i$, $v_i/w_i$ and $1/w_i$. The coordinates ($u_i/w_i$, $v_i/w_i$) are coordinates into what is referred to herein as a "depth-adjusted texture space", because the coordinates of such space have been adjusted for depth. Iterative calculation of $u_i$ and $v_i$ is much easier using depth-adjusted coordinates rather than the depth-independent coordinates (u,v). Therefore, the texture space coordinates assigned to each triangle vertex as provided to the vertex unit 151 is already adjusted for depth, and the iterative calculations are performed in the depth-adjusted coordinate system. The span walker module 154 converts the interpolated significands of depth-adjusted coordinates ($u_i/w_i$, $v_i/w_i$) for each point into depth-independent form ($u_i$ and $v_i$) by dividing by the significand of ($1/w_i$), before handing them off to the texture mapping module 155. The iterated coloration, blend and depth values $\{R, G, B, A, 1/w\}_i$ are handed off to the blending unit 156 as shown in FIG. 1B.

While the span walker 154 is stepping across in the x direction for a first frame buffer row, the edge walker 153 proceeds to perform the 'inside' versus 'outside' and other calculations for the next frame buffer row. The pre-walk setup module 152 is at the same time performing the set-up calculations for the next triangle and the vertex fetch unit 151 is at the same time fetching at least one new vertex Vxnew for next-processing by the pre-walk setup module 152. Thus the system is highly pipelined for efficient rendering of vector-based surface information onto a two-dimensional plane.

In FIG. 3, those frame-buffer pixels that are designated as being 'inside' the triangle are marked by interior black squares at their dead center positions. Frame-buffer pixels that are deemed to be 'outside' the walked triangle are indicated as such by unfilled circles at their respective dead center positions. If the dead center point of a given frame-buffer pixel coincides exactly with the walked edge, 212 or 231, an arbitration scheme is carried out to designate that frame-buffer pixel as being 'inside' or 'outside' without allowing for double strikes or gaps between the triangles that share that frame-buffer pixel on exactly 50%—50% basis.

Figure 4:
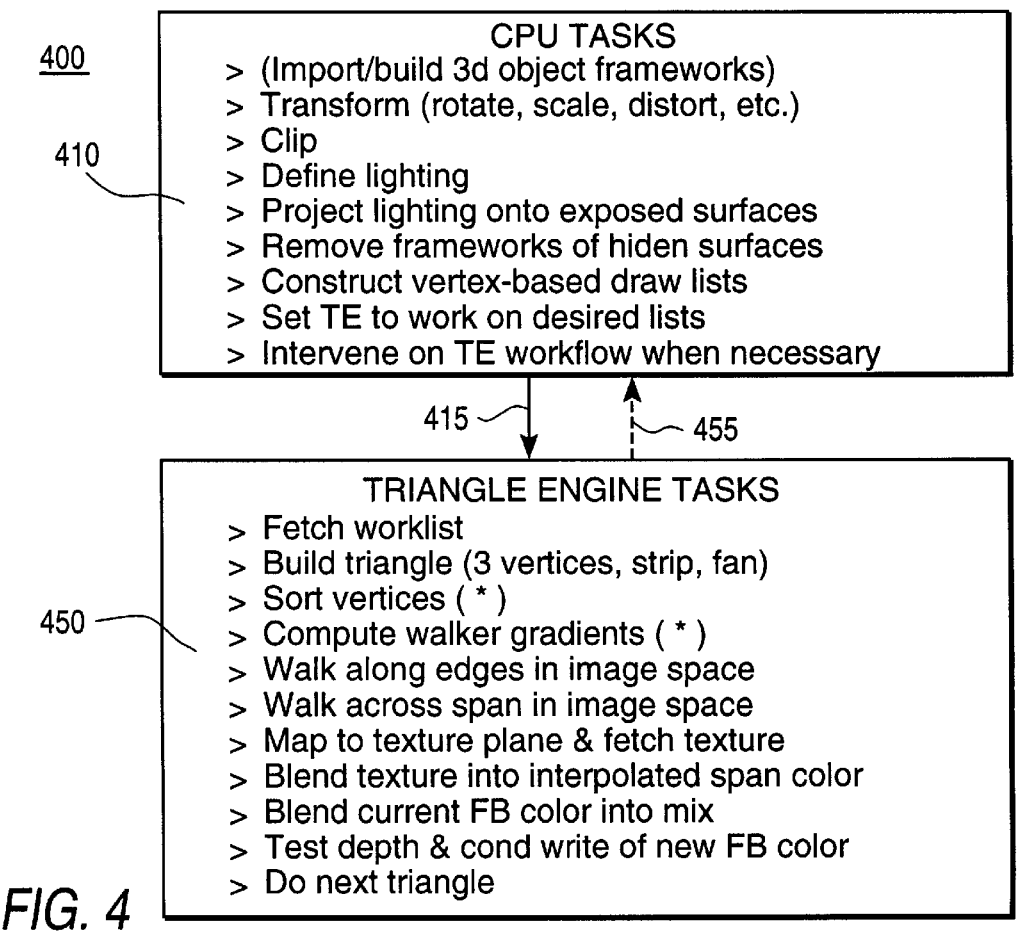
FIG. 4 is a block diagram showing pipelined subdivision of tasks between the CPU and the triangle engine.

Referring to FIG. 4, the task allocation between the system CPU and the triangle engine is arranged to make balanced, efficient use of both resources, 110 and 150.

As shown in portion 410 of the pipeline flow diagram 400 of FIG. 4, the CPU 110 manages the importation of data representing three-dimensional object frameworks from an image source such as a CD-ROM or the like into system memory. Alternatively, the CPU builds the data for the three-dimensional model space object frameworks on its own.

Next, the system CPU 110 accesses the memory location where the imported object definitions are stored and transforms them three-dimensionally as desired to scale the size of the object, to rotate it, to translate it, to distort it, etc., and to project it onto the two-dimensional image plane. Typically, these transformations are performed using 4×4 matrix multiplications and homogeneous coordinates, naturally yielding a homogeneity value w or 1/w for each polygon vertex.

The CPU 110 is also responsible for clipping away from the framework any vertex points which fall outside of the display scene The CPU 110 is further responsible for defining various lighting conditions. This can be done by modifying the native color values of each vertex point $\{R,G,B\}_{Vx}$ of each surface native point or changing its blend factor $\{A\}_{Vx}$. This may also be done by appropriate mapping of texture values to the sample points (vertices) of the 3D object surface 220 and varying the blend factor $\{A\}_T$ of the texturing coloration $\{R,G,B\}_T$.

The CPU 110 may also be given the task of locating surfaces that are totally covered by other opaquely-colored surfaces and of removing the vertex-based frameworks of those hidden surfaces to lessen the workload of the triangle engine.

The CPU 110 then constructs vertex-based draw lists in the form of the deferred instruction lists which are stored in region 144 of system memory.

Once a sufficiently-long list of deferred instructions has been developed for processing by the triangle engine 150, the CPU 110 sends an 'immediate' flow-control instruction to the triangle engine to set the triangle to work on the constructed list of deferred instructions area 144. The pipelined processing of information then passes to the triangle engine as indicated by flow line 415.

On occasion, the triangle engine 150 may run into an exception situation which requires intervention by the CPU 110. Such request for intervention is indicated by dashed flow line 455. The CPU responds accordingly with appropriate 'immediate' instructions.

Referring to box 450 of FIG. 4, once the triangle engine is set to work on a given worklist (see FIG. 7) the triangle engine 150 begins to periodically fetch from memory region 144 successive 'valid' portions of the worklist.

The worklist generally starts the triangle engine with an initial task of building a so-called 'new' triangle having three newly-defined vertices. Strip and fan formations may be developed from the 'new' triangle by replacing one of the previous three vertices with a new vertex and then computing the parameters of the new triangle that includes the substituted vertex.

With each set of three vertices, the pre-walk setup module 155 sorts the vertices as explained above. The symbol "(*)" in FIG. 4 indicates that this function may be bypassed through bypass path 159 and performed instead by the CPU or another means.

As box 450 further shows, the pre-walk setup module 152 of the triangle engine further computes various gradients for the walkers along the triangle edges and from pixel-center to pixel-center of each frame buffer row.

The edge walker 153 walks along the triangle edges. The span walker 154 walks across frame buffer rows. As span walker 154 stops at the dead-center of each respective frame buffer pixel, the walker 154 computes the iterated values $u_i$, $v_i$ and sends corresponding signals to texture mapper 155.

Texture mapper 155 fetches the requested texture data from its local cache. System software is responsible for seeing to it that the appropriate texture data is pre-loaded into the texture cache from a corresponding one of maps 143 and 145 in system memory. (Each triangle that is mapped onto the z=0 plane (the x-y plane) has a counterpart triangle mapped onto texture space 285 (onto the u-v plane). System software can predict from known vertex coordinates what portion of the texture space 285 will be covered while a given triangle is spanned in x-y space, and the system software can thus pre-load that data into the texture cache.) Note that in another embodiment, texture maps can be defined procedurally instead of with (or in combination with) look-up tables.

The texture mapper 155 includes the TLUT (texture lookup table) which converts the encoded texel data into full texture information $\{R,G,B,A\}_T$.

The blender module 156 blends the respective, various parameter signals as output $\{R,G,B,A,1/w\}_i$ by the span walker 154; as output $\{R,G,B,A\}_T$ by the texture mapper 155; and as originally found $\{R,G,B,1/w\}_{FB}$ in the frame buffer under-rendition 140 and 1/w buffer 146; and blends these parameter signals together to produce a new frame buffer coloration signal, $FB'=f(C_i, A_i, C_T, A_T, C_D)$ which is a function of the input signals, where $C_i$ represents $\{R, G, B\}_i$, $C_T$ represents $\{R, G, B\}_T$ and $C_D$ represents the original frame-buffer coloration information $\{R, G, B\}_{FB}$ before the new value is written into the destination. The calculation can also depend on a blend factor $A_D$ associated with the original frame buffer data.

After blending, the iterated depth factor $1/w_i$ is tested against the original frame buffer value $1/w_{FB}$ stored in buffer 146. If the test result proves true, the new coloration is written into the corresponding frame buffer location and the new $1/w_i$ value, if prevailing, is written into the corresponding location in depth buffer 146. If the test result is false, then no writing takes place. The depth test function is programmably selectable among the relationships: less than (<), less than or equal to ($\leq$), equal to (=), greater than or equal to ($\geq$) greater than (>) and not equal ($\neq$), as between $1/w_i$ and $1/w_{FB}$. The depth test function can also be selected to always or never write the new coloration or $1/w_i$ value. The desired test type is written by CPU 110 into the blend control registers 166. In actuality, the CPU 110 selects among the above test types separately for the question of whether to write coloration data and whether to write depth data. In another embodiment, the test type is predefined as one of the above relationships, is not changeable, and the same test applies to both questions.

Figure 5:
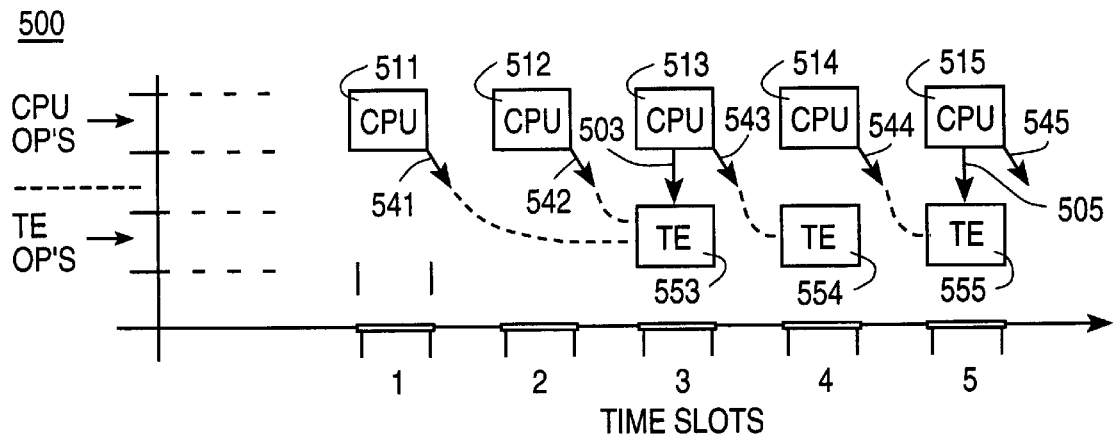
FIG. 5 is a timing diagram showing pipelined generation of deferred instructions and later execution of same by the triangle engine.

Referring to FIG. 5, time graph 500 illustrates 20 the overlapped pipeline operations of the CPU 110 and the triangle engine 150 in respective time slots 1, 2, 3, etc. Time-bounded operations of the CPU are respectively represented by boxes 511, 512, 513, 514, 515 for respective time slots 1–5. Time-bounded operations of the triangle engine are similarly represented by boxes 553, 554, 555 for respective time slots 3–5.

The creation of a deferred instruction list is represented by diagonal flow lines coming off of the CPU boxes such as lines 541, 542, 543, 544 and 545. Immediate instructions sent from the CPU to the TE are represented by vertical downlines such as 503 and 505.

Before the triangle engine 150 begins operations on a given worklist, the CPU may spend any number of time slots to generate the deferred instructions of that worklist as indicated by work flowlines 541 and 542.

At time slot 3 of the illustrated example, the CPU sends an immediate instruction 503 to the triangle engine to begin consuming a worklist having a pre-defined set of deferred instructions. The triangle engine begins to do so and at the same time the CPU may continue to generate more deferred instructions as indicated by work flowline 543. These newer instructions 543 may be picked up by the triangle engine 554 in time slot 4. Similarly in time slot 5, the CPU may send additional immediate instructions 505 to the triangle engine in combination with previously-formed deferred instructions 544. The input to the triangle engine may thus be a combination of both immediate and deferred instructions. The input to the triangle-engine 150 is not limited by the output bandwidth of the CPU 110.

Figure 6:
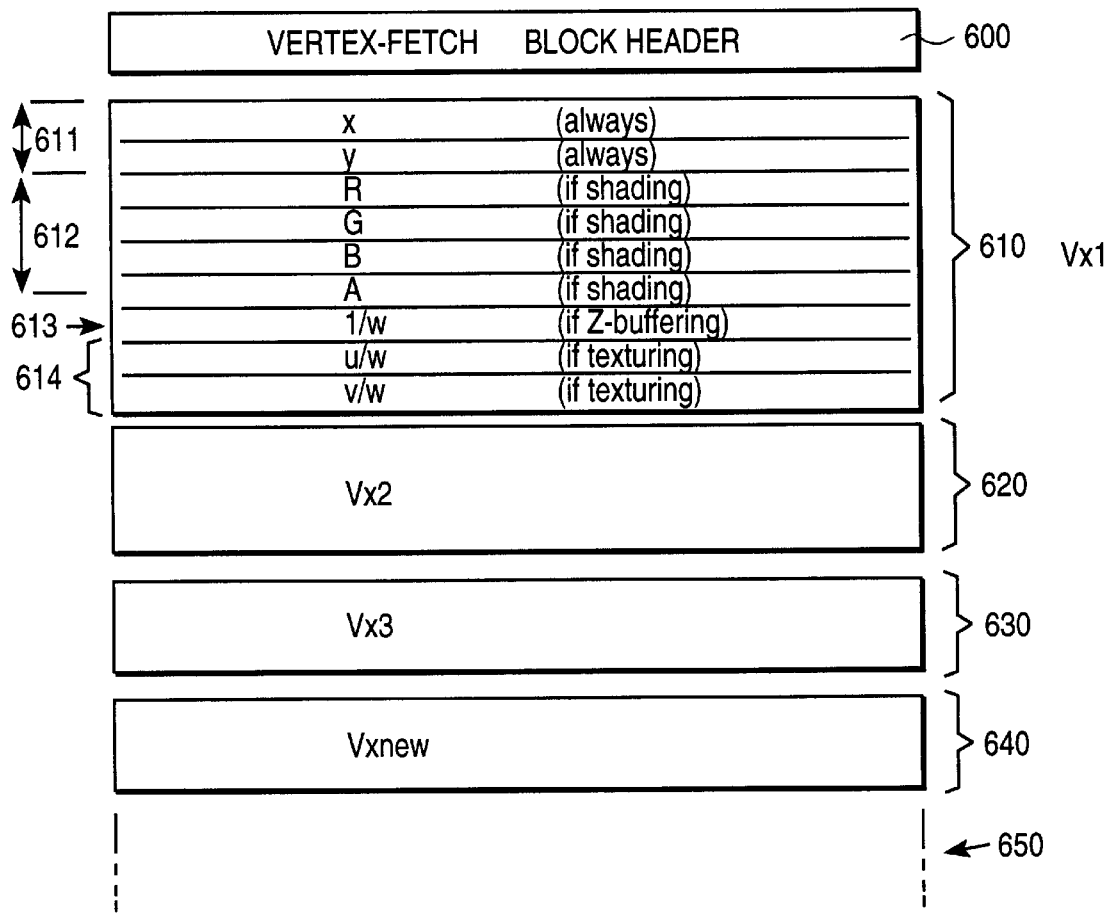
FIG. 6 shows the data structure of a group of short-format vertex instruction blocks and a corresponding block-defining header.

FIG. 6 shows a data structure that may be used in system memory region 144 to define a block of 'instructions' 610, 620, 630, 640, 650, etc. The listed instructions may be used for causing the triangle engine 150 to render one or more triangles, one or more 'points' or one or more other structures into the under-rendition FB 140.

The specific format of the instructions block is defined by a block header 600. The block header 600 includes a first field indicating how many instructions are included within its corresponding block. The block header 600 further includes a second field indicating the format of each instruction within its corresponding block. The instructions count and format may change on a block by block basis.

In the example of FIG. 6, it is assumed that the block header 600 has specified a collection of short-format vertex instructions for its corresponding block. The data structure for defining a first short-format vertex instruction is shown at 610. The size of instruction 610 will vary depending on which master functions are turned on or off within the triangle engine and which local functions are turned on or off within the block header 600.

Location-specifying words 611 for the image plane x and y coordinates are always present in a vertex instruction and are each 32 bits wide. Shading words 612 for RGBA are present only if shading is turned on. The reciprocal Z-buffering word 613 is present either if depth testing and buffering is turned on, or if texturing is turned on. (The texturing process needs 1/w in order to compute u and v from u/w and v/w.) The texture mapping words 614 for u/w and v/w are present only if texturing is turned on. Control fields within the block header 600 indicate whether for the local block, shading is turned on, Z-buffering is turned on and/or texturing is turned on.

The remaining instructions 620, 630, etc., under block header 600 all have the same size and format as first instruction 610.

Vertex instruction 620 contains the information for vertex $Vx_2$. Vertex instruction 630 contains the information for vertex $Vx_3$.

Vertex instruction 640 contains the information for a next vertex, in this example, $Vx_{new}$. The new vertex $Vx_{new}$ defines a substitute for one of previous vertices defined as oldest and medium. Replacement of oldest or medium is selected depending on whether strip or fan formation is turned on within the block header 600. When strip or fan formation is turned on, next triangles are specified with the addition of just one new vertex. Accordingly, a chain of many triangles each joined to the other by a common edge may be specified in a fairly compact manner that after the overhead of the block header and the first triangle in the chain, requires no more than one vertex instruction per triangle.

The block header for vertex instructions is 32-bits wide and has the format as set forth in TABLE V:

TABLE V

| Field | No. of Bits | Description |
|---|---|---|
| ID | 4 | Instruction identification code = vertex instruction. |
| VER | 4 | Hardware version number needed by the hardware platform to support this instruction block. |
| CNT | 16 | Instructions count. Indicates how many vertex instructions follow this header (1–65, 536). |
| SHADE | 1 | 0 = no shading information present in below vertex instructions, 1 = shading information is present. |
| PRSP | 1 | "1" = 1/w information is present in below groups, "0" = no perspective information is |

TABLE V-continued

| Field | No. of Bits | Description |
|---|---|---|
| | | present. |
| TEXT | 1 | "1" = texture information is present in below vertex instructions; "0" = no texture information is present. |
| NEW | 1 | "1" = the first three vertices define a new triangle for starting a strip or fan chain or for defining the triangle by itself. "0" = this is a continuation of a previous strip or fan chain. (This field is used only for short-format vertex instructions. When active, the new field causes all TE processing to halt until three new vertices have been in-loaded. |
| RM | 1 | Replace mode. Vxnew replaces the following: "0" = replace oldest (strip generation), "1" = replace medium (fan generation). |
| — | 3 | Reserved. |

One encoding of the instruction ID field indicates that short-format vertex instructions will be used such as shown in FIG. 6. Another encoding indicates that a so-called long-format will be used. The long format instruction activates bypass 159 so that the operations of the pre-walk setup module 152 are bypassed and the required information from that bypassed unit is instead provided by another source. The information in a long-format vertex instruction is as follows:

TABLE VI

| Information | Format | Outputs (Vertex) Inputs (Edge) |
|---|---|---|
| X-Coordinates | 12.0 | X1, X2 |
| Y-Coordinates | 12.0 | Y1, Y2, Y3 |
| Spatial Slopes | s12.0 | xstep_long |
| | | xstep_0 |
| | | xstep_1 |
| Characteristic Function Gradients | s12.0 | xystep_long |
| | | xystep_0 |
| | | xystep_1 |
| Characteristic Function Slopes | s12.0 | dy_long |
| | | dy_0 |
| | | dy_1 |
| Colors | 9.0 | R1, G1, B1 |
| Color Slopes | s9.11 | slope_r |
| | | slope_g |
| | | slope_b |
| | | dDx_r |
| | | dDx_g |
| | | dDx_b |
| Blend Factor | 9.0 | A1 |
| Blend Factor Slopes | s9.11 | slope_a |
| | | dDx_a |
| Textures (u/w, v/w) | 11.13 | uW1, vW1 |
| Depth (1/w) | 1.23 | W1 |
| Texture Slopes | s11.13 | slope_uW |
| | | slope_vW |
| | | dDx_uW |
| | | dDx_vW |
| Depth Slopes | s1.23 | slope_W |
| | | dDx_W |
| Scan Direction (Area) | s23.0 | R2L |

In a third encoding of the vertex instruction ID field, each vertex instruction may be used for coloring a single framebuffer pixel rather than an area covered by a triangle. In such a case each vertex instruction has the following format:

TABLE VII

| Information | Format | Outputs (Vertex) Inputs (Edge) |
|---|---|---|
| X-Coordinate | 12.0 | x |
| Y-Coordinate | 12.0 | Y |
| Colors | 9.0 | R1, G1, B1 |
| Depth Factor | 9.0 | A1 |
| Texture Depth | 1.23 | 1/W1 |

Figure 7:
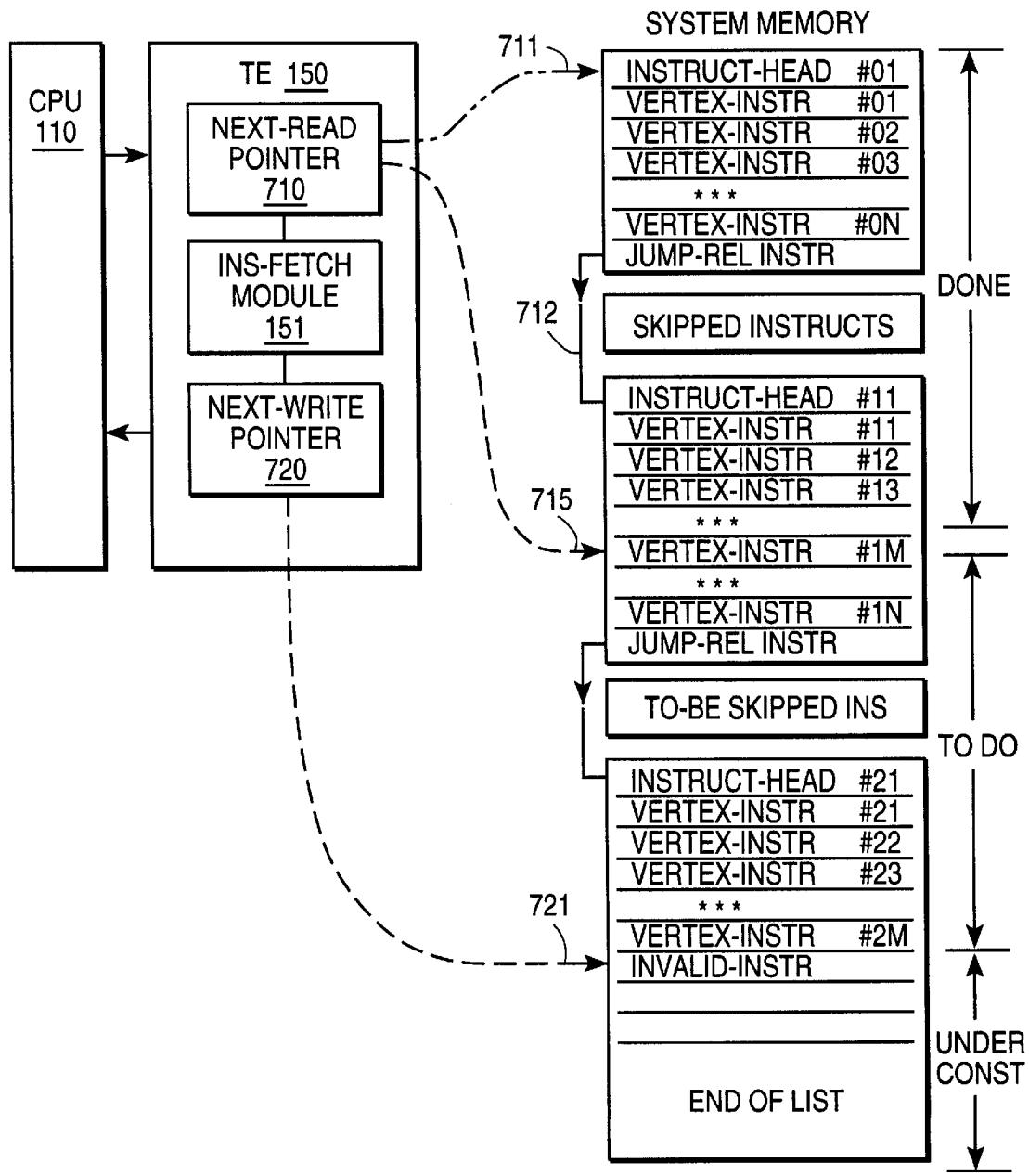
FIG. 7 illustrates how a deferred instructions list is constructed at a tail end while a higher up portion is simultaneously executed by the triangle-engine.
Figure 8:
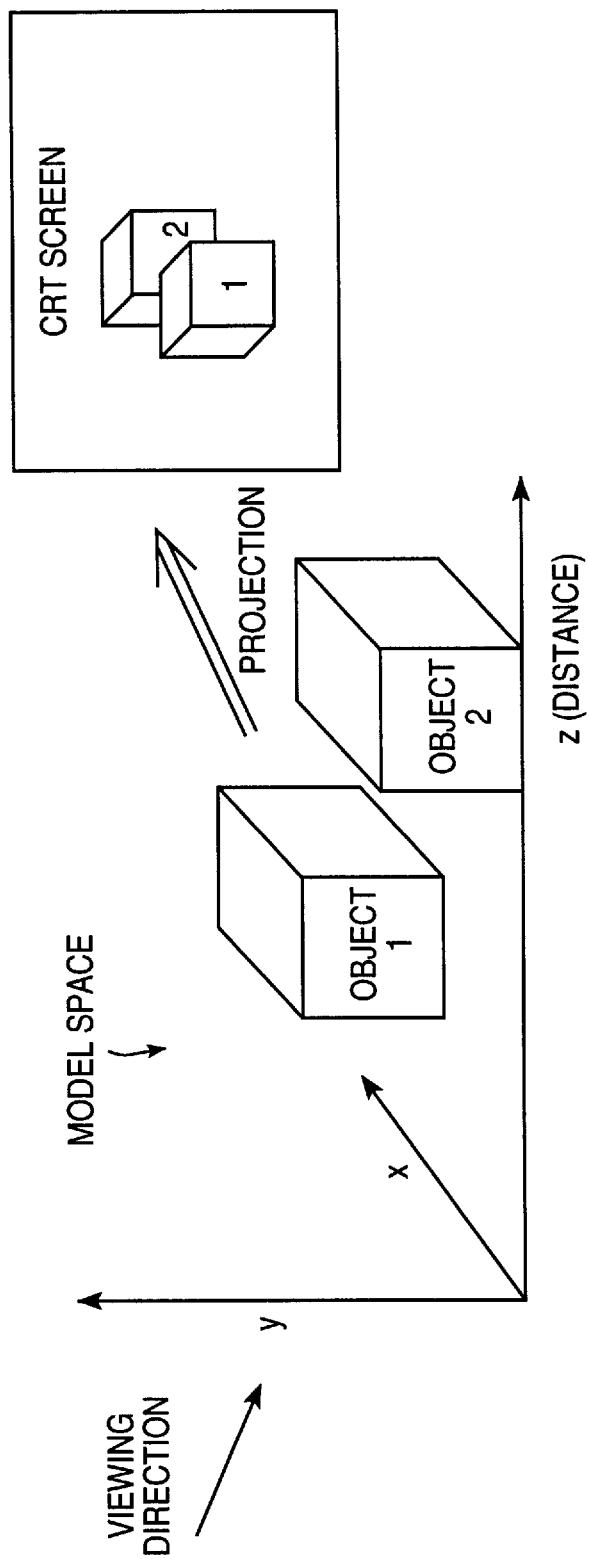
FIG. 8 illustrates a rendering of two graphic objects.
Figure 9:
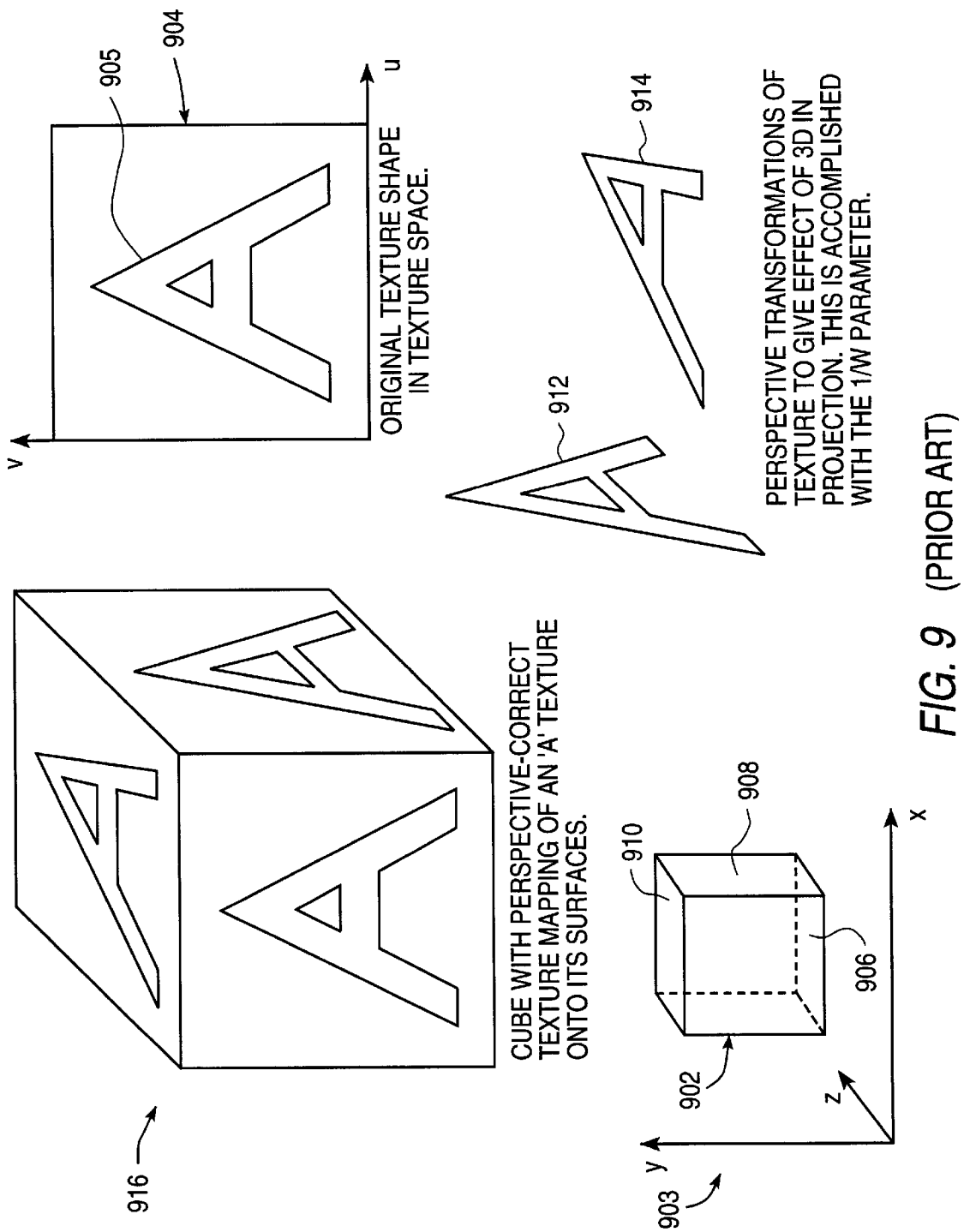
FIG. 9 illustrates a texture mapping of a texture onto a surface of a graphic object.
Figure 10:
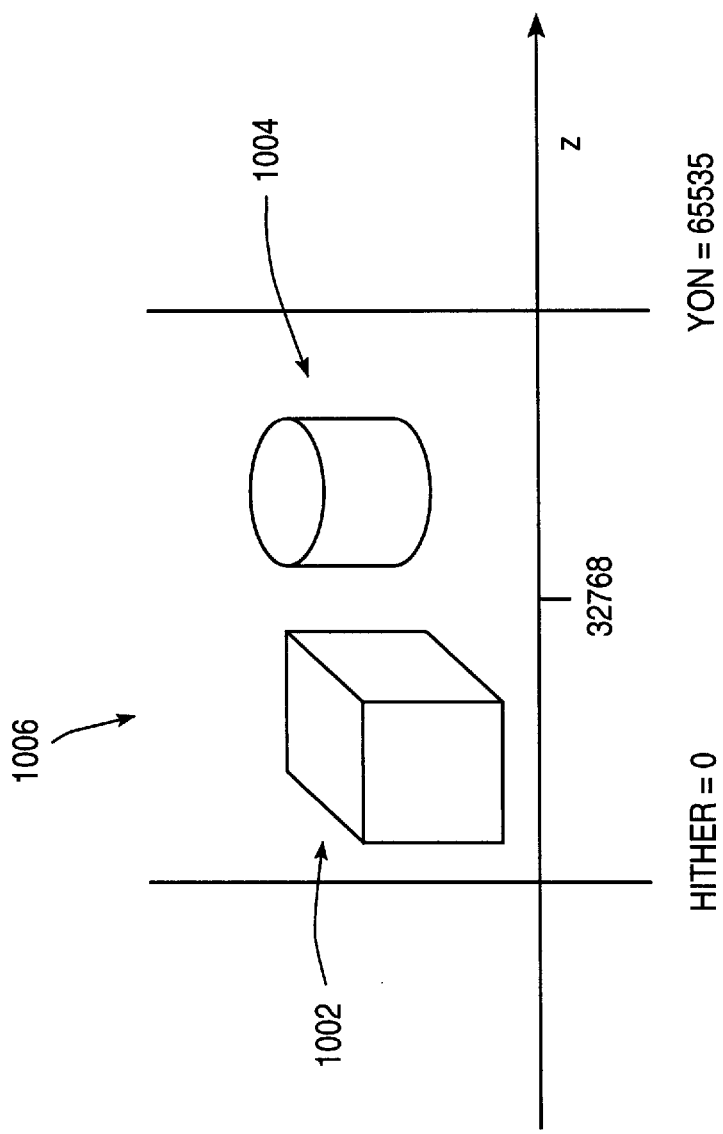
FIG. 10 illustrates rendering objects in a scene using a 16-bit canonical z buffer.
Figure 11:
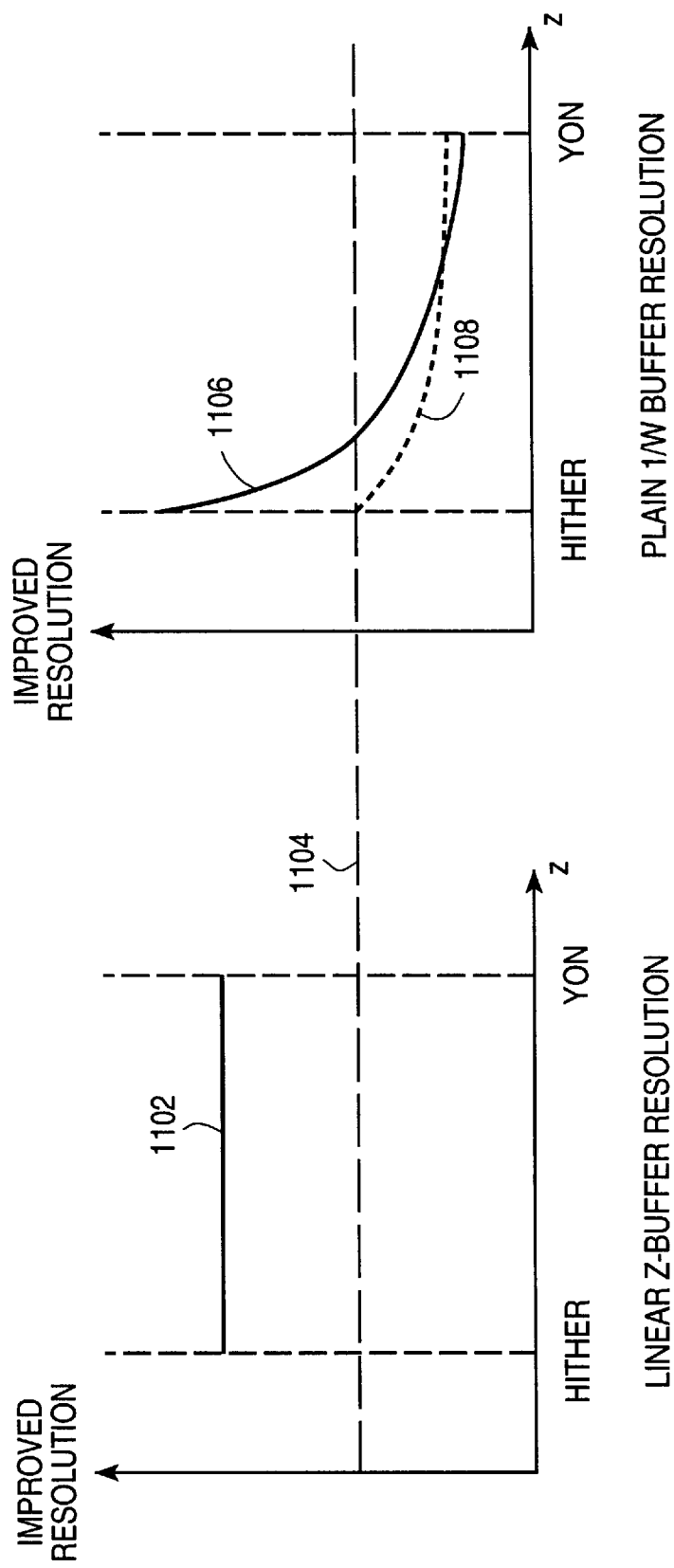
FIG. 11 illustrates the comparative resolutions of the z buffer and $1/w$ buffer values.
Figure 12:
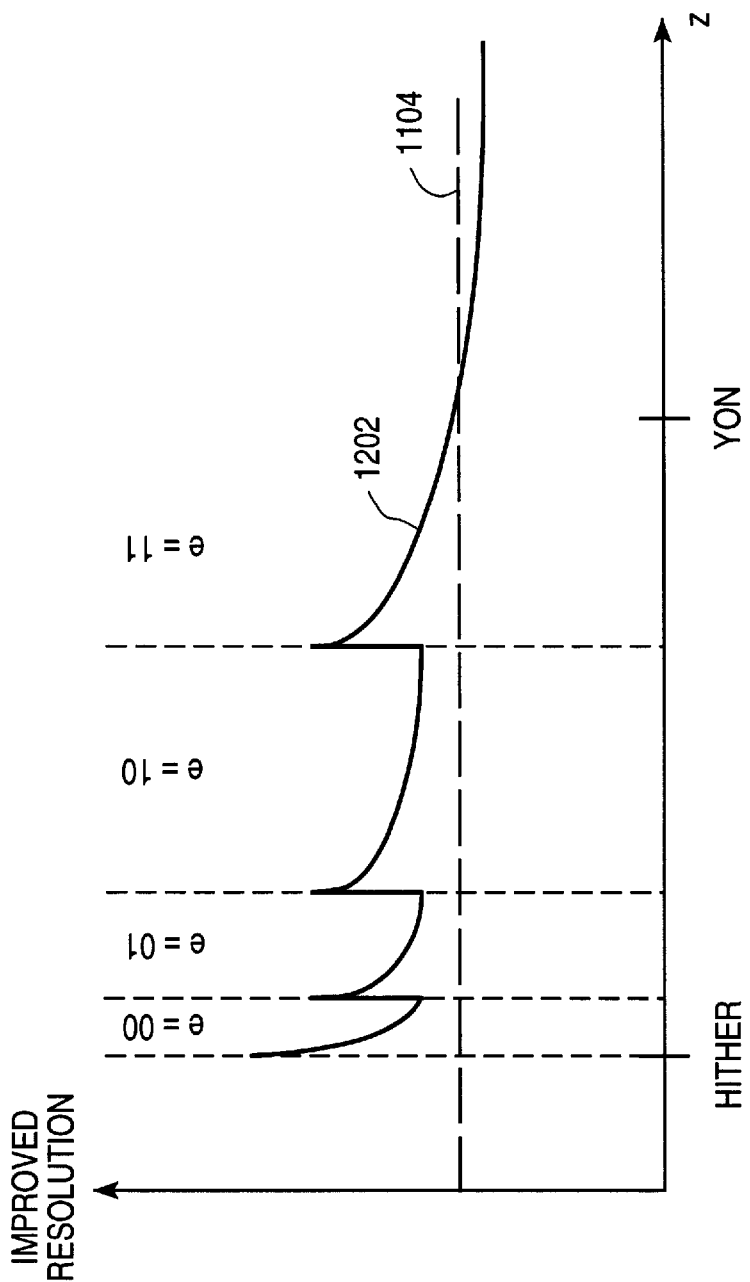
FIG. 12 illustrates depth value resolution for $1/w$ values normalized according to an aspect of the present invention.
Figure 13:
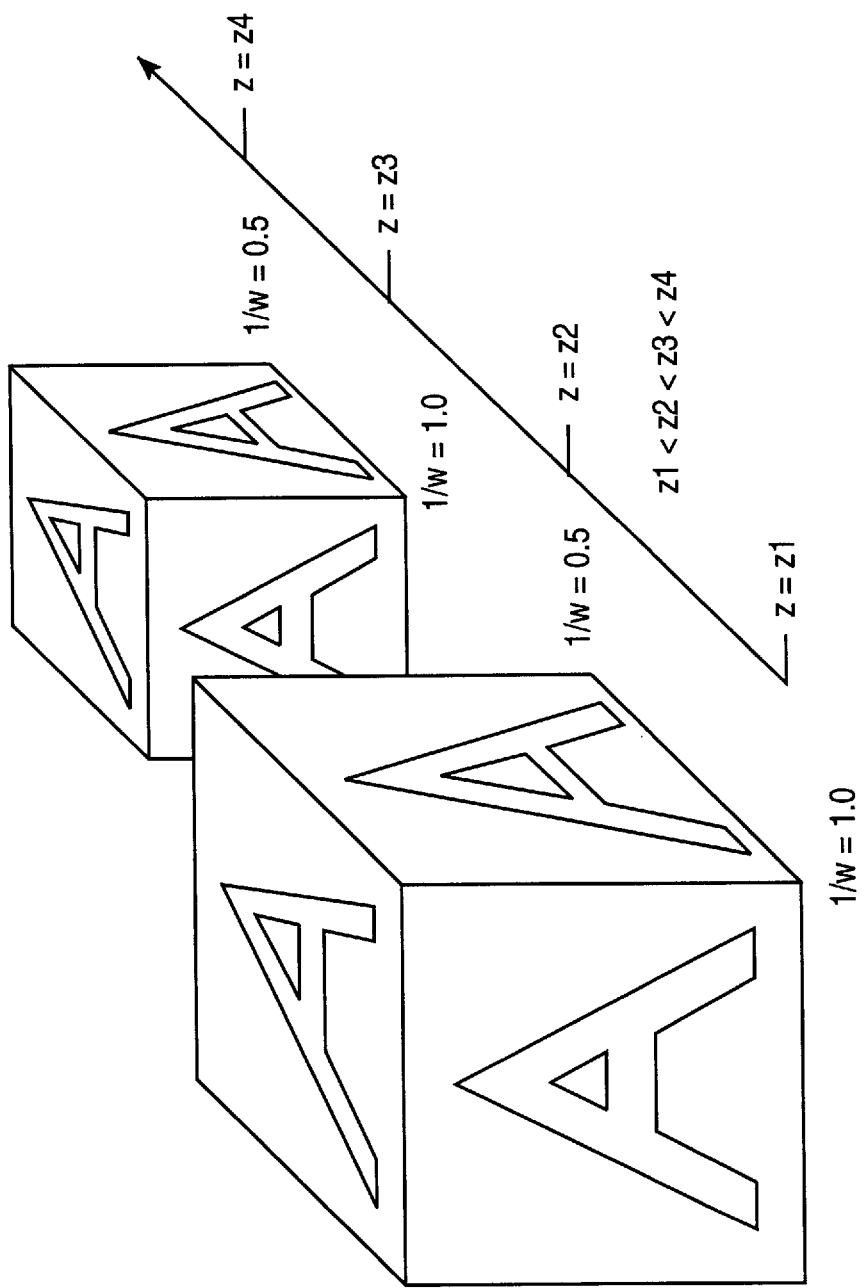
FIG. 13 illustrates scaling of $1/w$ parameters on an object-by-object basis.
Figure 14:
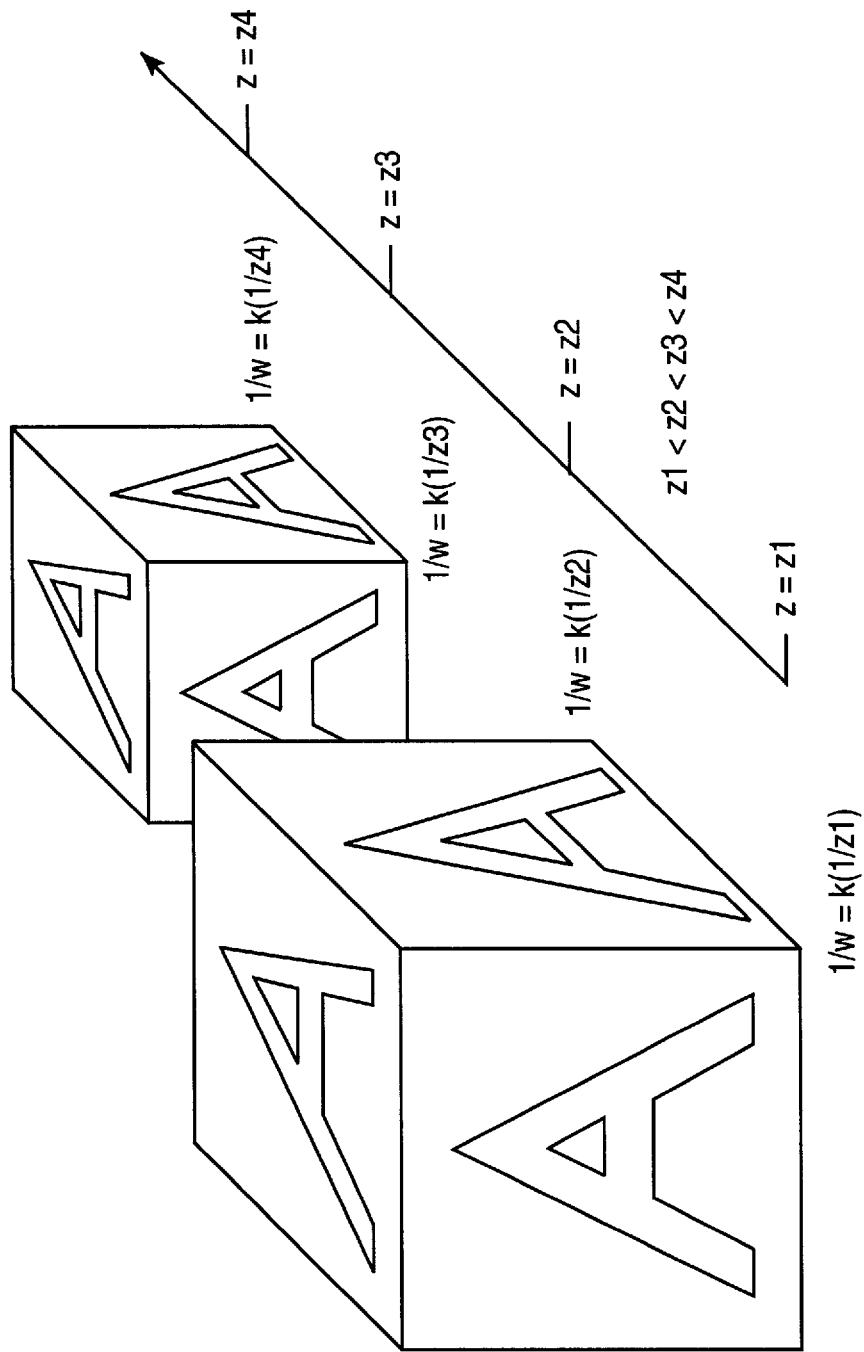
FIG. 14 illustrates scaling of all $1/w$ parameters by a constant scaling factor k.

Referring to FIG. 7, the triangle engine 150 includes a next-read pointer register 710 and a next-write pointer register 720.

The contents of the next-read pointer register 710 point to the location 715 in system memory containing the instruction to be now executed by the triangle engine 150. After the instruction fetch unit 151 has fetched this instruction, it normally increments the next-read pointer register 710 to the next sequential instruction in memory, unless otherwise commanded.

One way that the instruction fetch unit 151 can be otherwise commanded is if the most recent instruction is a flow-control instruction telling the fetch unit 151 to instead add a relative jump value to the value currently in the next-read pointer register 710. A relative jump around skipped instructions is indicated for example at 712.

Another way that the normal fetch sequence of instructions is altered is when the CPU supplies an immediate command for changing instruction flow.

The next-write pointer register 720 points to a location 721 in the deferred instructions area 144 of system memory where a next instruction may be inserted and thus appended onto the currently active worklist. (Region 144 can store more than one worklist.)

The next-read pointer 710 sweeps down from the top of the active TE worklist (from initial position 711) towards the position 721 of the next-write pointer 720. If the next-read pointer 710 advances so quickly that it bumps into the location 721 pointed to by the next-write pointer 720, the triangle engine 150 takes this to mean that it has exhausted its worklist. The triangle-engine then stops and sends an interrupt to the CPU 110.

An already-done portion (DONE) of the worklist is defined by the sweep of the next-read pointer from initial position 711 to current position 715. The still to-be-done portion (TO DO) of the instruction list continues from beyond pointer 715 to just before the position pointed to by pointer 721. The under-construction portion of the list is defined as beginning at the location 721 pointed to by pointer register 720 and continuing down to the end of the list area.

The next-read pointer register 710 and next-write pointer register 720 are part of the fetch control register set 161 shown in FIG. 1B. A description will now be provided of these and other triangle engine control registers. The following convention is used to describe the accessibility of registers within the triangle engine 150:

TABLE VIII

| Mode | Description |
|---|---|
| R | The register/bit can be read as part of the address space of system memory. |
| W | The register/bit can be written to directly as part of the address space of system memory. |
| S | The register/bit supports a bit-masked set |

TABLE VIII-continued

| Mode | Description |
|---|---|
| | operation. |
| C | The register/bit supports a bit-masked clear operation. |
| § | The register/bit may only be accessed (read/write) by a privileged supervisor (e.g. by a command signal coming by way of the PPC bus interface 115 from the CPU only and not by a deferred instruction fetched by way of the memory interface unit 151). |
| NA | Register/bits not available. |

Set and clear masks are provided so that individual bits may be set or reset without changing other fields within a given register.

Read/write access to certain registers is privileged as indicated by the '§' symbol. The contents of a § privileged register or field can only be read or modified by a privileged command signal coming from a privileged unit such as the CPU (e.g. and optionally further constrained to the condition of when the CPU is in privileged supervisor mode) and not by a non-privileged access request such as might come from a deferred instructions list by way of memory interface module 151. If a non-privileged access attempt is made to a privileged register, an access violation interrupt is automatically generated by the TE 150.

The following first set of registers defines a so-called master control set which applies to the basic function blocks of the triangle engine:

TABLE IX

| Register Name | Field Name | Bits | Access | Description |
|---|---|---|---|---|
| TE_MasterMode | | 32 | § RWSC | |
| | DShade | 1 | § RWSC | Disable shading |
| | DZBuff | 1 | § RWSC | Disable Z buffering |
| | DText | 1 | § RWSC | Disable texturing |
| | DBlend | 1 | § RWSC | Disable destination blender |
| | DDith | 1 | § RWSC | Disable dithering |
| | RSET | 1 | § RWSC | Reset the entire Triangle Engine |
| | — | 26 | N/A | reserved |

Note that each field of the TE MasterMode register is modifiable only by a privileged command giver (e.g., the CPU), meaning that wayward software or a bad deferred instructions list is unlikely to modify these master registers.

When shading is disabled, the pre-walk setup module 152 bypasses the step of solving for the linear equation constants for the shading values.

When texturing is disabled, the texture mapper 155 bypasses the step of fetching texture data from memory.

When destination blending is disabled, the blender module 156 bypasses the step of fetching the old values from the frame buffer under rendition, and also bypasses most other destination blend functions.

TABLE X

| Register Name | Field Name | Bits | Access | Description |
|---|---|---|---|---|
| TE_I_Cntl | | 32 | § RWSC | Immediate flow-control instruction register |
| | STRT | 1 | § RWSC | Start triangle engine execution at the |

TABLE X-continued

| Register Name | Field Name | Bits | Access | Description |
|---|---|---|---|---|
| | | | | deferred instruction address specified in the below TE_I_Cntl_Data register |
| | STPI | 1 | § RWSC | Stop execution after current instruction |
| | STPL | 1 | § RWSC | Stop execution at end of current instruction list |
| | RSTRT | 1 | § RWSC | Restart execution from stop point |
| | STEP | 1 | § RWSC | Single step - execute next instruction and then flush the TE pipeline |
| | INT | 1 | § RWSC | Interrupt CPU after completion of current instruction |
| | — | 26 | N/A | reserved |

TABLE XI

| Register Name | Bits | Access | Description |
|---|---|---|---|
| TE_I_Cntl_Data | 32 | § RW | Contains data referenced by instructions generated by the TE_I_Cntl flow control register |

TABLE XII

| Register Name | Field Name | Bits | Access | Description |
|---|---|---|---|---|
| TE_D_Cntl | | 32 | § RWSC | Deferred instructions flow control register |
| | JR | 1 | § RWSC | Jump relative - use TEDCntlData as a 2's complement offset |
| | JA | 1 | § RWSC | Jump absolute - use the TEDCntrlData as destination address |
| | PSE | 1 | § RWSC | Pause execution |
| | INT | 1 | § RWSC | Interrupt the CPU and use contents of TEDCntlData as the vector data for the interrupt |
| | SYNC | 1 | § RWSC | Pause instruction execution until TE pipeline has been flushed |
| | TLD | 1 | § RWSC | Load new texture data into texture cache |
| | — | 26 | N/A | reserved |

TABLE XIII

| Register Name | Bits | Access | Description |
|---|---|---|---|
| TEDCntlData | 32 | § RW | Data referenced by TEDCntl register |

TABLE XIV

| Register Name | Bits | Access | Description |
|---|---|---|---|
| IRP | 32 | § R | Read pointer register which points to instruction currently being executed by triangle engine |

TABLE XV

| Register Name | Bits | Access | Description |
|---|---|---|---|
| IWP | 32 | § RW | Instruction write pointer points to the first empty memory location beyond the end of list |

TABLE XVI

| Register Name | Field Name | Bits | Access | Description |
|---|---|---|---|---|
| IntEn | | 32 | § RWSC | Interrupt enable word |
| | ImIntEn | 1 | § RWSC | Immediate Interrupt Enable |
| | FBClipIntEn | 1 | § RWSC | Pixels were discarded due to frame buffer clipping |
| | ALUStatIntEn | 1 | § RWSC | Check for >, =, and < |
| | ZFuncStatIntEn | 1 | § RWSC | Result of Z buffering |
| | AnyRendIntEn | 1 | § RWSC | At least 1 pixel was rendered |
| | SuperIntEn | 1 | § RWSC | Supervisor error interrupt |
| | UiInstrIntEn | 1 | § RWSC | Un-implemented instruction interrupt enable |
| | SpInstrIntEn | 1 | § RWSC | Special instruction interrupt enable |
| | — | 14 | | reserved |

TABLE XVII

| Register Name | Field Name | Bits | Access | Description |
|---|---|---|---|---|
| IntStat | | | § RWSC | Triangle engine interrupt status word |
| | ImInt | 1 | § RWSC | Immediate interrupt |
| | FBClipInt | 1 | § R | Pixels were discarded due to frame buffer clipping |
| | ALUStatInt | 1 | § R | Check for >, =, and < |
| | ZFuncStatInt | 1 | § R | Result of Z buffering |
| | AnyRendInt | 1 | § R | At least 1 pixel was rendered |
| | SuperInt | 1 | § RWC | Supervisor error interrupt |
| | UiInstrInt | 1 | § RWC | Un-implemented instruction interrupt status |
| | SpInstrInt | 1 | § RWC | Special instruction interrupt status |
| | WinClipInt | 1 | § R | Pixels were discarded due to window clipping |
| | ListEndInt | 1 | § RWC | IRP == IWP (End of worklist has been hit.) |
| | ImInstrInt | 1 | § RWC | Immediate instruction interrupt status |
| | DfInstrInt | 1 | § RWC | Deferred instruction interrupt status |
| | DfInstrIntVect | 8 | § RWC | Deferred instruction interrupt vector |
| | — | 12 | | reserved |

TABLE XVIII

| Register Name | Field Name | Bits | Access | Description |
|---|---|---|---|---|
| Vertex Control | | 32 | § RWSC | |
| | VtxSnoopEn | 1 | § RWSC | Vertex snoop enable |
| | — | 31 | N/A | reserved |

The following table describes the registers within the setup control register set 162 of FIG. 1B. Each of the setup registers contains a full floating point value having one sign bit, seven exponent bits and 24 mantissa bits.

TABLE XIX

| Register | Access | Description |
|---|---|---|
| a_x | § RW | x coordinate of Vertex A |
| a_y | § RW | y - VxA |
| a_r | § RW | R - VxA |
| a-g | § RW | G - VxA |
| a_b | § RW | B - VxA |
| a_a | § RW | A - VxA |
| a_W | § RW | 1/w - VxA |
| a_uW | § RW | u/w - VxA |
| a_vW | § RW | v/w - VxA |
| iv1–7 | § RW | seven registers for intermediate variables 1–7 |
| b_x | § RW | x - VxB |
| b_y | § RW | y - VxB |
| b_r | § RW | R - VxB |
| b_g | § RW | G - VxB |
| b_b | § RW | B - VxB |
| b_a | § RW | A - VxB |
| b_W | § RW | 1/w - VxB |
| b_uW | § RW | u/w - VxB |
| b_vW | § RW | v/w - VxB |
| iv8–14 | § RW | intermediate variables 8–14 |
| c_x | § RW | x - VxC |
| c_y | § RW | y - VxC |
| c_r | § RW | R - VxC |
| c_g | § RW | G - VxC |
| c_b | § RW | B - VxC |
| c_a | § RW | A - VxC |
| c_W | § RW | 1/w - VxC |
| c_uW | § RW | u/w - VxC |
| c_vW | § RW | v/w - VxC |
| iv15–21 | § RW | intermediate variables 15–21 |

TABLE XX

| Register Name | Field Name | Bits | Access | Description |
| --- | --- | --- | --- | --- |
| Vertex State | | 32 | § RW | Triangle engine interrupt status word |
| | VCNT | 2 | § RW | Number of valid vertices |
| | TSORT | 3 | § RW | Order of incoming vertices, which is old, which is middle and which is new for vertices A, B, C |
| | — | 27 | | reserved |

The walkers control register set 163 includes the following specified registers

TABLE XXI

| Register Name | Field Name | Bits | Access | Description |
| --- | --- | --- | --- | --- |
| ES_Cntl | | 32 | § RWSC | Edge and span walkers control |
| | PRSPOff | 1 | § RWSC | Perspective calculations off |
| | DUScan | 1 | § RWSC | Down/Up Scan direction flag |
| | DSPOff | 1 | § RWSC | Disables double strike prevention |
| | reserved | 29 | N/A | |

TABLE XXIa

| Register Name | Field Name | Bits | Access | Description |
| --- | --- | --- | --- | --- |
| ESCapAddr | | 32 | § RW | Address for edge-walker buffer capture |
| | ESCapAddr | 6 | § RW | Provides access to the following internal registers of the edge walker |
| | reserved | 26 | N/A | |

TABLE XXII

| Edge Walker Buffer | Access | Description |
| --- | --- | --- |
| X1 | § R | |
| Y1 | § R | |
| R1 | § R | |
| G1 | § R | |
| B1 | § R | |
| A1 | § R | |
| W1 | § R | |
| uW1 | § R | |
| vW1 | § R | |
| X2 | § R | |
| Y2 | § R | |
| Y3 | § R | |
| xstep_0 | § R | |
| xstep_1 | § R | |
| xstep_long | § R | |
| xystep_0 | § R | |
| xystep_1 | § R | |
| xystep_long | § R | |
| dy_0 | § R | |
| dy_1 | § R | |
| dy_long | § R | |
| dDx_r | § R | |

TABLE XXII-continued

| Edge Walker Buffer | Access | Description |
| --- | --- | --- |
| dDx_g | § R | |
| dDx_b | § R | |
| dDx_a | § R | |
| dDx_W | § R | |
| dDx_uW | § R | |
| dDx_vW | § R | |
| slope_r | § R | |
| slope_g | § R | |
| slope_b | § R | |
| slope_a | § R | |
| slope_W | § R | |
| slope_uW | § R | |
| slope_vW | § R | |
| R2L | § R | |

The blender unit 156 is subdivided into two successive modules: a texture blender, followed by a destination blender. Texture blending creates a combination of the iterated values $\{R,G,B,A\}_i$ and the corresponding texture components $\{R,G,B,A\}_T$. In the destination blender portion of blender module 156, this blended value is then blended with the frame buffer value from a source frame buffer, or has other operations performed on it. The following 32-bit wide registers in system memory address space are for use with the texture-blending portion of module 156.

TABLE XXIII

| Register Name | Access | Description |
| --- | --- | --- |
| PIP | § RW | PIP RAM |
| TXTCntl | § RWSC | Texture Mapper master control register |
| TxtLdCntl | § RWSC | Texture loader control register |
| TxtAddrCntl | § RWSC | Address Generation Control Register/Filter modes |
| TxtPIPCntl | § RWSC | PIP control register |
| TxtTABCntl | § RWSC | Texture Application Control Register |
| TxtLODBase0 | § RW | LOD 0 Base Address |
| TxtLdDstBase | § RW | Texture load destination base |
| TxtMMDestBase | § RW | MMDMA Destination Base |
| TxtLODBase1 | § RW | LOD 1 Base Address |
| TxtLODBase2 | § RW | LOD 2 Base Address |
| TxtLODBase3 | § RW | LOD 3 Base Address |
| TxtLdSrcAddr | § RW | Texture decompressor source register |
| TxtMMSrcBase | § RW | MMDMA source base |
| TxtByteCnt | § RW | Byte Count for MMDMA |
| TxtRowCnt | § RW | Row count for uncompressed texture load |
| TxtTexCnt | § RW | Texel Count for compressed texture load |
| UVmax | § RW | Texture Size Register |
| UVmask | § RW | Texture Mask Register |
| TxtSRCType01 | § RWSC | Source Description Registers - Type 0 and 1 |
| TxtSRCType23 | § RWSC | Source Description Registers - Type 2 and 3 |
| TxtExpType | § RWSC | Expanded Type Description Register |
| TxtSRCConst0 | § RW | Source Expansion Constant Register - Type 0 |
| TxtCLRConst | § RW | MMDMA Clear Constant Register |
| TxtCATConst0 | § RW | PIP Constant color - SSB = 0 |
| TxtSRCConst1 | § RW | Source Expansion Constant Register - Type 1 |
| TxtPIPConst1 | § RW | PIP Constant color - SSB = 1 |
| TxtSRCConst2 | § RW | Source Expansion Constant Register - Type 2 |
| TxtCATIConst0 | § RW | Texture Application Constant color - SSB = 0 |
| TxtSRCConst3 | § RW | Source Expansion Constant Register - Type 3 |

TABLE XXIII-continued

| Register Name | Access | Description |
| --- | --- | --- |
| TxtCATIConst1 | § RW | Texture Application Constant color - SSB = 1 |
| TxtSRCExp | § RWSC | Source Expansion Control Registers - Types 0, 1, 2 and 3 |

The following are registers used by the destination blender:

TABLE XXIV

| Register Name | Access | Description |
| --- | --- | --- |
| Snoop | § RWSC | Snoop control for Dest Blender |
| IOCntl | § RWSC | Destination Blend I Control |
| DitherMatA | § RWSC | First half of 4 × 4 × 4 dither matrix |
| DitherMatB | § RWSC | Second half of 4 × 4 × 4 dither matrix |
| FBClipEn | § RWSC | Enable clipping to frame buffer - this should be on by default |
| FBClip | § RWSC | X and Y frame buffer clip values |
| WinClipEn | § RWSC | Enable X/Y Clipping (inside or outside clip region) |
| XWinClip | § RW | X window clip values |
| YWinClip | § RW | Y window clip values |
| WrCntl | § RWSC | Write Control register |
| reserved | N/A | |
| Wr32Bpp | § RWSC | Wr pixel format (16 or 32 bpp) |
| WrOutEn | § RWSC | Master control for component output (turned of for Z rendering or test rendering |
| WrBaseAddr | § RW | Write base pointer |
| WrXStride | § RW | x Stride value - Distance in words to next line |
| SrCntl | § RWSC | Read Control register |
| SrcBaseAddr | § RW | Read base pointer |
| SrcXStride | § RW | Stride value - Distance in words to next line |
| SrcOffset | § RW | X and Y Offset used for reads |
| ZCntl | § RWSC | Z Buffer Control register |
| ZBaseAddr | § RW | Z Base address - NO double buffered plus stereo!! |
| ZXYOffset | § RW | X and Y Offset used for Z. Offset calc is performed before clipping |
| ZClip | § RW | Max clip values used for Z window |
| SSBDSBCntl | § RWSC | SSB & DSB (D-bit) Control register |
| RGBCntl | § RWSC | per component enable for output (otherwise recycle old value) |
| ConstIn | § RW | Const used for computation input |
| TxtMultCntl | § RWSC | Texture color multiplication control |
| DmTxtConst0 | § RW | Coef consts "0" |
| DmTxtConst1 | § RW | Coef consts "1" |
| SRCMultCntl | § RWSC | Texture color multiplication control |
| DmSrcConst0 | § RW | Coef consts "0" |
| DmSrcConst1 | § RW | Coef consts "1" |
| ALUCntl | § RWSC | ALU Control register |
| SrcAlphaCntl | § RWSC | Control of source alpha |
| DestAlphaCntl | § RWSC | Control of destination alpha |
| DestAlphaConst | § RW | Destination Alpha constants |
| Status | § R | Status indication word |
| IntCntl | § RWSC | Mask indicating which ALU and Z results should generate interrupts |

The various privileged (§) and non-privileged registers may be read from or written to by correspondingly privileged and non-privileged control means for carrying out their respective functions. A privileged control means can of course, always access a non-privileged TE register.

Figure 15:
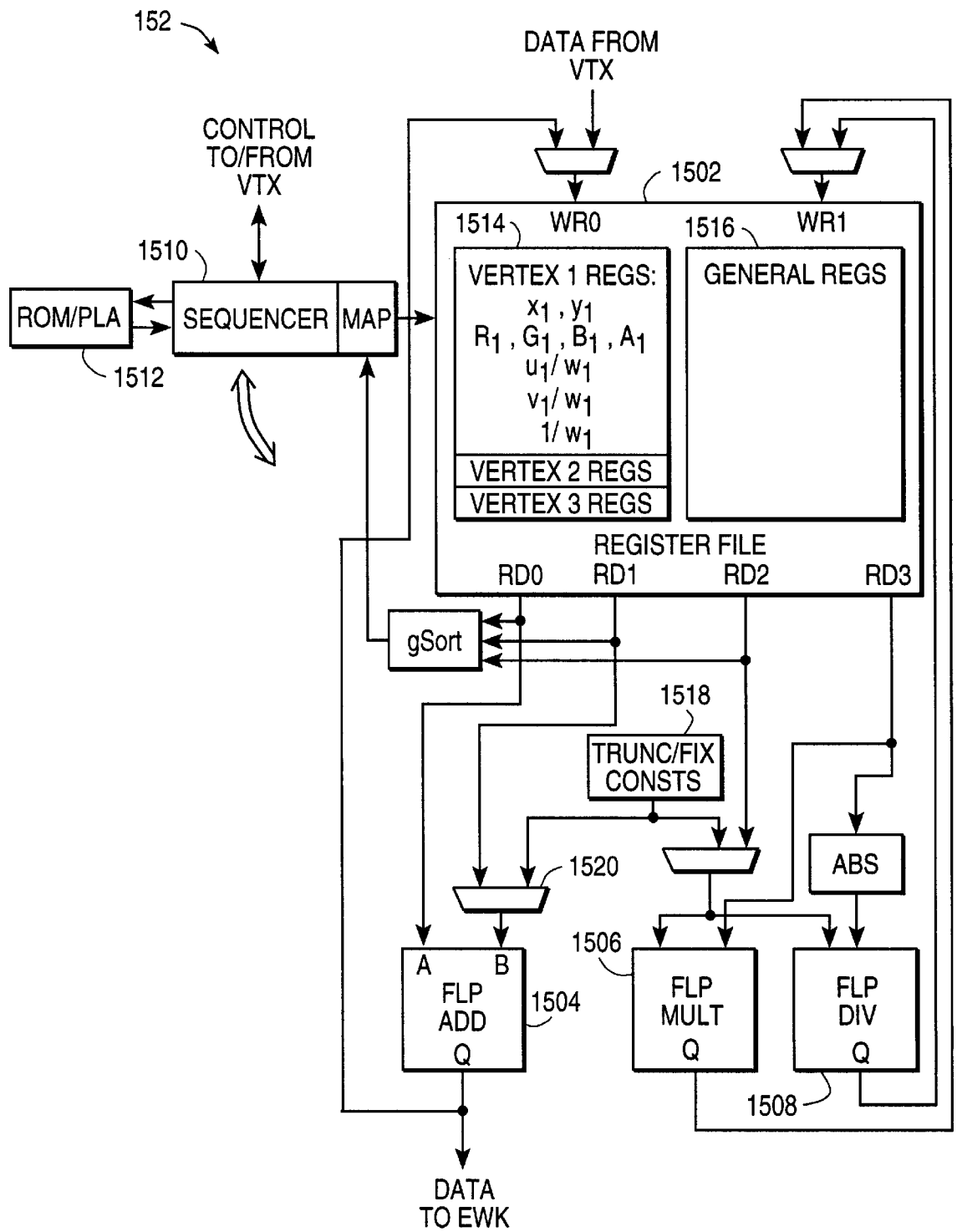
FIG. 15 is a block diagram illustrating the major functional blocks of the set-up engine 152 (FIG. 1B)

FIG. 15 is a block diagram illustrating the major functional blocks of the set-up engine 152 (FIG. 1B). As previously described, the set-up engine takes the data at the three vertices of a triangle to be rendered, and calculates the various slopes and gradients used by the remainder of the pipeline to reconstruct the triangle. The center of the engine is a multi-port register file 1502 having four read ports and two write ports. Two of the read ports serve a floating point adder 1504, and the remaining two read ports are shared between a floating point multiplier 1506 and a floating point divider 1508. One write port serves the adder and also input data from the vertex unit 151. The second write port serves the multiplier 1506 and divider 1508. Output data to the edge walker control registers 163 is through the output from the adder 1504, because the last operation in all cases is a float→fix calculation.

The set-up engine 152 is controlled by a sequencer 1510, the microcode for which is stored in a ROM/PLA 1512.

The register file 1502 contains three sets of vertex registers 1514, as well as a number of general registers 1516 for storing intermediate variables. Numbers received from the vertex unit 151 as "next vertex" data are in IEEE floating point format. However, they are converted into an internal floating point representation before being stored in the register file 1502. When a new vertex is received, the vertex engine 151 indicates a replace mode via a vtx_stpRM signal. This signal indicates which of the three preexisting vertices in the register file 1502 is to be replaced, and depends on whether the current sequence of triangles is a strip or a fan sequence.

One of the operations performed by the floating point arithmetic units in the set-up module 152 in conjunction with the sequencer 1510 is conversion of the 1/w, u/w and v/w values from the internal floating point format to a block-fix format before they are output to the edge walker control registers 163. The block-fix format at this stage contains 24 bits of significand and a 2-bit "w-range" value. A w-range value of 0 indicates that the significand ranges between [⅛, 1). A w-range value of 1 indicates that the significand ranges between [1/64, ⅛). A w-range value of 2 indicates that significand ranges between [1/512, 1/64). A w-range value of 3 indicates that significand ranges between (0, 1/512). In essence, each w-range increment indicates a left-shift of three bits, so that a number encoded in the block-fix format can be calculated as $s \times 2^{-3e}$, where s is the significand and e is the w-range value.

The floating point arithmetic units illustrated in FIG. 15 are unimportant for an understanding of the present invention, except to note that they, in conjunction with the sequencer 1510, perform the block-fixing operation for the 1/w data output to the edge walker. This is done by examining the 1/w values stored in the vertex registers 1514 for all three current vertices, to determine the highest-numbered w-range into which they can be shifted. This w-range is given by the integer part of one-third of the smallest number of leading zeros in any of the three 1/w values (but no more than nine bits of left shifting). Significant hardware savings downstream of the set-up engine 152 is achieved by shifting all three 1/w values into the same w-range, rather than maintaining each in its own optimal w-range. Therefore, only one w-range value is passed to the downstream hardware from the set-up engine 152. Additionally, once the w-range is determined based on the 1/w values for the existing three vertices, the apparatus also shifts the u/w and v/w values for each of the three vertices in the vertex registers 1514, into the same w-range before passing these values downstream. The advantage of using the same w-range for the u/w and v/w values will become apparent below. Once the 1/w, u/w and v/w values have been converted to this block-fix format, it will be appreciated that downstream calculations, such as interpolation, will be able maintain up to nine bits of additional precision while still using what is essentially fixed-point arithmetic.

For example, as previously mentioned, the duties of the set-up engine 152 include calculating slope and d/dx values for the 1/w, u/w and v/w values. Because the 1/w, u/w and v/w values for all three vertices are already represented in the same w-range in the block-fix format, these calculations can be performed using only significands. The w-range value is not referenced, and the resulting slope and d/dx values are inherently block-fixed in the same w-range.

The floating point units in FIG. 15 perform the block-fix function by applying a relevant constant from a constants array 1518, via a multiplexer 1520, to the B input of the floating point adder 1504. The basic operation of a fix is to shift the mantissa of the floating point number from the vertex register 1514 by the number of places denoted by the difference in the exponents of the number to be fixed and the fix constant, which is always an Order of Magnitude 0 (OMZ). In the normal course of events, this entails a right shift since the number to be fixed is within a range which is less than the fix constant. However, the number can exceed its allotted range, in which case a left shift is performed by the number of places denoted by the difference in the exponents. Initially, the exponents from the two inputs A and B of the floating point adder 1504 are compared. If the exponent of A is smaller than the exponent of B, then A is right shifted by the difference in the exponents. The least significant bits are discarded. If the exponent of B is smaller than the exponent of A, then the number has exceeded its allotted range, in which case A is shifted to the left by the difference in exponents and the most insignificant bits are discarded. The output is then provided to the edge walker as a 32-bit word having a sign bit, an exponent portion cleared to zero, and a mantissa portion. The mantissa portion has the fixed point value left justified therein, the remaining bits being zero.

Note that the block-fix format for values 1/w, u/w and v/w is used only when triangles are specified using the short form of vertex instructions. For triangles specified using long form vertex instructions, the set-up engine is bypassed and 1/w, u/w and v/w values are transmitted to the edge walker always in w-range 0.

Figure 16:
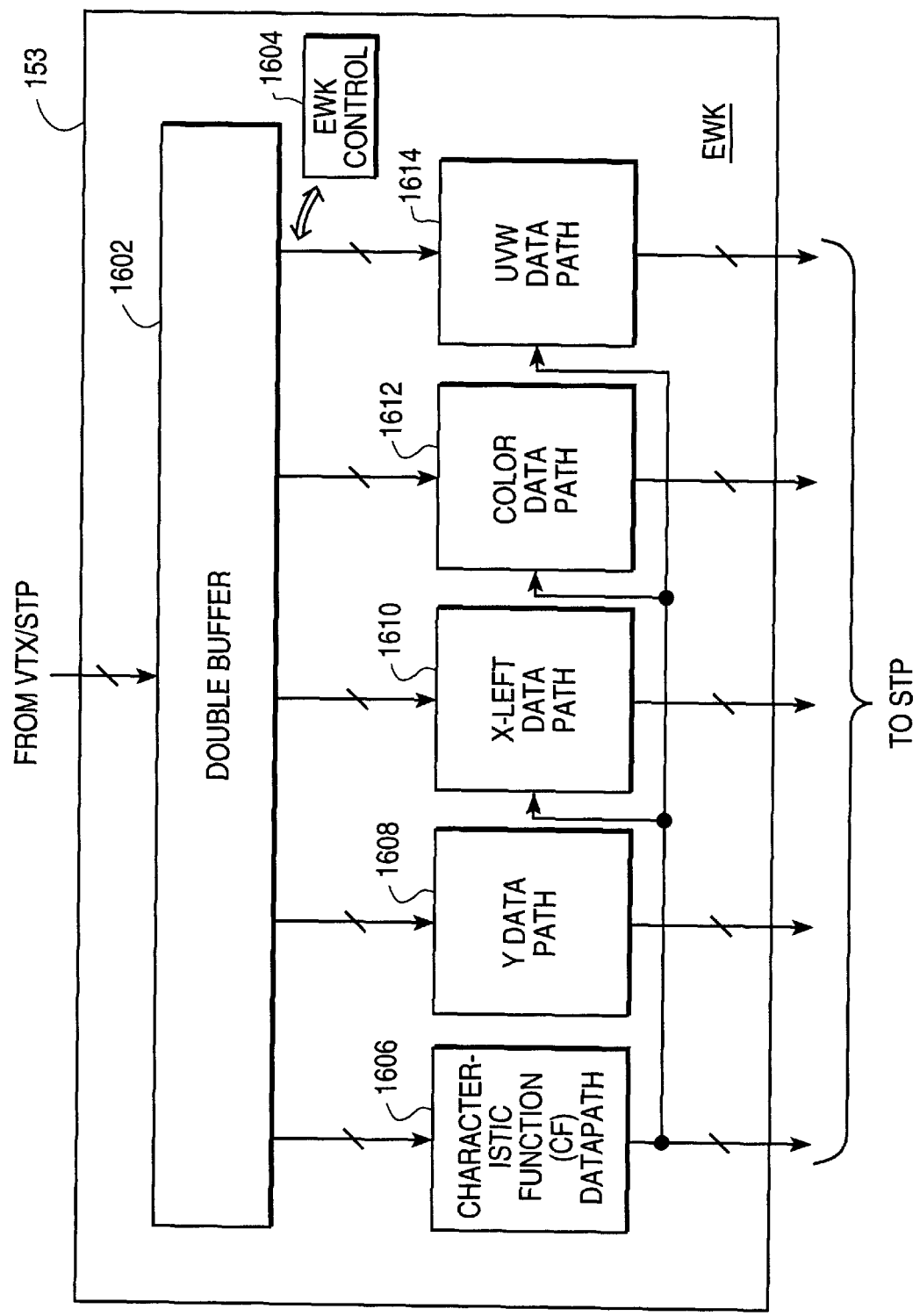
FIG. 16 is a block diagram of the major functional units of the edge walker 153 (FIG. 1B)

FIG. 16 is a block diagram of the major functional units of the edge walker 153 (FIG. 1B). Data from the vertex engine 151 or the set-up engine 152 is provided initially to a double buffer 1602, which then provides the data to five parallel data paths, all under the control of an EWK controller 1604. The five data paths are a characteristic function (C) data path 1606, a Y-data path 1608, an X-left data path 1610, a color data path 1612, and a UVW data path 1614.

The function of the double buffer 1602 is to create a pipeline between the set-up engine 152 and the edge walker 153. The edge walker may be processing one triangle while the set-up engine is calculating the various parameters for the next triangle and placing them in the double buffer 1602. In addition to the numeric data and other parameters, the double buffer 1602 stores the w-range value for the various block-fixed values represented for the triangle.

The characteristic function data path 1606 determines how the edge walker 153 moves from one pixel to the next along the long edge of the triangle. The algorithm is similar to a Bresenham line drawing algorithm. A similar calculation is used on the two short edges of the triangle to determine the ending pixel in a span.

Y data path 1608 merely adds 1 to the current y value every time the edge walker moves down one pixel to the next span. It checks for two conditions—whether the next y value will be equal to Y2, the switch point of the short sides (i.e., where side 0 ends and side 1 begins) or equal to Y3, the bottom of the triangle X-left data path 1610 calculates the left x value of each span, in other words, the points on the left-hand edges of the triangle. At the start of a new triangle, the X-left data path 1610 downloads from the double buffer 1602 the new $x_1$ and $x_2$ values, as well as an $x_{step}$ value. The value $x_1$ is latched, and incremented by $x_{step}$ for each iteration The $x_{step}$ value is one of three values calculated by the set-up engine 152. If the current triangle is a left-to-right triangle (long side on the left), then the $x_{step}$ value is the $x_{step\_long}$. If the long side is on the right, then the $x_{step}$ value is $x_{step\_0}$ at the beginning of the triangle, and then at some point switches to $x_{step\_1}$ after the second vertex is reached.

The color data path 1612 uses the color values, color slopes and color d/dx values to compute the starting colors (red, green, blue and blending factor A) along the long side of the triangle. The iterative color value will be the current value plus the slope, or the current value plus the slope plus or minus the d/dx value. The characteristic function determines which equation is used, and the direction of scan determines whether the d/dx value is to be added or subtracted.

Figure 17:
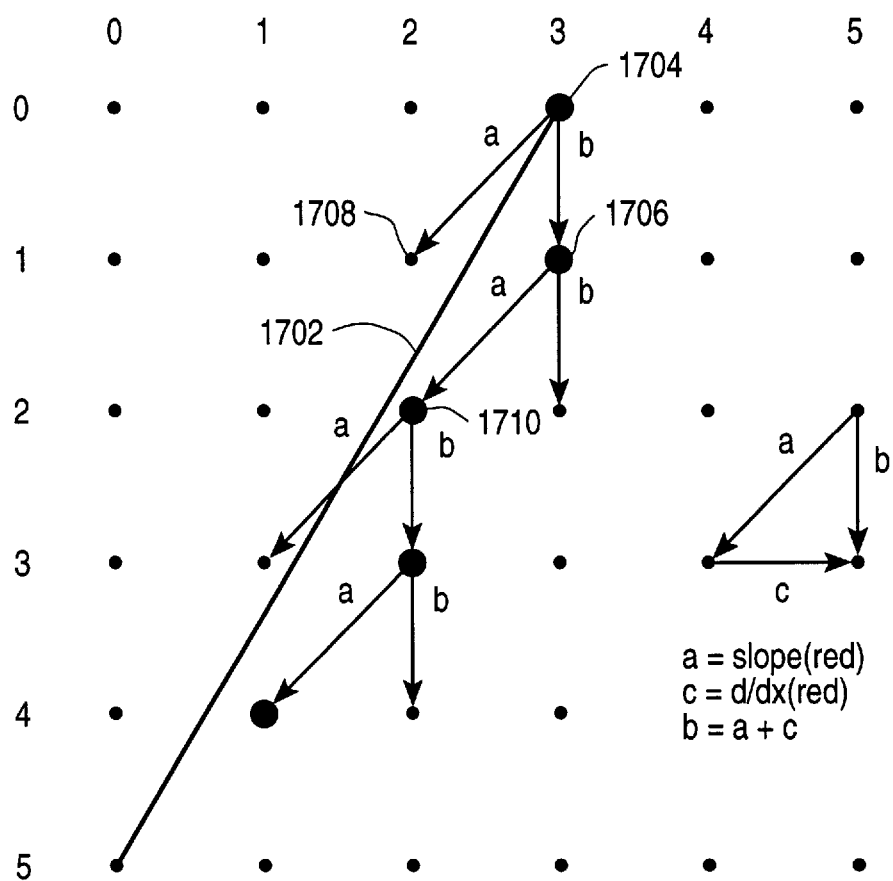
FIG. 17 illustrates a triangle edge for calculation of a characteristic function.

FIG. 17 illustrates this more clearly. In FIG. 17, the line 1702 represents a portion of the long edge of a triangle, passing through a grid of pixels having columns 0–5 and rows 0–5. On row 0, the leftmost pixel in the span is pixel 1704. This span endpoint is assigned an appropriate color value for the color then being processed, for example a red color value. The left endpoint of the span on row 1 is pixel 1706, and the color value is given by the color value of pixel 1704 plus the red slope (which yields the color value at pixel 1708, outside the triangle), plus the d/dx value for red. The pixel 1710 is the leftmost pixel in the span on row 2, and the color value for red is calculated by adding only the red slope to the color value for pixel 1706, and so on. The d/dx value for red is not added for pixel 1706 because this pixel is already inside the triangle.

Figure 18:
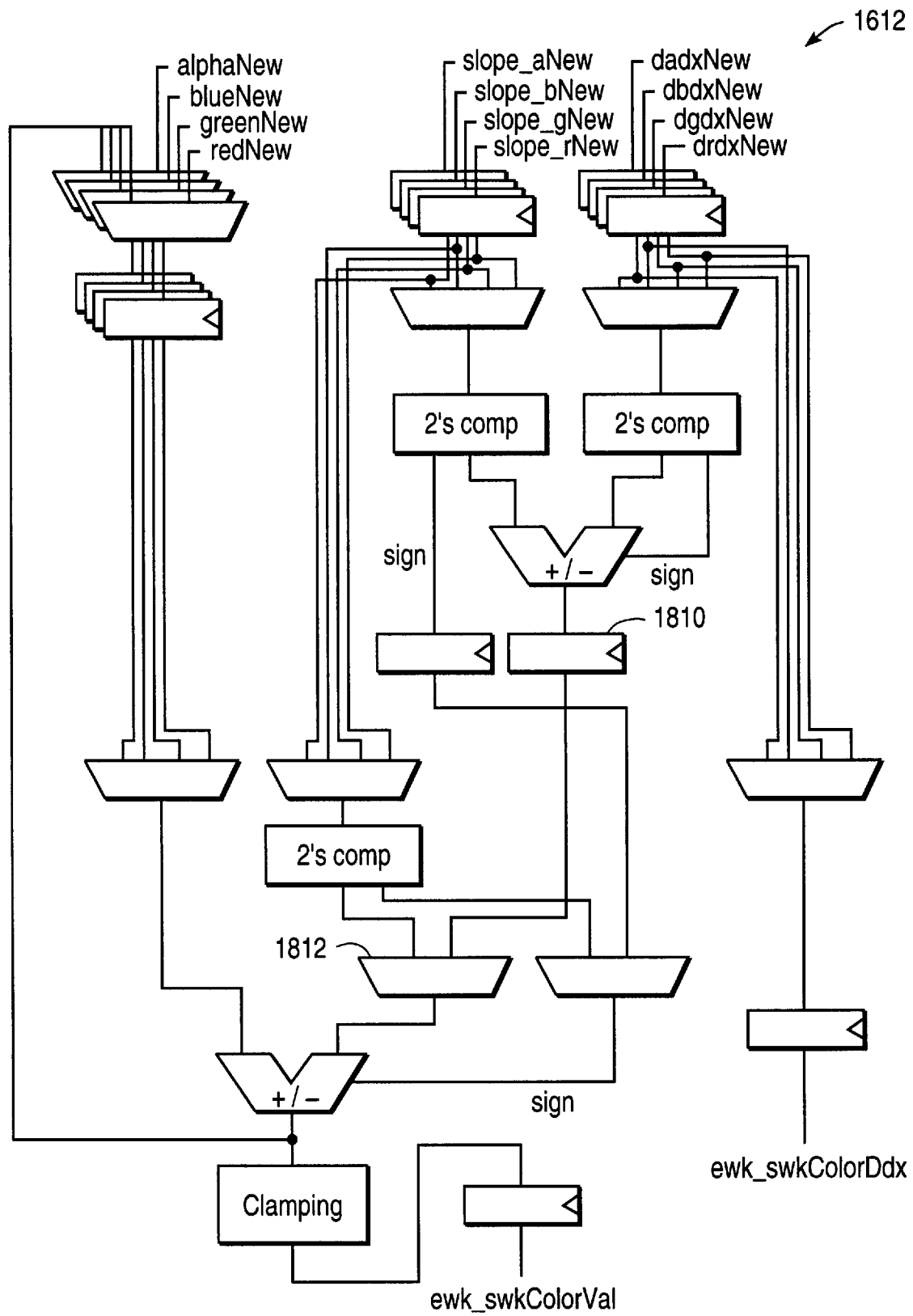
FIG. 18 illustrates the major functional blocks of the color data path of FIG. 16.

FIG. 18 illustrates the major functional blocks of the color data path 1612. At the start of the triangle, all new color, slope and d/dx values are latched in from the double buffer 1602. The operation of this data path is a two-staged pipeline sequence of events. In the first stage, the slope and d/dx of one color, say red, are pre-added (or subtracted, as appropriate) and the result is latched in latch 1810. In the second cycle, a multiplexer 1812 controlled by the step__back signal from the characteristic function block 1606 determines whether the sum computed in the previous cycle will be added to the red value, or if just the slope value will be added to the red value. In the meanwhile, the sum of the slope and d/dx of the next color, green, are being computed in stage 1.

In four cycles, this data path will rotate through all the colors, passing each one to the span walker 154 cycle after cycle. This data path sets the edge rate of the edge walker 153 at no more than one every four cycles Returning to FIG. 16, the UVW data path 1614 is responsible for the iterated 1/w, u/w and v/w values along the long edge of the triangle and passing these to the span walker 154. The block diagram for this data path is the same as that shown in FIG. 18 for the color data path 1612, except that there are only three inputs instead of four. The outputs from this block are carried to the span walker 154 on ewk__swkUVW and ewk__swkUVWD/dx buses. Since there are only three inputs to this data path block, only three cycles are required to compute the values necessary to transfer to the span walker. Since the color data path 1612 fixes the minimum edge rate at one per four cycles, the UVW data path 1614 remains idle during the fourth cycle while the last color value is being computed.

Figure 19:
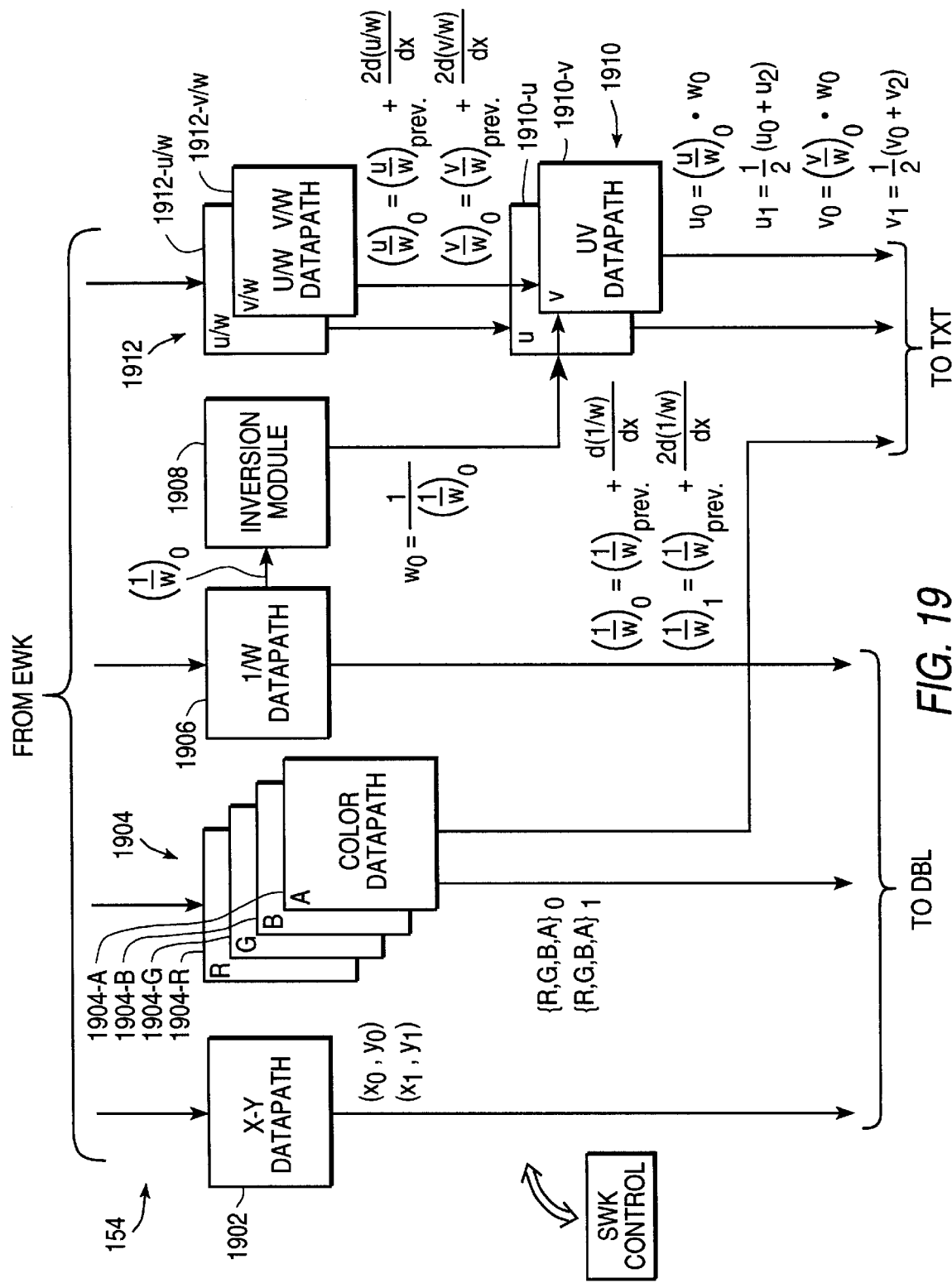
FIG. 19 is a block diagram illustrating the major functional blocks of the span walker 154.

FIG. 19 is a block diagram illustrating the major functional blocks of the span walker 154. The span walker takes the left and right endpoints for a given span, as well as the starting color values and depth-adjusted texture coordinates, from the edge walker 153, and linearly interpolates across the span to compute the corresponding values for each pixel.

At the start of each span, the span walker 154 receives seven starting parameters from the edge walker 153: red, blue, green and blend factor, 1/w, u/w and v/w, all for the first pixel of the span. In addition, the d/dx values (the change or gradient in each of these seven parameters with one pixel step in the x direction) are also passed from the edge walker 153 to the span walker 154. The span walker 154 always begins its traversal of a span from the long side of the triangle, so the traversal could be either from left to right or from right to left, as indicated to the span walker by a signal from the edge walker 153.

The throughput of span walker 154 is two pixels per cycle. Each cycle, the span walker is responsible for passing color and texture values for a pair of pixels to the texture mapper 155, and also for passing x, y and 1/w values for a pair of pixels to the destination blend unit 156. While color information is interpolated exactly (to the extent of the hardware data path widths) for each pixel, in order to achieve two pixel per cycle performance, the span walker 154 exactly interpolates the texture coordinates (u, v) for only every alternate pixel. The texture coordinates for intermediate pixels are calculated by averaging from the surrounding two pixels. The only exception is the endpoint pixel values, which are always computed exactly. The texture coordinates of these intermediate pixels are still considered herein to be "interpolated", even though their values might represent only an approximation of the exact interpolated value.

Table XXV lists the format of each datum passed into or out of the span walker 154. All data is handled as fixed-point numbers, and the format column indicates a sign bit (s, if present), the number of integer bits, a decimal point, and the number of fractional bits.

TABLE XXV

| Information | Format | Source | Destination | Details |
|---|---|---|---|---|
| Coordinates | 11.0 | Edge Walker | Span Walker | (Xleft,Xright,Y) |
| Colors | 8.11 | Edge Walker | Span Walker | (red, green, blue) |
| Blend Factor | 8.11 | Edge Walker | Span Walker | (A) |
| Textures | 10.13 | Edge Walker | Span Walker | (u/w,v/w) |
| Distance | 0.23 | Edge Walker | Span Walker | (1/w) |
| Color d/dx | s8.11 | Edge Walker | Span Walker | d(r,g,b)/dx |
| Blend Factor d/dx | s8.11 | Edge Walker | Span Walker | d(A)/dx |
| Texture d/dx | s10.13 | Edge Walker | Span Walker | d(u/w,v/w)/dx |
| Depth d/dx | s0.23 | Edge Walker | Span Walker | d(1/w)dx |
| Coordinates | 11.0 | Span Walker | Destination Blender | (x0,y0) |
| Distance | 0.16 | Span Walker | Destination Blender | (w0,w1) |
| Colors | 8.0 | Span Walker | Texture Mapper | (red, green, blue) |
| Blend Factor | 8.0 | Span Walker | Texture Mapper | (A) |
| Textures | 10.4 | Span Walker | Texture Mapper | (u,v) |

There are a total of 17 parameters passed from the edge walker to the span walker. The first three are coordinate values, Xleft, Xright and Y. The X values define the endpoints of the span, and the Y value determines the Y location. All three of these values are represented as unsigned 11-bit integers, corresponding to the maximum 2K×2K frame buffer size allowed by the triangle engine. The Y value is not used by the span walker, but is passed directly through to the destination blender, which requires both X and Y coordinates in computing the memory address to write the pixel data. The format for the X and Y coordinates passed from the span walker to the destination blender is also 11.0.

The next seven items in the table are the starting parameters for the first pixel of the span. As discussed previously, the Span Walker will begin with either the leftmost or rightmost pixel of the span, determined by an ewk_ swkLeft2Right signal from the edge walker. It will generate an R, G, B, A, u/w, v/w and 1/w value for each pixel in the span, and pass this data to the destination blender or texture mapper.

The format of the color data (R, G, B, A) is 8.11. The eleven bits of fraction are carried through all calculations in the span walker data path, but truncated when the data is passed to the Texture Mapper, resulting in an 8.0 color format from the span walker to the texture mapper.

The 1/w value, which is really only the significand in the block-fix format, is guaranteed to be within the range $0 \leq (1/w) < 1$ and is represented as a 0.23 format number. This value is used internally to compute u and v from u/w and v/w, and also the iterated 1/w significand is passed on to the destination blender for use in z-buffering. At this point the precision is reduced to 0.16.

The u/w and v/w parameters also contain only significands, and have a format of 10.13 within the span walker data path. These values are used internally to compute u and v, which have a format of 10.4 upon transfer to the texture mapper. The ten bits of integer are necessary to access a 1K×1K texture, which is the maximum size the triangle engine allows, and the four bits of fraction are used by the texture mapper for appropriate weighting of texels. As explained below, the u and v values provided to the texture mapper are inherently and automatically no longer in block-fix format.

The remaining parameters in the table are the d/dx values for the colors, u/w, v/w and 1/w. The format of each of these is the same as for the associated parameter, except that the d/dx value also includes a sign bit. This is because the value of each parameter could be increasing or decreasing along the span. The d/dx values for u/w, v/w and 1/w contain only significands.

FIG. 19 is a block diagram illustrating the major functional blocks of the span walker 154. Since the span walker 154 processes two pixels per clock cycle, there is no sharing of arithmetic logic units as in the edge walker 153. Therefore a separate set of adders is used for each of the seven pixel parameters (R, G, B, A, u/w, v/w and 1/w) computed each cycle.

Referring to FIG. 19, the span walker 154 includes an x-y data path 1902, which receives the x-left, x-right and y values at the beginning of each span. Of these, the y value is piped straight through to the destination blender 156. If the scan direction is left-to-right, then the x-y data path 1902 increments the x-left value by two each cycle until the end of the span has been reached. Similarly, if the scan direction is right-to-left, x-left is held constant and x-right is decremented by two each cycle until the end of the span has been reached.

The span walker 154 also includes four identical color data path modules 1904-R, 1904-G, 1904-B and 1904-A (collectively, 1904). At the beginning of the span, the color value (format 8.11) and the color d/dx value (format s8.11) from the edge walker are loaded into the registers in the appropriate color data path 1904. On each cycle, the color data path 1904 computes color plus d(color)/dx and also color plus 2d(color)/dx using separate adders. This allows the span walker 154 to generate two pixel color values per cycle. The output of the color plus 2d(color)/dx adder is latched back into the color value register to prepare for the next cycle.

Before the color values are dispatched for blending, they are truncated to 8 bits (format 8.0).

The span walker 154 also includes a 1/w data path 1906. Most of the 1/w data path 1906 is the same as the color data path 1904. At the beginning of the span, the initial 1/w (format 0.23) and the d/dx value (format s0.23) are loaded into the data path 1906 from the edge walker 153. As with the color data path 1904, the 1/w data path 1906 generates two 1/w values per cycle, namely:

$$\left(\frac{1}{w}\right)_0 = \left(\frac{1}{w}\right)_{prev.} + \frac{d\left(\frac{1}{w}\right)}{dx}$$

$$\left(\frac{1}{w}\right)_1 = \left(\frac{1}{w}\right)_{prev.} + 2\frac{d\left(\frac{1}{w}\right)}{dx}$$

the subscript "prev." indicates the value for the previous x-position, the subscript "0" indicates the value for the first x position newly calculated, and the subscript "1" indicates the value for the second x position newly calculated. Again, these calculations are performed as fixed-point calculations using only the significands of the block-fixed format data, and the w-range value does not need to be referenced at all. However, for transmitting to the destination blender 156, the calculated (1/w) significands are truncated to 14 bits (format 14.0) and concatenated with the 2-bit w-range value. In addition, because the 1/w value is also used in the computation of the depth-independent texture coordinates (u, v), there is also an output from the 1/w data path 1906 to an inversion module 1908. This output carries the $(1/w)_0$ significand in the full 0.23 format.

The inversion module 1908 performs Newton-Rapheson inversion of the $(1/w)_0$ value to iteratively approximate 1/(1/w), which is w (again, significands only). Once the w value is obtained, it is used in another part of the data path to multiply the iterated (u/w) and (v/w) significands, converting the texture coordinates to depth independent form, and inherently cancelling out the block-fix exponent, for the texture mapper 155.

Part of the Newton-Rapheson inversion algorithm involves normalizing the input (1/w) significand so that it is between 1 and 2. This produces an inverse that is in the range between 0.5 and 1. The normalization is achieved with a left-shift of the input $(1/w)_0$ value until the first time a 1 is shifted out of the highest order fractional bit. The number resulting after inversion would need to be shifted in the same direction by the same number of bits in order to denormalize. However, the denormalization step is not performed at this time; instead, the number of bits of left-shifting required is passed to a uv data path 1910 described below.

The span walker module 154 also includes a u/w, v/w data path 1912, containing two identical blocks 1912-u/w and 1912-v/w. The data path 1912-u/w is described herein, and the data path 1912-v/w is identical.

The data path 1912-u/w computes the iterative u/w significands along the span beginning by latching a starting value (format 10.13 significand) and d/dx (format s10.13 significand) from the edge walker 153. The data path 1912-u/v uses an adder and a clamp block to iteratively add 2d(u/w)/dx each cycle to the starting value. This is similar to the color and 1/w data path blocks previously described.

The data path 1912-u/w does not compute a pair of values for each cycle as do the color and 1/w data paths. They compute a value for the first new pixel along the span but not the second. This is because there is only one inversion module 1908 in the data path, so only one w value can be computed per cycle. Instead, the intervening u and v values are averaged from the values calculated from the previous and new pixels instead of being calculated directly.

The internal representation of u/w significands is a number of format 10.13. For use in the final computation of u and v, though, only a 16-bit value is required. Therefore, the least significant seven bits are truncated off u/w and v/w in creating the 10.6 format outputs of the data path 1912. Before this occurs, however, the values are normalized by detecting leading zeroes and left-shifting until there is a '1' in the most significant bit. A maximum shift of seven bits is permitted, since a greater shift would begin introducing zero bits from the right. The number of bits shifted is passed on to the uv data path 1910. Note that this shift amount is separate from the shift amount represented by the w-range value with which u/w and v/w continue to be represented in the data path 1912.

The uv data path 1910 is the final stage in the span walker 154 data path. Two identical blocks are used, one to compute (u/w) times w (data path 1910-u), and the other to compute (v/w) times w (data path 1910-v). Only the data path 1910-u is discussed below.

Recall that only one w value and one u/w value is computed each cycle, although the span walker 154 must generate a pair of u values each cycle, since the span walker throughput is two pixels per cycle. As discussed previously, the span walker only computes every other u coordinate from the u/w and w values. The remaining u coordinates are computed as the average of the u values of the adjacent pixels along the span. The only exception to this rule is that the end pixel of a span is always computed exactly. This is to ensure that adjacent texture-mapped triangles will fit together seamlessly.

Figure 20:
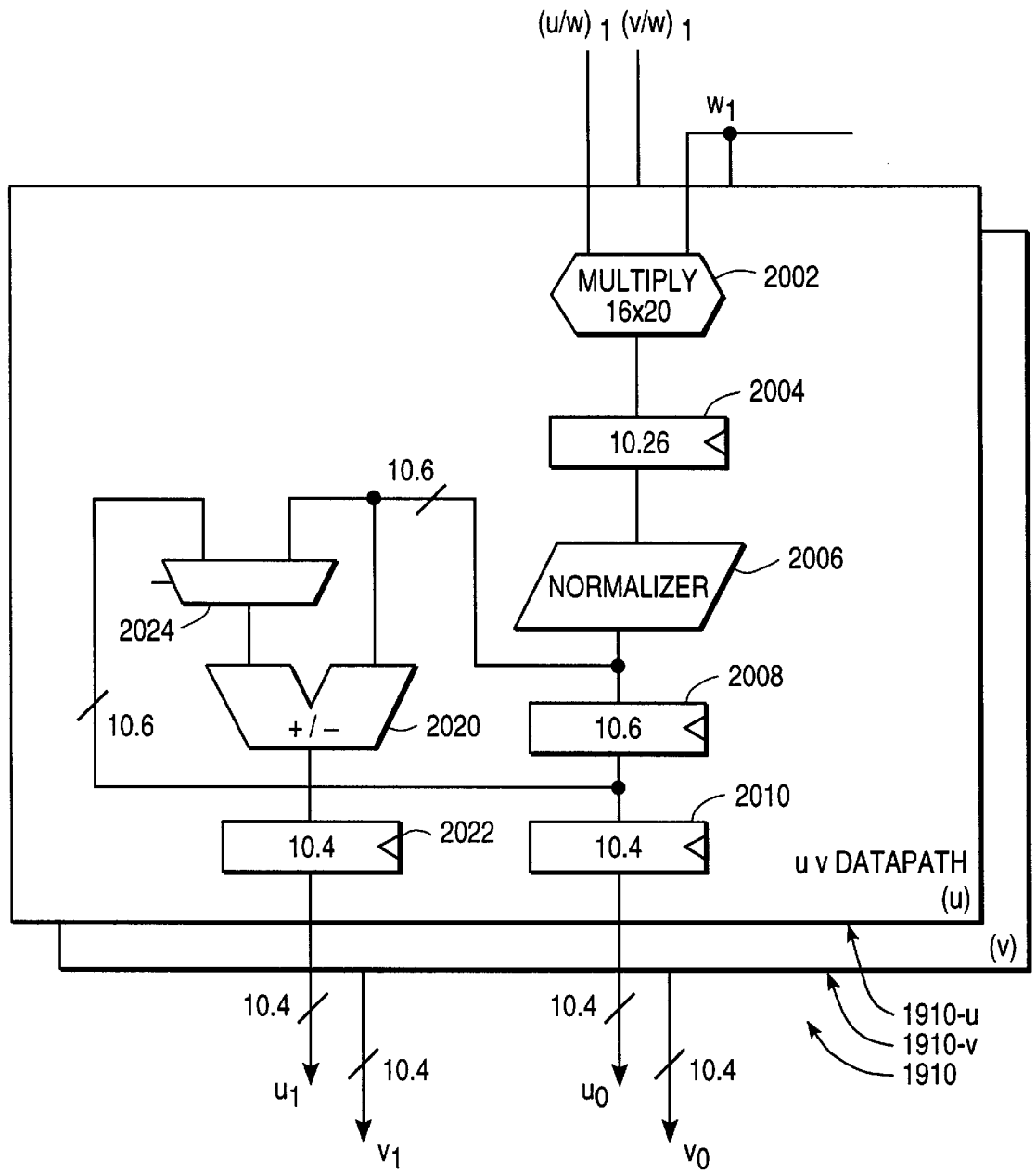
FIG. 20 illustrates the major functional blocks of the uv data path of FIG. 16.

FIG. 20 illustrates the major functional blocks of the uv data path 1910 (primarily data path 1910-u is shown). The top of the data path consists of a 16×20-bit multiplier 2002, which receives a w value from the inversion module 1908 and a 16-bit (u/w) value (significand only) from the data path 1912-u/w. The resulting 36-bit product is a format 10.26 and is latched in latch 2004. Before the product can be used as a coordinate into the depth-independent texture map, however, it must be denormalized, because both the w and u/w values were subjected to normalization when they were computed. This denormalization is performed by block 2006. Signals are received here that indicate the degree of normalization to which w and u/w were subjected, and the normalization block 2006 determines from these values the number of bits to shift left or right to obtain a true u value in format 10.6. Note that in the denormalization process, the width of u is reduced from 36 bits to 16 bits. Importantly, note further that no shifting is required at this point to convert from block-fix representation of w or u/w to ordinary fixed-point representation. This is because both u/w and 1/w as provided to the inversion module 1908 were blockfixed into the same w-range. When (u/w) is divided by (1/w), which is the function performed by inversion module 1908 in conjunction with the multiplier 2002, the amount of the block-fixing shift cancels out. This is one reason why it is advantageous, in the set-up engine 152, to block-fix the u/w values into the same w-range as the 1/w values. Another reason is that u/w and v/w calculations also become more precise.

The output of the normalizer 2006 in FIG. 20 is latched in a flip-flop 2008, then reduced to 10.4 format and latched again in a flip-flop 2010. Because of the pipelined nature of this data path, when the output of the flip-flop 2008 holds the u value for pixel n of the span ("$u_N$"), then the output of the normalizer 2006 will be the u value for pixel n plus 2 of the span ("$u_{N+2}$"). Both of these quantities are provided to an adder 2020, the output of which is shifted right by 1 bit to become the average of the two numbers. The average is then reduced in width to a 10.4 format and latched to become $u_1$ for the texture mapper 155. The output of flip-flop 2010 carries $u_0$ for the texture mapper 155.

One final capability of this part of the data path is to allow the exact computation of the u values for the last pixel in a span. If the span length is odd, this happens automatically as the last u value will naturally be computed exactly, and eventually appear on the $u_0$ output. If the span length is even, however, the last u value will appear on the $u_1$ output, which is normally an averaged value.

Note that the mux 2024 and adder 2020 at the bottom of the data path can be configured in such a way as to bring the output of the normalizer directly to the latch 2022. This is accomplished by sending the normalizer output to both inputs of the adder via mux 2024. Usually, the output of the normalizer 2006 will be $u_{N+2}$ when the output of the latch 2008 is $u_N$, as discussed previously. If the normalizer output were instead $u_{N+1}$, then this exactly calculated u value could be routed to the latch 2022 achieving the desired result. This is in fact accomplished by adjusting the u/w, v/w and 1/w data path blocks to increment by only 1 d/dx instead of 2 on the last cycle of a span.

Figure 21A:
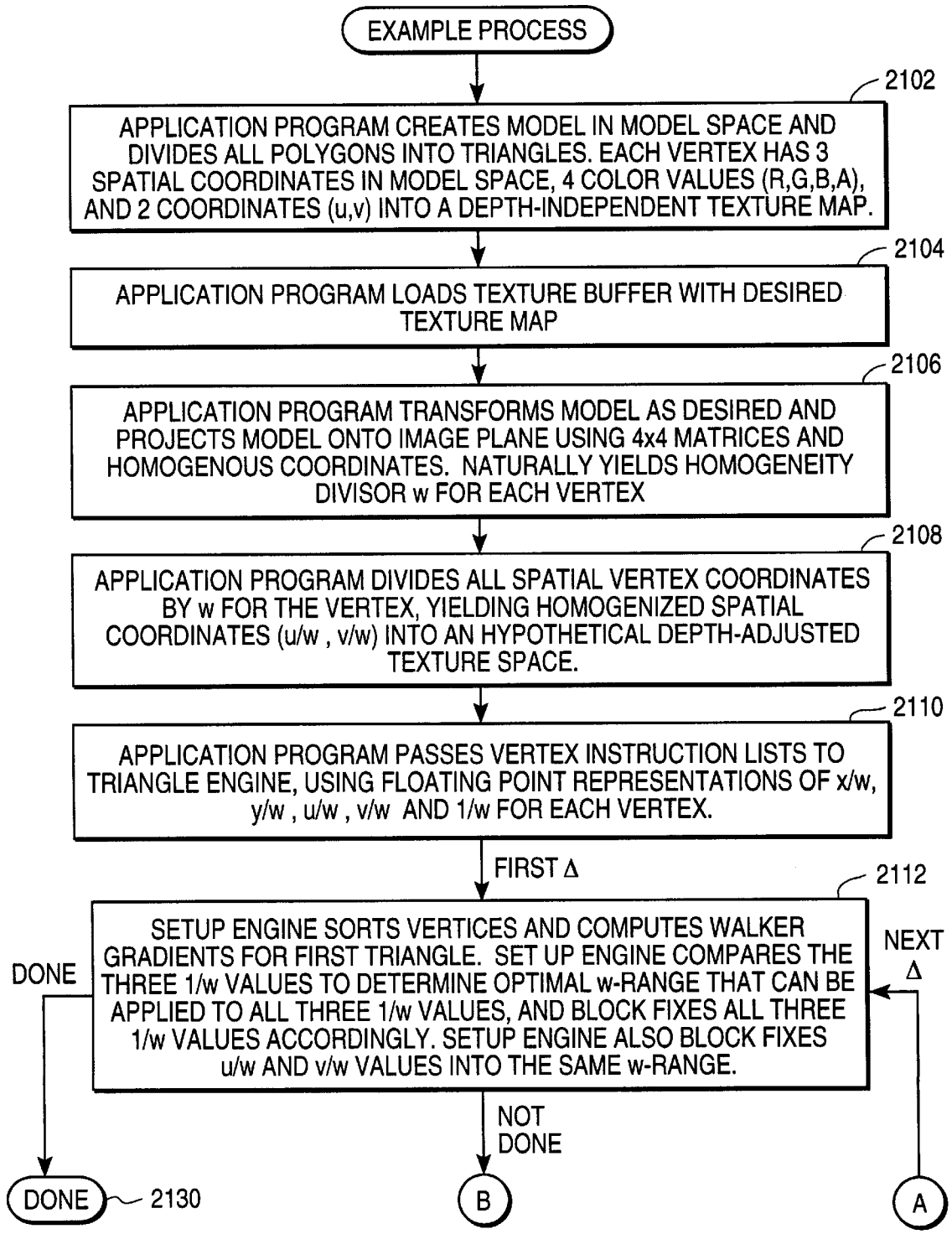
FIGS. 21A and 21B are a flow chart of steps performed in the rendering of a model.
Figure 21B:
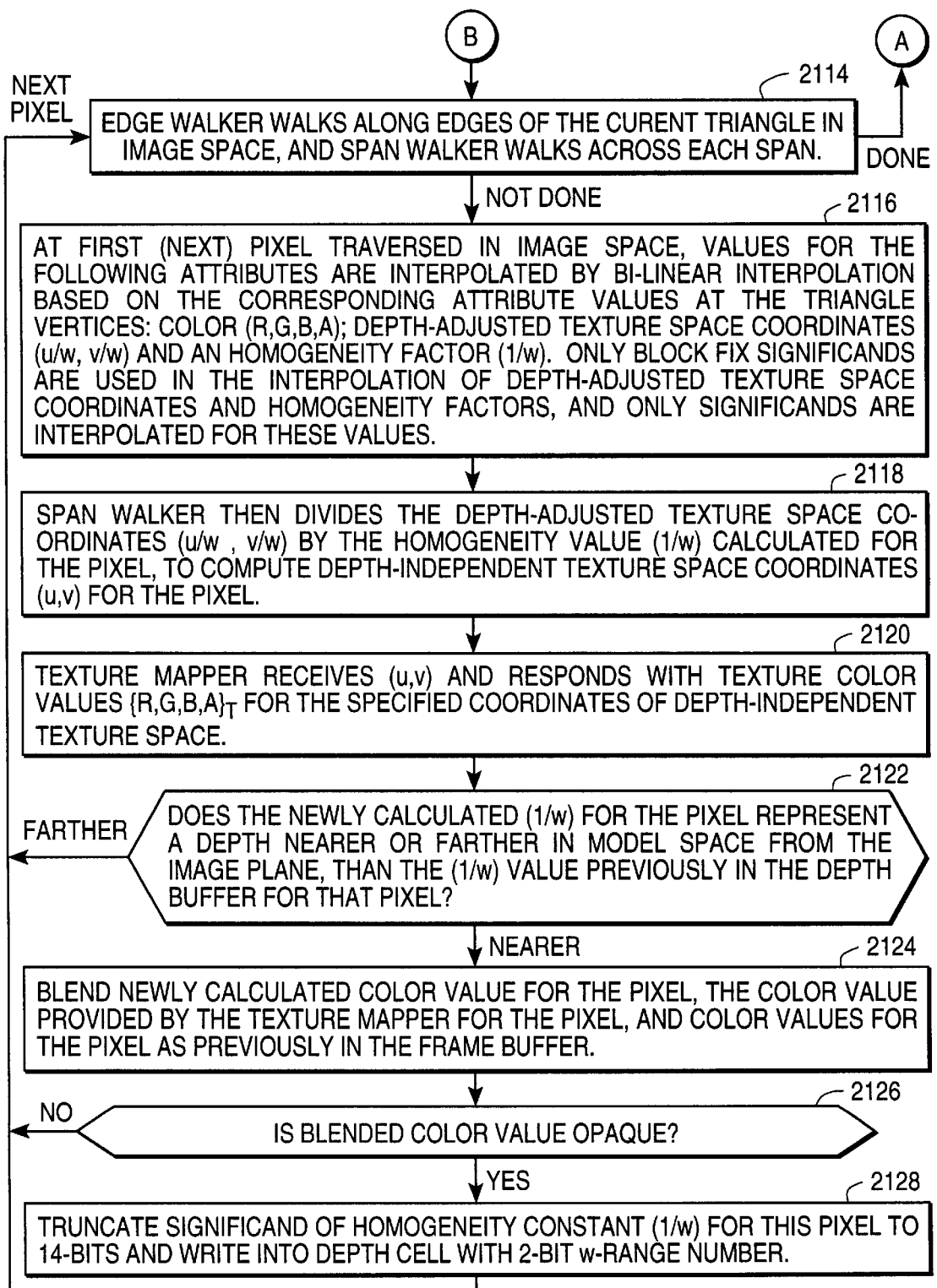

Given the above, FIGS. 21A and 21B (FIG. 21B is a continuation of FIG. 21A) illustrate an example process which can now be performed. Referring to FIG. 21A, in a step 2102, an application program creates a model in model space and divides all polygons into triangles. Each vertex of each triangle has three spatial coordinates in model space, four color values (R,G,B,A) and two coordinates (u,v) into a depth-independent texture map. In a step 2104, the application program loads the texture buffer 143 and/or 145 with the desired texture map. In a step 2106, the application program transforms the model as desired and projects it onto the image plane using 4×4 matrix computations and homogeneous coordinates. These computations naturally yield homogeneity divisors w for each vertex.

In a step 2108, the application program divides all spatial vertex coordinates by w for the vertex, yielding homogenized spatial coordinates (u/w, v/w) into an hypothetical depth-adjusted texture space. In a step 2110, the application program creates vertex instruction lists and passes them to the triangle engine 150. The values of each x/w, y/w, u/w, v/w and 1/w for each vertex are passed in full floating point representation In a step 2112, the vertex engine 151 and set-up engine 152 loop through the triangles to find by the vertices. The set-up engine sorts the vertices of the first triangle and computes walker gradients for the first triangle. The set-up engine compares the three 1/w values to determine the optimum w-range that can be applied to all three 1/w values, and block-fixes all three 1/w values accordingly. The set-up engine 152 also block-fixes all three u/w values and all three v/w values into the same w-range. The flow chart continues in FIG. 21B, as indicated by the circled symbol "B" appearing in both FIGS. 21A and 21B.

In a step 2114, the edge walker 153 walks along the edges of the current triangle in image space, and the span walker 154 walks across each span. In step 2116, at the first pixel traversed by the edge walker/span walker in image space, values for the following attributes are interpolated by bi-linear interpolation based on the corresponding attribute value at the triangle vertices: color (R,G,B,A); depth-adjusted texture space coordinates (u/w, v/w); and a homogeneity factor (1/w). Only block-fix significands are used in the interpolation of depth-adjusted texture space coordinates and homogeneity factors, and only significands are interpolated for these values In a step 2118, the span walker 154 next divides the depth-adjusted texture space coordinates (u/w, v/w) by the homogeneity value (1/w) calculated for the pixel, to compute depth-independent texture coordinates (u, v) for the pixel. Inherently, (u, v) are no longer in block-fix format. In a step 2120, the texture mapper 155 receives the (u, v) values and responds with texture color values $(R,G,B,A)_T$ for the specified coordinates of depth-independent texture space.

In a step 2122, the newly calculated 1/w value for the current pixel is compared to the 1/w value previously in the depth buffer for that pixel. If a newly calculated 1/w value is nearer in model space to the image plane than the previous 1/w value, then the process repeats at step 2114 with the edge walker/span walker proceeding with the next pixel This comparison uses both the significands and the w-ranges If the comparison in step 2122 indicates that the newly calculated 1/w value for the pixel represents a depth nearer than the 1/w value previously in the depth buffer for that pixel, then in step 2124, the destination blender 156 blends the newly calculated color value for the pixel and the color value provided by the texture mapper 155 for the pixel, into the color value for the pixel as previously in the frame buffer, all in accordance with the blend factors A and possibly other control signals describing how to blend colors.

If the blended color value is considered opaque (step 2126), then in step 2128, the homogeneity value 1/w for this pixel is truncated and written to the corresponding depth cell with the 2-bit w-range value for the current triangle. Each depth cell contains a total of 16 bits for the w-range number and the significand of the homogeneity value. The procedure then returns to step 2114 for the next pixel. If the blended color value is not considered opaque (step 2126), then the procedure returns to step 2114 without updating the homogeneity value in the corresponding depth cell.

In step 2114, after all image space pixels of the current triangle have been rendered, the procedure returns to step 2112 (as indicated by the circled symbol "A" appearing in both FIGS. 21B and 21A) to set up the next triangle. If, in step 2112, all triangles have been rendered, the procedure is done (step 2139).

The above disclosure is to be taken as illustrative of the invention, not as limiting its scope or spirit. Numerous modifications and variations will become apparent to those skilled in the art after studying the above disclosure. For example, the invention is not restricted to RGB formats Other digital formats such as YCC, or Composite Video Broadcast Standard (CVBS), can also be used. For the sake of simplification, an RGB format was assumed above.

Given the above disclosure of general concepts and specific embodiments, the scope of protection sought is to be defined by the claims appended hereto.

What is claimed is:

1. A method for rendering a model from a three-dimensional model space into a frame buffer containing a plurality of image cells, each of said image cells containing, after rendering, values which represent visible attributes of a respective region of a displayable two-dimensional image, for use with a depth buffer containing a plurality of depth cells corresponding to said image cells, comprising the steps of:

providing an homogenized projection of a first surface region of said model onto an image plane in said model space, said image plane having a plurality of image regions each corresponding to a respective one of said image cells, said homogenized projection including an identification of a first one of said image regions for said first surface region and a first homogeneity value for said first surface region;

modifying the values in the image cell corresponding to said first image region in dependence upon an attribute value of said first surface region; and storing a first depth value which depends on said first homogeneity value, in a first one of said depth cells which corresponds to said first image region, wherein said first depth value comprises an indication of one of a predefined plurality of sub-ranges in a predefined range of all possible depth values and an indication of one of a plurality of discrete depth values within said one of a predefined plurality of sub-ranges.

2. A method according to claim 1, wherein each depth cell in said depth buffer corresponds to a respective one of the image cells in said frame buffer.

3. A method according to claim 1, wherein said model includes a planar model space polygon having a plurality of vertices each having three spatial coordinates in said model space, said polygon including said first surface region, wherein said step of providing comprises the steps of:

determining an homogenized projection of each of said vertices onto said image plane, said determining an homogenized projection comprising both identifying a respective one of said image regions in said image plane for each of said vertices and generating a respective homogeneity value for each of said vertices, the image regions identified for said vertices collectively defining an image space polygon of said model space polygon, said image space polygon covering at least said first image region; and determining said first homogeneity value in dependence upon the homogeneity values generated for each of said vertices and upon the position of said first image region in said image space polygon.

4. A method according to claim 3, wherein said image plane is defined by $z=z_p$ in said model space, said image plane further defining a two-dimensional image space having x and y axes parallel to x and y axes of said model space, respectively, wherein said image space polygon is a triangle having first, second and third vertices, said first, second and third vertices having homogenized coordinates in said image space of $(x_1/w_1, y_1/w_1)$, $(x_2/w_2, y_2/w_2)$ and $(x_3/w_3, y_3/w_3)$, respectively, and wherein said first image region has homogenized coordinates of $(x_i/w_i, y_i/w_i)$, where $1/w_i$, is said first homogeneity value, and wherein said step of determining said first homogeneity value comprises the step of bi-linearly interpolating $1/w_i$ from $1/w_1$, $1/w_2$ and $1/w_3$ in accordance with relative distances of said first image region from respectively said first, second and third vertices.

5. A method according to claim 3, wherein said attribute value of said first surface region includes a designation of a first texture region in a predefined texture map.

6. A method according to claim 5, wherein said texture map is defined procedurally.

7. A method according to claim 5, wherein each of said vertices further has associated therewith a respective plurality of spatial coordinates in a depth-adjusted texture space, further comprising the step of determining said first texture region in dependence upon the depth-adjusted texture space coordinates for each of said vertices and the position of said first image region in said image space polygon.

8. A method according to claim 7, for use with a texture map defined in a two-dimensional depth-independent texture space with axes u and v, wherein the depth-adjusted texture space coordinates of said first, second and third vertices include $(u_1/w_1, v_1/w_1)$, $(u_2/w_2, v_2/w_2)$ and $(u_3/w_3, v_3/w_3)$, respectively, where $(1/w_1)$, $(1/w_2)$ and $(1/w_3)$ are the homogeneity values for said first, second and third vertices, respectively, and wherein said first texture region has depth-adjusted coordinates $(u_i/w_i, v_i/w_i)$, and wherein said step of determining said first texture region comprises the steps of:

bi-linearly interpolating $(u_i/w_i)$ from $(u_1/w_1)$, $(u_2/w_2)$ and $(u_3/w_3)$ in accordance with relative distances of said first image region from respectively said first, second and third vertices;

bi-linearly interpolating $(v_i/w_i)$ from $(v_1/w_1)$, $(v_2/w_2)$ and $(v_3/w_3)$ in accordance with relative distances of said first image region from respectively said first, second and third vertices;

bi-linearly interpolating $(1/w_i)$ from $(1/w_1)$, $(1/w_2)$ and $(1/w_3)$ in accordance with relative distances of said first image region from respectively said first, second and third vertices; and applying $(1/w_i)$ to $(u_i/w_i, v_i/w_i)$ to calculate $(u_i, v_i)$, said first texture region being identified by $(u_i, v_i)$.

9. A method according to claim 1, wherein said first depth value comprises numbers (e,s), where e indicates said one of a predefined plurality of sub-ranges and wherein s indicates said one of a plurality of discrete depth values.

10. A method according to claim 9, wherein said step of representing said first depth value with numbers (e,s) comprises the step of selecting e and s such that $s \times 2^{-be}$ is equal to said first depth value, b being a predefined constant greater than 1.

11. A method according to claim 10, wherein b=3.

12. A method according to claim 1, wherein said step of storing a first depth value which depends on said first homogeneity value comprises the step of storing said first homogeneity value, further comprising the steps of:

providing an homogenized projection of a second surface region of said model onto said image plane, said homogenized projection of said second surface region including an identification of said first one of said image regions for said second surface region and a second homogeneity value for said second surface region;

subsequent to said step of storing a first depth value, comparing said first homogeneity value in said first depth cell with said second homogeneity value; and storing said second homogeneity value in said first depth cell if and only if said step of comparing determines that a first predefined one of the following relationships is true: $c_1 < c_2$, $c_1 \leq c_2$, $c_1 = c_2$, $c_1 \geq c_2$, $c_1 > c_2$ and $c_1 \neq c_2$, where $c_1$ is said first homogeneity value and $c_2$ is said second homogeneity value.

13. A method according to claim 12, further comprising the step of modifying the values in the image cell corresponding to said first image region in dependence upon an attribute value of said second surface region if and only if a second predefined one of said relationships is true.

14. A method according to claim 13, wherein said first predefined relationship is the same as said second predefined relationship.

15. A method according to claim 13, further comprising the step of displaying said displayable two-dimensional image on a display.

16. A method according to claim 15, wherein said display includes a two-dimensional array of pixels, and wherein said step of displaying displays each of said image cells in said frame buffer in a respective different one of said pixels.

17. A method according to claim 1, or use further with a texture buffer containing a plurality of texture cells,
   wherein the attribute value of said first surface region includes a pointer to a group of at least one of said texture cells in said texture buffer,
   and wherein said step of modifying the values in the image cell corresponding to said first image region comprises the steps of:
      retrieving a texture value from one of the texture cells pointed to by the attribute value of said first surface region; and
      changing the values in the image cell corresponding to said first image region in dependence upon said texture value.

18. A method according to claim 17, wherein said step of changing the values in the image cell corresponding to said first image region in dependence upon said texture value includes the step of changing the values in the image cell corresponding to said first image region in dependence upon a plurality of values including said texture value.

19. A method according to claim 17, wherein said step of changing the values in the image cell corresponding to said first image region in dependence upon said texture value includes the step of changing the values in the image cell corresponding to said first image region in dependence upon a plurality of values including both said texture value and another attribute value of said first surface region.

20. A method according to claim 17, wherein said step of changing the values in the image cell corresponding to said first image region in dependence upon said texture value includes the step of changing the values in the image cell corresponding to said first image region in dependence upon a plurality of values including both said texture value and a prior value in the image cell corresponding to said first image region.

21. Apparatus for rendering a model from a three-dimensional model space into a frame buffer containing a plurality of image cells, each of said image cells containing, after rendering, values which represent visible attributes of a respective region of a displayable two-dimensional image, for use with a depth buffer containing a plurality of depth cells corresponding to said image cells, comprising:
   a projection provider of an homogenized projection of a first surface region of said model onto an image plane in said model space, said image plane having a plurality of image regions each corresponding to a respective one of said image cells, said homogenized projection including an identification of a first one of said image regions for said first surface region and a first homogeneity value for said first surface region;
   first modification means for modifying the values in the image cell corresponding to said first image region in dependence upon an attribute value of said first surface region; and
   first storing means for storing a first depth value which depends on said first homogeneity value, in a first one of said depth cells which corresponds to said first image region, wherein said first depth value comprises an indication of one of a predefined plurality of sub-ranges in a predefined range of all possible depth values and an indication of one of a plurality of discrete depth values within said one of a predefined plurality of sub-ranges.

22. Apparatus according to claim 21 wherein each depth cell in said depth buffer corresponds to a respective one of the image cells in said frame buffer.

23. Apparatus according to claim 21, wherein said model includes a planar model space polygon having a plurality of vertices each having three spatial coordinates in said model space, said polygon including said first surface region, wherein said projection provider comprises:
   first determining means for determining an homogenized projection of each of said vertices onto said image plane, said first determining means identifying a respective one of said image regions in said image plane for each of said vertices and generating a respective homogeneity value for each of said vertices, the image regions identified for said vertices collectively defining an image space polygon of said model space polygon, said image space polygon covering at least said first image region; and
   second determining means for determining said first homogeneity value in dependence upon the homogeneity values generated for each of said vertices and upon the position of said first image region in said image space polygon.

24. Apparatus according to claim 23, wherein said image plane is defined by $z=z_p$ in said model space, said image plane further defining a two-dimensional image space having x and y axes parallel to x and y axes of said model space, respectively,
   wherein said image space polygon is a triangle having first, second and third vertices, said first, second and third vertices having homogenized coordinates in said image space of $(x_1/w_1, y_1/w_1)$, $(x_2/w_2, y_2/w_2)$ and $(x_3/w_3, y_3/w_3)$, respectively, and wherein said first image region has homogenized coordinates of $(x_i/w_i, y_i/w_i)$, where $1/w_i$ is said first homogeneity value,
   and wherein said second determining means comprises means for bi-linearly interpolating $1/w_i$ from and $1/w_1$, $1/w_2$ and $1/w_3$ in accordance with relative distances of said first image region from respectively said first, second and third vertices.

25. Apparatus according to claim 23, wherein said attribute value of said first surface region includes a designation of a first texture region in a predefined texture map.

26. Apparatus according to claim 23, wherein said attribute value of said first surface region includes a designation of a first texture region in a predefined texture map,
   and wherein each of said vertices further has associated therewith a respective plurality of spatial coordinates in a depth-adjusted texture space,
   further comprising third determining means for determining said first texture region in dependence upon the depth-adjusted texture space coordinates for each of said vertices and the position of said first image region in said image space polygon.

27. Apparatus according to claim 26, for use with a texture map defined in a two-dimensional depth-independent texture space with axes u and v,
   wherein the depth-adjusted texture space coordinates of said first, second and third vertices include $(u_1/w_1, v_1/w_1)$, $(u_2/w_2, v_2/w_2)$ and $(u_3/w_3, v_3/w_3)$, respectively, where $(1/w_1)$, $(1/w_2$ and $1/w_3)$ are the homogeneity values for said first, second and third vertices, respectively, and wherein said first texture region has depth-adjusted coordinates $(u_i/w_i, v_i/w_i)$, and wherein said third determining means comprises:
  means for bi-linearly interpolating $(u_i/w_i)$ from $(u_1/w_1)$ $(u_2/w_2)$ and $(u_3/w_3)$ in accordance with relative distances of said first image region from respectively said first, second and third vertices;
  means for bi-linearly interpolating $(v_i/w_i)$ from $(v_1/w_1)$ $(v_2/w_2)$ and $(v_3/w_3)$ in accordance with relative distances of said first image region from respectively said first, second and third vertices;
  means for bi-linearly interpolating $(1/w_i)$ from $(1/w_1)$, $(1/w_2)$ and $(1/w_3)$ in accordance with relative distances of said first image region from respectively said first, second and third vertices; and means for applying $(1/w_i)$ to $(u_i/w_i, v_i/w_i)$ to calculate $(u_i, v_i)$, said first texture region being identified by $(u_i, v_i)$.

28. Apparatus according to claim 21, wherein said first storing means comprises:
  first selecting means for selecting numbers (e,s) for said first depth value, e and s being selected such that $s \times 2^{-be}$ is equal to said first depth value, b being a predefined constant greater than 1; and
  means for storing e and s in said first depth cell.

29. Apparatus according to claim 28, wherein b=3.

30. Apparatus according to claim 21, wherein said first storing means stores said first homogeneity value, further comprising:
  second providing means for providing an homogenized projection of a second surface region of said model onto said image plane, said homogenized projection of said second surface region including an identification of said first one of said image regions for said second surface region and a second homogeneity value for said second surface region;
  comparing means for comparing said first homogeneity value in said first depth cell with said second homogeneity value; and
  second storing means for storing said second homogeneity value in said first depth cell if and only if said step of comparing determines that a first predefined one of the following relationships is true: $c_1<c_2$, $c_1 \leq c_2$, $c_1=c_2$, $c_1 \geq c_2$, $c_1>c_2$ and $c_1 \neq c_2$, where $c_1$ is said first homogeneity value and $c_2$ is said second homogeneity value.

31. Apparatus according to claim 30, further comprising second modifying means for modifying the values in the image cell corresponding to said first image region in dependence upon an attribute value of said second surface region if and only if a second predefined one of said relationships is true.

32. Apparatus according to claim 31, wherein said first predefined relationship is the same as said second predefined relationship.

33. Apparatus according to claim 21, for use further with a texture buffer containing a plurality of texture cells,
  wherein the attribute value of said first surface region includes a pointer to a group of at least one of said texture cells in said texture buffer,
  and wherein said first modifying means comprises:
    first retrieving means for retrieving a texture value from one of the texture cells pointed to by the attribute value of said first surface region; and
    first changing means for changing the values in the image cell corresponding to said first image region in dependence upon said texture value.

34. A method for rendering a model from a 3-dimensional model space into a frame buffer containing a plurality of image cells, each of said image cells containing, after rendering, values which represent visible attributes of a respective region of a displayable two-dimensional image, for use with a depth buffer containing a plurality of depth cells corresponding to said image cells,
  wherein said model includes a model space polygon having a plurality of model space vertices each having three spatial coordinates in said model space and each further having attribute values, comprising the steps of:
    providing an homogenized projection of each of said model space vertices onto an image plane in said model space, said image plane defining a two-dimensional image space and having a plurality of image regions each corresponding to a respective one of said image cells, said homogenized projection including, for each of said model space vertices, two spatial coordinates in said image space and a homogeneity value, the spatial coordinates for each of said vertices identifying a respective image space vertex of an image space polygon;
    calculating, by interpolation from said image space vertices, a homogeneity value for each of the image cells covered by said image space polygon; and
    for each given one of said image cells covered by said image space polygon, only if the homogeneity value calculated for the given image cell bears a first predefined quantitative relationship to the value then in the depth cell corresponding to said given image cell, modifying the value in the given image cell in dependence upon the attribute values of at least one of said model space vertices,
  wherein the homogeneity value comprises an indication of one of a predefined plurality of sub-ranges in a predefined range of all possible depth values and an indication of one of a plurality of discrete depth values within said one of a predefined plurality of sub-ranges.

35. A method according to claim 34, wherein the homogeneity value calculated for a certain one of said image cells covered by said image space polygon does bear said first predefined quantitative relationship to the value then in the depth cell corresponding to said certain image cell,
  comprising the step of modifying the value in the certain image cell in dependence upon the attribute values of at least one of said model space vertices.

36. A method according to claim 35, wherein each of said regions of said displayable two-dimensional image constitutes a pixel of a display.

37. A method according to claim 35, wherein said predefined quantitative relationship is defined by one of the relationships in the group of relationships consisting of $c_{new}<c_{prior}$, $c_{new}<=c_{prior}$, $c_{new}=c_{prior}$, $c_{new}>c_{prior}$, $c_{new}>=c_{prior}$ and $c_{new} \neq c_{prior}$, where $c_{new}$ is the homogeneity value calculated for the given image cell and $c_{prior}$ is the value then in the depth cell corresponding to said given image cell.

38. A method according to claim 35, wherein said step of calculating a homogeneity value for each of the image cells comprises the step of bi-linearly interpolating the homogeneity value for each particular one of the image cells covered by said image space polygon from the homogeneity values of the model space vertices, in accordance with relative distances of the particular image cell from each of said image space vertices.

39. A method according to claim 35, wherein the attribute values of each of said model space vertices include a respective color value, further comprising the step of interpolating a color value for said certain image cell from color values of the model space vertices, in accordance with relative distances of said certain image cell from each of said image space vertices, and wherein said step of modifying the value in the certain image cell in dependence upon the attribute values of at least one of said model space vertices comprises a step of modifying the value in said certain image cell in dependence upon the interpolated color value for said certain image cell.

40. A method according to claim 34, wherein the attribute values of each of said model space vertices includes a respective plurality of coordinates into a texture map space containing a predefined texture map, further comprising the step of interpolating a respective plurality of texture map coordinates for each particular one of the image cells covered by said image space polygon from texture map coordinates of the model space vertices, in accordance with relative distances of the particular image cell from each of said image space vertices, and wherein said step of modifying the value in a given image cell in dependence upon the attribute values of at least one of said model space vertices comprises a step of modifying the value in the given image cell in dependence upon attribute values of said texture map for the interpolated plurality of texture map coordinates for the given image cell.

41. A method according to claim 35, wherein the attribute values of each of said model space vertices includes a respective plurality of spatial coordinates into a depth-adjusted texture space containing a texture map, said spatial coordinates for each of said model space vertices being depth-adjusted in accordance with the homogeneity value for such vertex, further comprising the steps of:

bi-linearly interpolating a respective plurality of depth-adjusted texture space coordinates for said polygon from the depth-adjusted texture space coordinates of the model space vertices, in accordance with relative distances of said certain image cell from each of said image space vertices; and applying the homogeneity value calculated for said certain image cell, to the depth-adjusted texture space coordinates interpolated for said certain image cell to determine a plurality of depth-independent texture space coordinates for said certain image cell, and wherein said step of modifying the value in the certain image cell in dependence upon the attribute values of at least one of said model space vertices comprises a step of modifying the value in said certain image cell in dependence upon attribute values of a depth-independent texture map at the depth-independent texture space coordinates for said certain image cell.

42. A method according to claim 35, further comprising the step of writing the homogeneity value calculated for said certain image cell into the depth cell corresponding to said certain image cell.

43. A method according to claim 42, wherein said step of writing the homogeneity value calculated for said certain image cell into the depth cell corresponding to said certain image cell comprises the steps of:

representing the homogeneity value calculated for said certain image cell with numbers (e,s), where e indicates an e'th one of the predefined plurality of sub-ranges, and where s indicates an s'th one of the plurality of discrete depth values within said e'th predefined sub-range; and storing e and s in said certain image cell.

44. A method according to claim 43, wherein said step of representing said first depth value with numbers (e,s) comprises the step of selecting e and s such that $s \times 2^{-be}$ is equal to said first depth value, b being a predefined constant greater than 1.

45. A method according to claim 44, wherein b=3.

46. A method according to claim 35, further comprising the steps of:

representing the homogeneity value calculated for said certain image cell with numbers ($e_{new}$, $s_{new}$) where e indicates an $e_{new}$'th one of the predefined plurality of sub-ranges, and where $s_{new}$ indicates an $s_{new}$'th one of the discrete depth values within said $e_{new}$'th predefined sub-range;

representing said value then in the depth cell corresponding to said certain image cell with numbers ($e_{prior}$, $s_{prior}$), where $e_{prior}$ indicates an $e_{prior}$'th one of said predefined plurality of sub-ranges in said predefined range of all possible depth values, said $e_{prior}$'th sub-range including discrete depth values, and where $s_{prior}$ indicates an $s_{prior}$'th one of the discrete depth values within said $e_{prior}$'th predefined sub-range; and comparing ($c_{new}$,$s_{new}$) with ($e_{prior}$,$s_{prior}$) to determine whether the homogeneity value calculated for said certain image cell bears said predefined relationship to the value then in the depth cell corresponding to said certain image cell.

47. Apparatus for rendering a model from a 3-dimensional model space into a frame buffer containing a plurality of image cells, each of said image cells containing, after rendering, values which represent visible attributes of a respective region of a displayable two-dimensional image, for use with a depth buffer containing a plurality of depth cells corresponding to said image cells, wherein said model includes a model space polygon having a plurality of model space vertices each having three spatial coordinates in said model space and each further having attribute values, comprising: a vertex projection provider of an homogenized projection of each of said model space vertices onto an image plane in said model space, said image plane defining a two-dimensional image space and having a plurality of image regions each corresponding to a respective one of said image cells, said homogenized projection including, for each of said model space vertices, two spatial coordinates in said image space and a homogeneity value, the spatial coordinates for each of said vertices identifying a respective image space vertex of an image space polygon; first calculating means for calculating, by interpolation from said image space vertices, a homogeneity value for a given one of the image cells covered by said image space polygon; and first modifying means for, only if the homogeneity value calculated for said given image cell bears a first predefined quantitative relationship to the value then in the depth cell corresponding to said given image cell, modifying the value in said given image cell in dependence upon the attribute values of at least one of said model space vertices, wherein the homogeneity value comprises an indication of one of a predefined plurality of sub-ranges in a predefined range of all possible depth values and an indication of one of a plurality of discrete depth values within said one of a predefined plurality of sub-ranges.

48. Apparatus according to claim 47, wherein said predefined quantitative relationship is defined by one of the relationships in the group of relationships consisting of $c_{new} < c_{prior}$, $c_{new} <= c_{prior}$, $c_{new} = c_{prior}$, $c_{new} > c_{prior}$, $c_{new} >= c_{prior}$ and $c_{new} \neq c_{prior}$, where $c_{new}$ is the homogeneity value calculated for said given image cell and $c_{prior}$ is the value then in the depth cell corresponding to said given image cell.

49. Apparatus according to claim 47, wherein said first calculating means comprises means for bi-linearly interpolating the homogeneity value for each particular one of the image cells covered by said image space polygon from the homogeneity values of the model space vertices, in accordance with relative distances of the particular image cell from each of said image space vertices.

50. Apparatus according to claim 47, wherein the attribute values of each of said model space vertices include a respective color value, further comprising means for interpolating a color value for said given image cell from color values of the model space vertices, in accordance with relative distances of said given image cell from each of said image space vertices, and wherein said first modifying means comprises means for modifying the value in said given image cell in dependence upon the interpolated color value for said given image cell.

51. Apparatus according to claim 47, wherein the attribute values of each of said model space vertices includes a respective plurality of coordinates into a texture map space containing a predefined texture map, further comprising means for interpolating a respective plurality of texture map coordinates for each particular one of the image cells covered by said image space polygon from texture map coordinates of the model space vertices, in accordance with relative distances of the particular image cell from each of said image space vertices, and wherein said first modifying means comprises means for modifying the value in said given image cell in dependence upon attribute values of said texture map for the interpolated plurality of texture map coordinates for said given image cell.

52. Apparatus according to claim 47, wherein the attribute values of each of said model space vertices includes a respective plurality of spatial coordinates into a depth-adjusted texture space containing a texture map, said spatial coordinates for each of said model space vertices being depth-adjusted in accordance with the homogeneity value for such vertex, further comprising:

means for bi-linearly interpolating a respective plurality of depth-adjusted texture space coordinates for said polygon from the depth-adjusted texture space coordinates of the model space vertices, in accordance with relative distances of said given image cell from each of said image space vertices; and means for applying the homogeneity value calculated for said given image cell, to the depth-adjusted texture space coordinates interpolated for said given image cell to determine a plurality of depth-independent texture space coordinates for said given image cell, and wherein said first modifying means comprises means for modifying the value in said given image cell in dependence upon attribute values of a depth-independent texture map at the depth-independent texture space coordinates for said given image cell.

53. Apparatus according to claim 47, further comprising first writing means for writing the homogeneity value calculated for said given image cell into the depth cell corresponding to said given image cell.

54. Apparatus according to claim 53, wherein said first writing means comprises:

first selecting means for selecting numbers (e,s) for the homogeneity value calculated for said given image cell, where e and s are selected such that $s \times 2^{-be}$ is equal to the homogeneity value calculated for said given image cell, b being a predefined constant greater than 1; and first storing means for storing e and s in said given image cell.

55. Apparatus according to claim 47, further comprising:

first representing means for representing the homogeneity value calculated for said given image cell with numbers $(e_{new}, s_{new})$, where $e_{new}$ indicates an $e_{new}$'th one of the predefined plurality of sub-ranges, and where $s_{new}$ indicates an $s_{new}$'th one of the discrete depth values within said $e_{new}$'th predefined sub-range;

second representing means for representing said value then in the depth cell corresponding to said given image cell with numbers $(e_{prior}, s_{prior})$, where $e_{prior}$ indicates an $e_{prior}$'th one of said predefined plurality of sub-ranges in said predefined range of all possible depth values, said $e_{prior}$'th sub-range including discrete depth values, and where $s_{prior}$ indicates an $s_{prior}$'th one of the discrete depth values within said $e_{prior}$'th predefined sub-range; and first comparing means for comparing $(e_{new}, s_{new})$ with $(e_{prior}, s_{prior})$ to determine whether the homogeneity value calculated for said given image cell bears said predefined relationship to the value then in the depth cell corresponding to said given image cell.

56. A method for rendering a model from a 3-dimensional model space into a frame buffer containing a plurality of image cells, each of said image cells containing, after rendering, values which represent visible attributes of a respective region of a displayable two-dimensional image, wherein said model includes a model space polygon having a plurality of model space vertices each having three spatial coordinates in said model space and each further having attribute values including a respective plurality of coordinates into a depth-independent texture space having a plurality of texture regions each having a texture value, comprising the steps of:

providing a vertex projection of each of the model space vertices of said model space polygon onto an image plane in said model space, said image plane defining a two-dimensional image space and having a plurality of image regions each corresponding to a respective one of said image cells, each of said vertex projections including a respective relative depth value and a respective plurality of depth-adjusted coordinates into a depth-adjusted texture space;

representing each i'th one of the depth-adjusted coordinates of said vertices in said depth-adjusted texture space with a respective block range number $e_i$ and a respective significand $s_i$, each $e_i$ identifying an $e_i$'th one of a predefined plurality of sub-ranges in a predefined overall range of values, said sub-ranges including discrete values, and where each $s_i$ identifies a respective $s_i$'th one of the discrete values within the $e_i$'th predefined sub-range;

providing a first projection of a first surface region of said model space polygon onto said image plane, said first projection including an identification of a corresponding first one of said image regions in said image space and further including a first depth value relative to the depth values of said model space vertices;

representing said first depth value with a block range number $e_1$ identifying an $e_1$'th one of said predefined plurality of sub-ranges, and a significand $s_1$ identifying an $s_1$'th one of the discrete values within the $e_1$'th predefined sub-range;

calculating, by interpolation from the significands only of the depth-adjusted coordinates of vertices in said depth-adjusted texture space, significands only of depth-adjusted coordinates of a first texture region corresponding to said first surface region of said model space polygon;

applying the significand only of said relative depth value for said first image region to the significands of said depth-adjusted coordinates of said first texture region to determine depth-independent coordinates of said first texture region; and modifying the value in the image cell corresponding to said first image region in dependence upon the texture value of said first texture region as identified by said depth-independent identification of said first texture region.

57. A method according to claim 56, wherein the block range number of the depth-adjusted coordinates of all of said vertices in said depth-adjusted texture space, and the block range number of said first depth value, are all equal.

58. A method according to claim 57, wherein said sub-ranges are defined such that each j'th one of said depth-adjusted coordinates of the vertices in said depth-adjusted texture space is given by $s_j \times 2^{-be_j}$, and such that said first depth value is given by $s_1 \times 2^{-be_1}$, where b is a predefined constant greater than 1.

59. A method according to claim 58, where b=3.

60. A method according to claim 57, further comprising the steps of:

representing the relative depth value of each j'th one of said vertex projections with a respective block range number $e_j$ and a respective significand $s_j$, each $e_j$ identifying a respective $e_j$'th one of said predefined plurality of sub-ranges, and each $s_j$ identifying a respective $s_j$'th one of the discrete values within the $e_j$'th predefined sub-range; and calculating the significand of the relative depth value for said first image region by interpolation from the significands only of the depth values of said vertex projections, wherein the block range number of the relative depth values of said vertex projections are all equal.

61. A method according to claim 56, for use with a depth buffer containing a plurality of depth cells corresponding to said image cells, further comprising the steps of:

comparing said first depth value to a value previously stored in a first one of said depth cells which corresponds to said first image region; and storing $e_1$ in conjunction with $s_1$ in said first depth cell only if a predefined one of the following relationships are true: $c_1 < c_2$, $c_1 \leq c_2$, $c_1 = c_2$, $c_1 \geq c_2$, $c_1 > c_2$ and $c_1 \neq c_2$, where $c_1$ is said first depth value and $c_2$ is said value previously stored in the first depth cell.

62. A method according to claim 56, for use with a depth buffer containing a plurality of depth cells corresponding to said image cells, further comprising the step of storing $e_1$ in conjunction with $s_1$ in a first one of said depth cells which corresponds to said first image region.

63. Apparatus for rendering a model from a 3-dimensional model space into a frame buffer containing a plurality of image cells, each of said image cells containing, after rendering, values which represent visible attributes of a respective region of a displayable two-dimensional image, wherein said model includes a model space polygon having a plurality of model space vertices each having three spatial coordinates in said model space and each further having attribute values including a respective plurality of coordinates into a depth-independent texture space having a plurality of texture regions each having a texture value, comprising:

a vertex projection provider of a vertex projection of each of the model space vertices of said model space polygon onto an image plane in said model space, said image plane defining a two-dimensional image space and having a plurality of image regions each corresponding to a respective one of said image cells, each of said vertex projections including a respective relative depth value and a respective plurality of depth-adjusted coordinates into a depth-adjusted texture space;

first representing means for representing each i'th one of the depth-adjusted coordinates of said vertices in said depth-adjusted texture space with a respective block range number $e_i$ and a respective significand $s_i$, each $e_i$ identifying an $e_i$'th one of a predefined plurality of sub-ranges in a predefined overall range of values, said sub-ranges including discrete values, and where each $s_i$ identifies a respective $s_i$'th one of the discrete values within the $e_i$'th predefined sub-range;

a first surface region provider of a first projection of a first surface region of said model space polygon onto said image plane, said first projection including an identification of a corresponding first one of said image regions in said image space and further including a first depth value relative to the depth values of said model space vertices;

second representing means for representing said first depth value with a block range number $e_1$ identifying an $e_1$'th one of said predefined plurality of sub-ranges, and a significand $s_1$ identifying an $s_1$'th one of the discrete values within the $e_1$'th predefined sub-range;

first calculating means for calculating, by interpolation from the significands only of the depth-adjusted coordinates of vertices in said depth-adjusted texture space, significands only of depth-adjusted coordinates of a first texture region corresponding to said first surface region of said model space polygon;

first applying means for applying the significand only of said relative depth value for said first image region to the significands of said depth-adjusted coordinates of said first texture region to determine depth-independent coordinates of said first texture region; and first modifying means for modifying the value in the image cell corresponding to said first image region in dependence upon the texture value of said first texture region as identified by said depth-independent identification of said first texture region.

64. Apparatus according to claim 63, wherein the block range number of the depth-adjusted coordinates of all of said vertices in said depth-adjusted texture space, and the block range number of said first depth value, are all equal.

65. Apparatus according to claim 64, wherein said sub-ranges are defined such that each j'th one of said depth-adjusted coordinates of the vertices in said depth-adjusted texture space is given by $s_j \times 2^{-be_j}$, and such that said first depth value is given by $s_1 \times 2^{-be_1}$, where b is a predefined constant greater than 1.

66. Apparatus according to claim 64, further comprising:

third representing means for representing the relative depth value of each j'th one of said vertex projections with a respective block range number $e_j$ and a respective significand $s_j$, each $e_j$ identifying a respective $e_j$'th one of said predefined plurality of sub-ranges, and each $s_j$ identifying a respective $s_j$'th one of the discrete values within the $e_j$'th predefined sub-range; and second calculating means for calculating the significand of the relative depth value for said first image region by interpolation from the significands only of the depth values of said vertex projections, wherein the block range number of the relative depth values of said vertex projections are all equal.

67. Apparatus according to claim 63, for use with a depth buffer containing a plurality of depth cells corresponding to said image cells, further comprising:

first comparing means for comparing said first depth value to a value previously stored in a first one of said depth cells which corresponds to said first image region; and first storing means for storing $e_1$ in conjunction with $s_1$ in said first depth cell only if a predefined one of the following relationships are true: $c_1 < c_2$, $c_1 \leq c_2$, $c_1 = c_2$, $c_1 \geq c_2$, $c_1 > c_2$ and $c_1 \neq c_2$, where $c_1$ said first depth value and $c_2$ is said value previously stored in the first depth cell.

68. Apparatus according to claim 63, for use with a depth buffer containing a plurality of depth cells corresponding to said image cells, further comprising means for storing $e_1$ in conjunction with $s_1$ in a first one of said depth cells which corresponds to said first image region.

69. A method for rendering a model from a 3-dimensional model space into a frame buffer containing a plurality of image cells, each of said image cells containing, after rendering, values which represent visible attributes of a respective region of a displayable two-dimensional image, for use with a depth buffer containing a plurality of depth cells corresponding to said image cells, comprising the steps of:

providing homogenized projections of a plurality of surface regions of said model onto an image plane in said model space, said image plane having a plurality of image regions each corresponding to a respective one of said image cells, said homogenized projections each including an identification of a respective different one of said image regions for respective ones of said surface regions and further including a respective homogeneity value;

representing the homogeneity value for each i'th one of said surface regions with a respective block range number $e_i$ identifying an $e_i$'th one of a predefined plurality of sub-ranges in a predefined overall range of values, each of said sub-ranges including discrete values, and a respective significand $s_i$ identifying an $s_i$'th one of the discrete values within the $e_i$'th predefined sub-range; and storing each $e_i$ in conjunction with its respective $s_i$ in the depth cell corresponding to the image cell identified for the i'th surface region.

70. A method according to claim 69, further comprising the steps of, for an additional surface region of said model which projects onto a particular one of said plurality of image regions:

providing an additional homogenized projection of said additional surface region of said model onto said image plane, said additional homogenized projection including an identification of said particular image region and further including an additional homogeneity value;

representing said additional homogeneity value with an additional respective block range number $e_1$ identifying an $e_1$'th one of said sub-ranges, and an additional significand $s_1$ identifying an $s_1$'th one of the discrete values within the $e_1$'th predefined sub-range;

comparing said additional homogeneity value to the value which, in said step of storing, was previously stored in the depth cell corresponding to said particular image region; and storing $e_1$ in conjunction with $s_1$ in the depth cell corresponding to said particular image region only if a predefined one of the following relationships are true: $c_1 < c_2$, $c_1 \leq c_2$, $c_1 = c_2$, $c_1 \geq c_2$, $c_1 > c_2$ and $c_1 \neq c_2$, where $c_1$ is said additional depth value and $c_2$ is said value which was previously stored in the depth cell corresponding to said particular image region.

71. A method according to claim 70, further comprising the step of modifying the value in the image cell corresponding to said particular image region in dependence upon an attribute value of said additional surface region, only if said predefined relationship is true.

72. Apparatus for rendering a model from a 3-dimensional model space into a frame buffer containing a plurality of image cells, each of said image cells containing, after rendering, values which represent visible attributes of a respective region of a displayable two-dimensional image, for use with a depth buffer containing a plurality of depth cells corresponding to said image cells, comprising:

a surface region projection provider of homogenized projections of a plurality of surface regions of said model onto an image plane in said model space, said image plane having a plurality of image regions each corresponding to a respective one of said image cells, said homogenized projections each including an identification of a respective different one of said image regions for respective ones of said surface regions and further including a respective homogeneity value;

first representing means for representing the homogeneity value for each i'th one of said surface regions with a respective block range number $e_1$ identifying an $e_i$'th one of a predefined plurality of sub-ranges in a predefined overall range of values, each of said sub-ranges including discrete values, and a respective significand $s_i$ identifying an $s_i$'th one of the discrete values within the $e_i$'th predefined sub-range; and first storing means for storing each $e_i$ in conjunction with its respective $s_i$ in the depth cell corresponding to the image cell identified for the i'th surface region.

73. Apparatus according to claim 72, wherein said model has an additional surface region which projects onto a particular one of said plurality of image regions, further comprising:

an additional projection provider of an additional homogenized projection of said additional surface region of said model onto said image plane, said additional homogenized projection including an identification of said particular image region and further including an additional homogeneity value;

second representing means for representing said additional homogeneity value with an additional respective block range number $e_1$ identifying an $e_1$'th one of said sub-ranges, and an additional significand $s_1$ identifying an $s_1$'th one of the discrete values within the $e_1$'th predefined sub-range;

first comparing means for comparing said additional homogeneity value to a value then in the depth cell corresponding to said particular image region; and second storing means for storing $e_1$ in conjunction with $s_1$ in the depth cell corresponding to said particular image region only if a predefined one of the following relationships are true: $c_1<c_2$, $c_1 \leq c_2$, $c_1=c_2$, $c_1 \geq c_2$, $c_1>c_2$ and $c_1 \neq c_2$, where $c_1$ is said additional depth value and $c_2$ is said value then in the depth cell corresponding to said particular image region.

74. Apparatus according to claim 73, further comprising means for modifying the value in the image cell corresponding to said particular image region in dependence upon an attribute value of said additional surface region, only if said predefined relationship is true.

75. A graphical rendering system for rendering a model defined in a 3-dimensional model space, into a frame buffer having a plurality of image cells, different surface regions of said model being rendered into different ones of said image cells, comprising a depth buffer having a plurality of depth cells corresponding to said plurality of image cells, the depth cell corresponding to each given one of said image cells into which a surface region has been rendered containing a value (1/w) which is proportional to $1/\alpha z+\beta$, where z represents a depth in said model space of the surface region which was rendered into the given image cell, and where $\alpha$ and $\beta$ are constants over all of said depth cells corresponding to image cells into which surface regions have been rendered, wherein each i'th one of said values (1/w) contained in depth cells corresponding to image cells into which surface regions have been rendered, is represented in such depth cell with a block range number identifying one of a predefined plurality of sub-ranges in a predefined overall range of values, each of said sub-ranges including discrete values, and a respective significand identifying one of the discrete values within the predefined sub-range.

76. A system according to claim 75, wherein a respective block range number ej identifies an ej'th one of the predefined plurality of sub-ranges, and a respective significand s identifies an sj'th one of the discrete values within the predefined sub-range.

77. A system according to claim 76, wherein each i'th one of said values (1/w) contained in depth cells corresponding to image cells into which surface regions have been rendered, is given by $(1/w)_i=s_i \times 2^{-be_i}$, where b is a predefined constant greater than 1.

78. A system according to claim 76, wherein each i'th one of said values (1/w) contained in depth cells corresponding to image cells into which surface regions have been rendered, is given by $(1/w)_i=s_i \times 2^{-3e_i}$.

79. A method for rendering a model from a 3-dimensional model space into a frame buffer containing a plurality of image cells, each of said image cells containing, after rendering, values which represent visible attributes of a respective region of a displayable two-dimensional image, for use with a depth buffer containing a plurality of depth cells corresponding to said image cells, wherein said model includes a model space polygon having a plurality of model space vertices each having three spatial coordinates in said model space and each further having attribute values, comprising the steps of:

providing an homogenized projection of each of said model space vertices onto an image plane in said model space, said image plane defining a two-dimensional image space and having a plurality of image regions each corresponding to a respective one of said image cells, said homogenized projection including, for each of said model space vertices, two spatial coordinates in said image space and a homogeneity value, the spatial coordinates for each of said vertices identifying a respective image space vertex of an image space polygon;

calculating, by interpolation from said image space vertices, a homogeneity value for a particular one of the image cells covered by said image space polygon; and if and only if a first predetermined condition is satisfied, modifying the value in said particular image cell in dependence upon the attribute values of at least one of said model space vertices, said first predetermined condition being programmable selectable from among a predefined group of conditions consisting of: $c_1<c_2$, $c_1 \leq c_2$, $c_1=c_2$, $c_1 \geq c_2$, $c_1>c_2$, $c_1 \neq c_2$, always and never, where $c_1$ is the homogeneity value calculated for said particular image cell in said step of calculating, and $c_2$ in a value previously stored in the depth cell corresponding to said particular image cell, wherein the homogeneity value comprises an indication of one of a predcfined plurality of sub-ranges in a predefined range of all possible depth values and an indication of one of a plurality of discrete depth values within said one of a predefined plurality of sub-ranges.

80. A method according to claim 79, further comprising the step of, if and only if a second predetermined condition is satisfied, storing in the depth cell corresponding to said particular image cell said homogeneity value calculated for said particular image cell in said step of calculating, said second predetermined condition being programmably selectable from among said predefined group of conditions.

81. A method according to claim 80, wherein said first and second predetermined conditions are programmable separately.

* * * * *

UNITED STATES PATENT AND TRADEMARK OFFICE
CERTIFICATE OF CORRECTION

PATENT NO.    : 5,856,829

DATED         : January 5, 1999

INVENTOR(S)   : Donald M. Gray III, Adam C. Malamy, Robert W. Laker, Adrian Sfarti It is certified that error appears in the above-identified patent and that said Letters Patent is hereby corrected as shown below:

Column 59, line 37, replace "e," with --$e_j$--.

Signed and Sealed this

Thirteenth Day of April, 1999

Attest:

Q. TODD DICKINSON

*Attesting Officer*  Acting Commissioner of Patents and Trademarks